US012582944B2

(12) United States Patent
Stanulis et al.

(10) Patent No.: US 12,582,944 B2
(45) Date of Patent: Mar. 24, 2026

(54) METHODS FOR TREATING POROUS MEMBRANES

(71) Applicant: APEX Water Solutions W.L.L, Doha (QA)

(72) Inventors: Andrius Stanulis, Swansea (GB); Thomas J. Ainscough, Llanelli (GB); Darren L. Oatley-Radcliffe, Tonyrefail (GB); Andrew R. Barron, Swansea (GB)

(73) Assignees: APEX WATER SOLUTION LLC, Doha (QA); APACHE CORPORATION, Houston, TX (US)

( * ) Notice: Subject to any disclaimer, the term of this patent is extended or adjusted under 35 U.S.C. 154(b) by 547 days.

(21) Appl. No.: 17/776,965

(22) PCT Filed: Apr. 30, 2021

(86) PCT No.: PCT/IB2021/053629
§ 371 (c)(1),
(2) Date: Feb. 16, 2023

(87) PCT Pub. No.: WO2021/220239
PCT Pub. Date: Nov. 4, 2021

(65) Prior Publication Data
US 2023/0330601 A1        Oct. 19, 2023

Related U.S. Application Data

(60) Provisional application No. 63/017,678, filed on Apr. 30, 2020.

(51) Int. Cl.
B01D 71/02 (2006.01)
B01D 65/06 (2006.01)
B01D 67/00 (2006.01)

(52) U.S. Cl.
CPC ........... B01D 71/024 (2013.01); B01D 65/06 (2013.01); B01D 67/0039 (2013.01);
(Continued)

(58) Field of Classification Search
None
See application file for complete search history.

(56) References Cited

U.S. PATENT DOCUMENTS

2002/0027111 A1    3/2002    Ando et al.
2008/0035568 A1    2/2008    Huang et al.
(Continued)

OTHER PUBLICATIONS

Fayos et al., Cleaning of Ultrafiltration Membranes After Treatment of Surface Water: Static-Dynamic Test, https://doi.org/10.1080/19443994.2012.704687 (Year: 2013).*
(Continued)

*Primary Examiner* — Krishnan S Menon
(74) *Attorney, Agent, or Firm* — Patterson + Sheridan, LLP

(57)        ABSTRACT
Embodiments of the present disclosure generally relate to methods for treating porous membranes. In an embodiment, a method of treating a porous membrane is provided. The method includes flushing the membrane with a first fluid comprising a hydroxide ion and hypochlorite ion, flushing the membrane with water, flushing the membrane with a second fluid comprising an organic peroxide, organic peroxide ion, or both, and flushing the membrane with water.

20 Claims, 43 Drawing Sheets

(52) U.S. Cl.
    CPC ...... B01D 67/0093 (2013.01); *B01D 2321/02*
        (2013.01); *B01D 2321/04* (2013.01); *B01D*
            *2321/162* (2013.01); *B01D 2321/164*
            (2013.01); *B01D 2321/168* (2013.01)

(56)                    References Cited

U.S. PATENT DOCUMENTS

| | | |
|---|---|---|
| 2009/0314712 A1 | 12/2009 | Skou |
| 2015/0343386 A1 | 12/2015 | Labib et al. |
| 2017/0225128 A1 | 8/2017 | Votaw et al. |
| 2019/0099720 A1 | 4/2019 | Schacht et al. |

OTHER PUBLICATIONS

International Search Report and Written Opinion for International
Application No. PCT/IB21/53629 dated Jul. 21, 2021.

* cited by examiner

HMMD10.5 x 60    1 mm

Before

After

HCl

Oxalic acid

Citric acid

Acetic acid

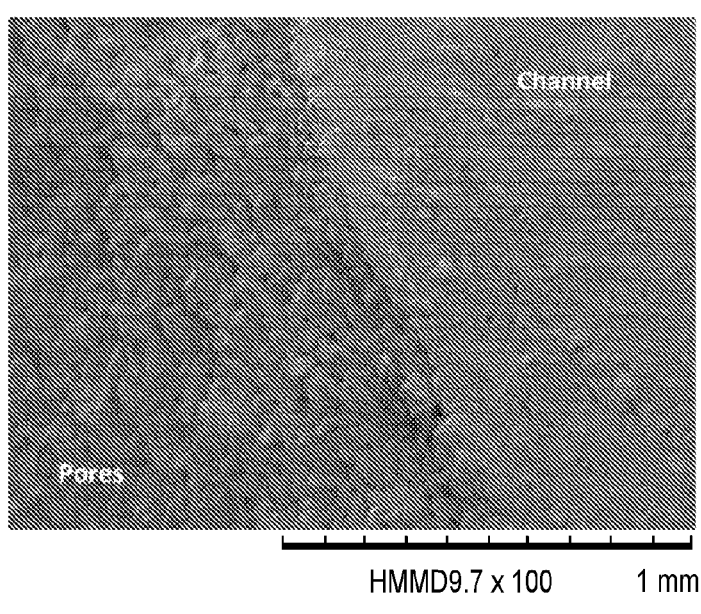
HMMD9.7 x 100     1 mm
FIG. 11A
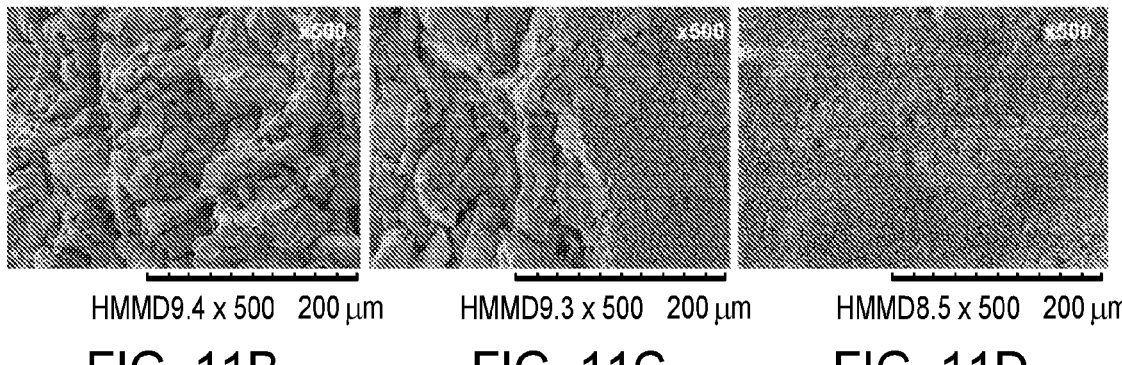
HMMD9.4 x 500     200 μm
HMMD9.3 x 500     200 μm
HMMD8.5 x 500     200 μm
FIG. 11B          FIG. 11C          FIG. 11D
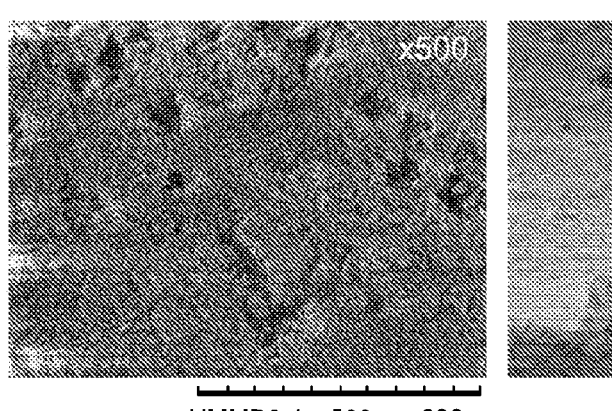
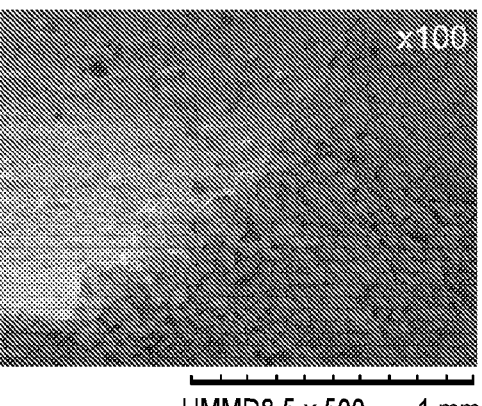
HMMD9.4 x 500     200 μm          HMMD8.5 x 500     1 mm
FIG. 12A                          FIG. 12B HMMD9.4 x 500   200 μm HMMD8.1x 150   500 μm HMMD8.4 x 800   100 μm

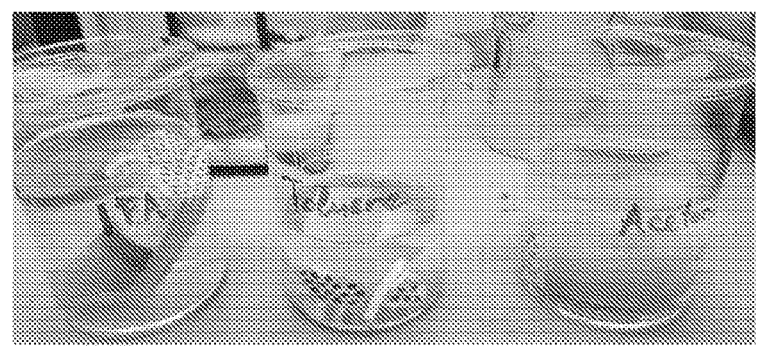
Isopropanol      Toluene      Acetone
FIG. 18A
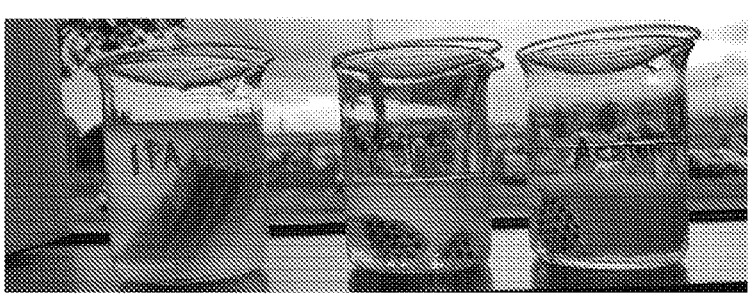
Isopropanol      Toluene      Acetone
After 20 minutes of ultrasonic bath, which creates some mixing effect (flow)
FIG. 18B
 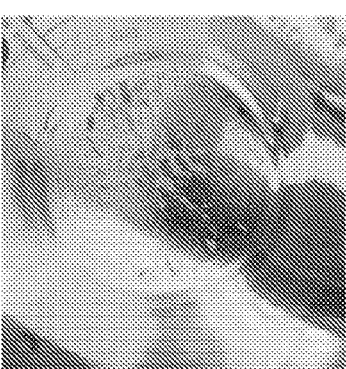 
Isopropanol      Toluene      Acetone
FIG. 19A      FIG. 19B      FIG. 19C

METHODS FOR TREATING POROUS MEMBRANES

BACKGROUND

Field

Embodiments of the present disclosure generally relate to methods for treating porous membranes.

Description of the Related Art

Porous membranes are utilized to separate various components of industrial waste and wastewater. However, their capacity to purify or otherwise separate material from the bulk fluid has many drawbacks such as membrane fouling. Membrane fouling refers to the reduction in permeability of the membrane due to, e.g., the accumulation of solids, particulates, and/or other materials on the membrane surface and in the membrane pores. The presence of such solids and clogged pores leads to reduced membrane performance in the form of reduced membrane flux. Separation of organic compounds and other materials from various liquids is another challenge for many state-of-the-art membranes.

Recently, porous membranes that have been functionalized with hydrophilic molecules have been shown to achieve separation of hydrocarbons, as well as increased membrane flux and reduced fouling relative to unfunctionalized membranes. However, fouling and reduced membrane flux of these functionalized membranes have been observed under some field applications, and the use of conventional clean-in-place (CIP) methods such as flushing with caustic solutions and/or citric acid fail to return the membrane flux to its original levels.

There is a need for new and improved methods for treating porous membranes that overcome one or more deficiencies in the art.

SUMMARY

Embodiments of the present disclosure generally relate to methods for treating porous membranes.

In an embodiment, a method of treating a porous membrane is provided. The method includes flushing the membrane with a first fluid comprising a hydroxide ion and hypochlorite ion, flushing the membrane with water, flushing the membrane with a second fluid comprising an organic peroxide, organic peroxide ion, or both, and flushing the membrane with water.

In another embodiment, a method of treating a porous membrane is provided. The method includes flowing a first fluid from a permeate side of the membrane to a retentate side of the membrane, the first fluid comprising a hydroxide ion and a hypochlorite ion, the membrane comprising a plurality of hydrophilic molecules bonded to the ceramic membrane, and flowing water from the retentate side of the membrane to the permeate side of the membrane, the method further includes flowing a second fluid from the permeate side of the membrane to the retentate side of the membrane, the second fluid comprising an organic peroxide, organic peroxide ion, or both, and flowing water from the retentate side of the membrane to the permeate side of the membrane.

In another embodiment, a method of treating a porous membrane is provided. The method includes introducing a cleaning agent solution on a permeate side of the membrane, the cleaning agent solution comprising a hydroxide ion, a hypochlorite ion, and a surfactant, the membrane comprising a plurality of hydrophilic molecules bonded to the ceramic. The method further includes applying a transmembrane pressure of about 5 bar or less to move the cleaning agent solution through the membrane and to a retentate side of the membrane, and flushing the membrane with water until a pH of the water is about 7 or less. The method further includes introducing an organic peroxide solution on the permeate side of the membrane, the organic peroxide solution comprising an organic peroxide, organic peroxide ion, or both, applying a transmembrane pressure of about 5 bar or less to move the organic peroxide solution through the membrane and to the retentate side of the membrane, and flushing the membrane with water.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

FIG. 11A is an exemplary SEM image of a used membrane after washing with oxalic acid according to at least one embodiment.

FIGS. 11B-11D are exemplary SEM images of the pores, the interface between the pores and channels, and the channels of a used membrane, respectively, after washing with oxalic acid according to at least one embodiment.

FIGS. 12A and 12B are exemplary SEM image of the channels and the interface between the pores and channels of a used membrane, respectively, after washing with citric acid according to at least one embodiment.

FIGS. 18A and 18B are exemplary photographs of portions of a used membrane in various organic solvents prior to sonication and after sonication, respectively, of the used membrane, according to at least one embodiment.

FIGS. 19A-19C are exemplary photographs of material removed from a used membrane by sonicating the used membrane in isopropanol, toluene, or acetone, respectively, according to at least one embodiment.

FIG. 25 is a photograph of an example housing for the membrane and filtration apparatus according to at least one embodiment.

Figures included herein illustrate various embodiments of the disclosure. It is contemplated that elements and features of one embodiment may be beneficially incorporated in other embodiments without further recitation.

DETAILED DESCRIPTION

Embodiments of the present disclosure generally relate to methods for treating porous membranes. More specifically, embodiments of the present disclosure generally relate to methods for treating porous membranes functionalized with hydrophilic molecules. Embodiments described herein enable, e.g., reactivation or regeneration of used porous membranes, returning the membrane flux to operational levels or pre-use levels.

In some examples, the method includes flushing a porous membrane, such as a functionalized ceramic membrane, with a fluid containing a hypochlorite ion (or salt thereof such as sodium hypochlorite) and a hydroxide ion (or salt thereof such as sodium hydroxide), and flushing the porous membrane with a fluid containing a peroxide, e.g., an organic peroxide. In some examples, one or more of these fluids includes a surfactant. The methods described herein are effective for treating membranes used to separate components in a variety of applications. For example, the methods are effective for treating membranes utilized for recovering oil from an oil-water mixture, recovering water from an oil-water mixture, and separating components in contaminated industrial water, wastewater or other feeds.

During recovery or separation operations, a feed enters a housing having a membrane therein. The fluid that passes through the membrane is known as the permeate (or filtrate), while the fluid that contains the retained components is known as the retentate. "Retentate side" refers to the side on which the fluid first passes during recovery or separation operations. "Permeate side" refers to the opposite side of the membrane.

Membranes, such as ceramic membranes, are ordinarily cleaned utilizing forward flushing, backward flushing, and cleaning fluids. Forward flushing uses the retentate side (or feed side) to clean the membrane surfaces. As an example, the membranes are flushed with the feed water forward so as to remove contaminants on the surface of the membrane by, e.g., turbulence. Backward flushing (or backflushing) uses a fluid on the permeate side to force the fluids (or permeate fluids) back through the membrane causing the contaminants to be released from the membrane pores and channels. Conventional cleaning fluids include aqueous media in alkaline or acidic solution. Alternative cleaning fluids include sulfite reducing agents such as ascorbic acid as well as oxidizing agents. Conventional techniques also utilize high temperatures (above 60° C. or above 80° C.) while flushing with cleaning fluids and/or include a further step of flushing the membrane with a hydrocarbon liquid.

Figure 1A:
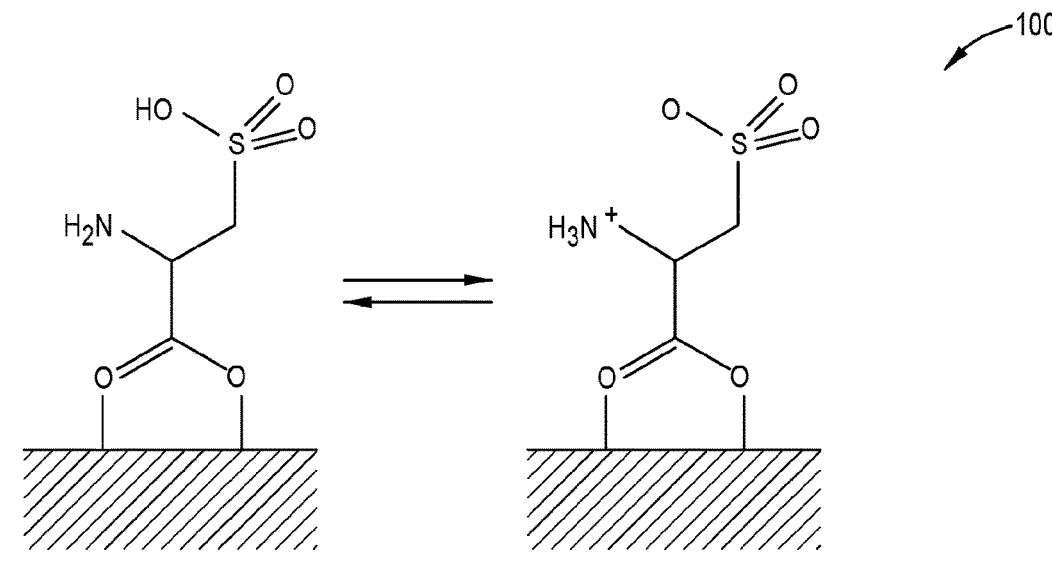
FIG. 1A is a schematic representation of a cysteic acid functionalized ceramic membrane showing cysteic acid in its neutral and zwitterionic states according to at least one embodiment.

However, none of these aforementioned solutions and techniques are suitable to treat or regenerate membranes functionalized with one or more hydrophilic molecules. In contrast to conventional methods, embodiments of the present disclosure enable regeneration of membranes functionalized with hydrophilic molecules such as cysteic acid among others. Moreover, embodiments described herein can be utilized in online cleaning modes (where the membrane, piping, and/or other equipment are in production mode) and offline cleaning modes (where the membrane, piping, and/or other equipment are not in production mode). Further, embodiments described herein can be utilized with clean-in-place operations. Clean-in-place operations allow cleaning of the interior surfaces of pipes, membranes, process lines, and/or other equipment with minimal dismantling and/or operator involvement. FIG. 1A shows a schematic representation of an example functionalized ceramic membrane 100. In this example, cysteic acid, which can exist in equilibria with its zwitterionic form, is bound to the surface of the membrane through its carboxylate moiety.

Figure 1B:
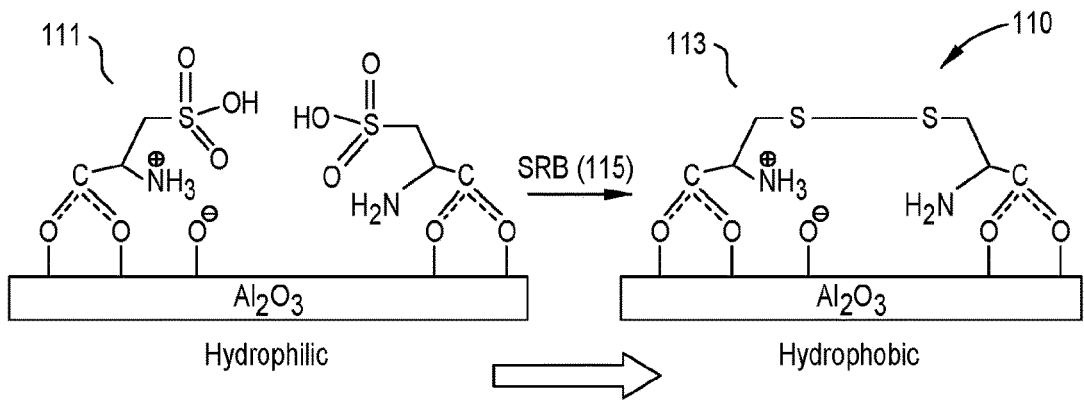
FIG. 1B is a schematic representation of the conversion of the cysteic acid sulfonate group to sulfide by anaerobic sulfate reducing bacteria, with the change from a hydrophilic surface to a hydrophobic surface according to at least one embodiment.
Figure 1C:
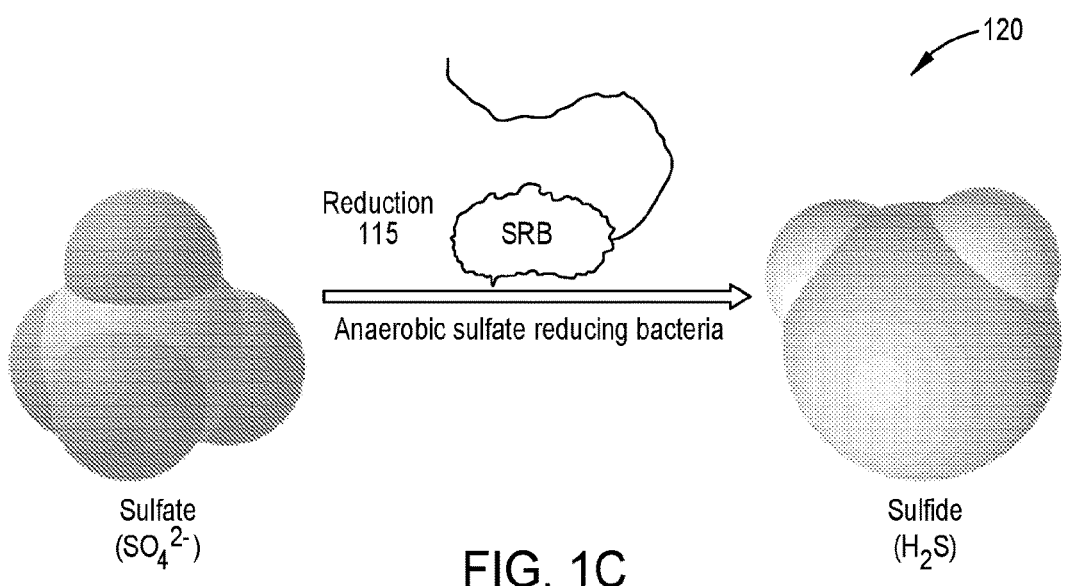
FIG. 1C is a schematic representation of the conversion of sulfate ion to sulfide by anaerobic sulfate reducing bacteria according to at least one embodiment.

Although porous membranes functionalized with hydrophilic molecules enable low fouling and high membrane flux relative to other conventional membranes, prolonged exposure to high levels of bacteria in wastewater being treated can result in reduced membrane flux. For example, and as shown in the conversion reaction 110 of FIG. 1B, the sulfonate group of a cysteic acid-functionalized membrane 111 can be reduced to a disulfide 113 or a thiol (not shown) through anaerobic sulfate reducing bacteria (SRB) 115, converting the hydrophilic membrane surface to a hydrophobic surface. In addition, and as shown in the conversion reaction 120 of FIG. 1C, sulfate ion ($SO_4^{2-}$) can be converted to $H_2S$ in the presence of the SRB 115, and a similar reaction occurs with the cysteic acid functionalized surface of the membrane. Upon conversion, the membrane surface loses its hydrophilic property and is subject to fouling. It has also been observed that during times of inactivity, the channels in the membrane become blocked with a deposit, typically in the form of salt such as NaCl and organic materials. Even after physical removal of the deposit, the membrane flux is significantly decreased as compared to the pre-use membrane.

To date, methods of cleaning functionalized membranes to remove foulants such as scaling, salts, solids, organic material, and bacteria (e.g., SRB) have been ineffective or too time-consuming. For example, conventional methods can require complete dismantling of the filtration system. In contrast, embodiments described herein reduce downtime of the filtration systems incorporating such membranes due to, e.g., its efficient protocol. Moreover, embodiments described herein maintain the chemistry of the functionalized membrane. Here, for example, the methods enable regeneration of the cysteic acid functionality by, e.g., converting the disulfide back to a cysteic acid (the reverse process of FIG. 1B). This conversion allows the membrane to revert back to being hydrophilic. As a result, the membranes maintain their, e.g., high membrane flux and low fouling characteristics.

Figure 2A:
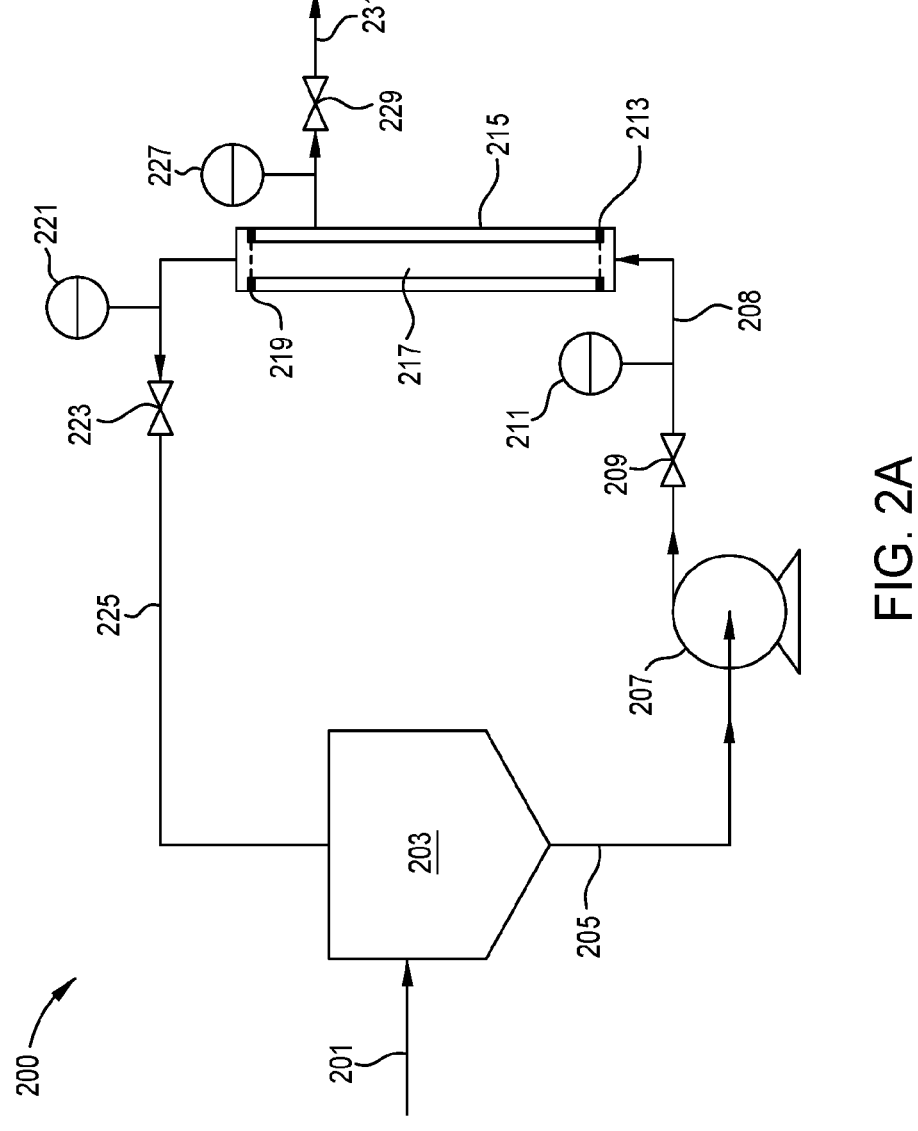
FIG. 2A is a schematic of an example filtration apparatus useful for performing one or more operations described herein according to at least one embodiment.

FIG. 2A is a schematic of an example filtration apparatus 200 useful for performing one or more operations described herein. The filtration apparatus 200 is a non-limiting illustration only. Modifications and alterations of the filtration system are contemplated.

The filtration apparatus 200 includes a fluid feed inlet 201 fluidically coupled to a recirculation tank 203. The recirculation tank 203 is fluidically coupled to a pump 207 via a pump suction line 205. The pump 207, e.g., circulates the fluid throughout the filtration apparatus 200. The pump 207 is also fluidically coupled to a membrane housing 215 via line 208. Along the line 208 is disposed a pump discharge valve 209 and a pre-membrane pressure gauge 211 to, e.g., control flow of fluid through the pump 207. The membrane housing 215 contains a membrane 217, and gaskets 213, 219 on each side of the membrane 217 to hold the membrane in the membrane housing 215.

Retentate can exit the membrane housing 215 via retentate return line 225 and circulated to the recirculation tank 203. Along the retentate return line 225 is disposed a post-membrane pressure gauge 221. A retentate return line valve 223 is also disposed along the retentate return line 225 and used to control trans-membrane pressure. Permeate can exit the membrane housing 215 via permeate line 231. Along the permeate line 231 is disposed a permeate pressure gauge 227 and permeate control valve 229 to, e.g., control flow of the permeate. The permeate side of the membrane can be located before the permeate pressure gauge 227 from the membrane housing 215. The retentate side of the membrane can be located before the post-membrane pressure gauge 221 from the membrane housing 215.

Line 208 can be utilized for forward flushing. For backflushing, line 208 can be disconnected at the bottom of the membrane housing 215 and connected to the permeate line 231. Treatment solutions described herein can be circulated throughout the filtration apparatus 200.

Figure 2B:
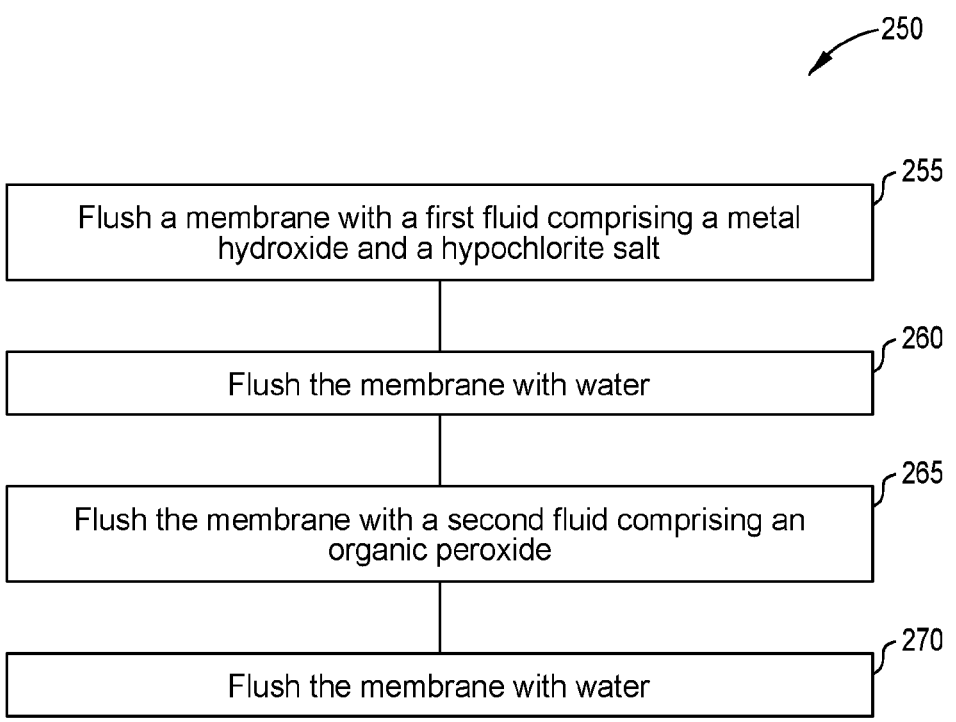
FIG. 2B is a flowchart showing selected operations of an example method of treating a membrane according to at least one embodiment.

FIG. 2B is a flowchart of selected operations of an example method 250 of treating a membrane. One or more operations of the method 250 can be utilized with the filtration apparatus of FIG. 2A, though it is contemplated that the operations described herein can be utilized with other filtration apparatus. The treatment method enables new or used porous membranes to be, e.g., cleaned, reactivated, and/or regenerated. In some embodiments, the new or used porous membranes are ceramic membranes functionalized with one or more hydrophilic molecules. Non-limiting properties of the porous membranes that can be treated by methods provided herein are described below. The treatment methods described herein can also be used for pre-used and/or unfunctionalized membranes.

Method 250 includes flushing a membrane with a fluid containing a hypochlorite, a hypochlorite salt, a hydroxide, a hydroxide salt, or combinations thereof at operation 255. The fluid can be in the form of a solution or a suspension. This fluid containing the hypochlorite, the hypochlorite salt, the hydroxide, the hydroxide salt, or combinations thereof is interchangeably referred to as a cleaning agent solution.

The hypochlorite salt, and/or the source for the hypochlorite, can be sodium hypochlorite, calcium hypochlorite, potassium hypochlorite, lithium hypochlorite, barium hypochlorite, and/or other metal hypochlorites. The hydroxide salt, and/or the source for the hydroxide, can be salts of a hydroxyl ion ($OH^-$) and a metal, such as an alkali metal, an alkali earth metal, or combinations thereof. Illustrative, but non-limiting, examples of such metals include Li, Na, K, Rb, Cs, Be, Mg, Ca, Sr, Ba. The hydroxide salt, and/or the source for the hydroxide, can be LiOH, NaOH, KOH, RbOH, CsOH, $Be(OH)_2$, $Mg(OH)_2$, $Ca(OH)_2$, $Ba(OH)_2$, or combinations thereof. The cleaning agent solution can be an aqueous mixture, an organic mixture, or combinations thereof. When a hydroxide and/or a hydroxide salt is part of the cleaning agent solution, the cleaning agent solution is caustic.

Operation 255 can be performed by introducing the cleaning agent solution on a permeate side of the membrane, a retentate side of the membrane, or both (e.g., sequentially in any order and/or any suitable number of times). The cleaning agent solution contacts the pores, sides, channels, and/or other surfaces of the membrane under a desired transmembrane pressure (TMP) for a selected amount of time so as to move the cleaning agent from the permeate side of the membrane to the retentate side of the membrane, and/or vice-versa. The TMP utilized during operation 255 can be about 1 bar or more or about 5 bar or less, such as from about 1 bar to about 5 bar, such as from about 1.25 bar to about 2.5 bar, such as from about 1.5 bar to about 2.25 bar, such as from about 1.75 bar to about 2 bar. In at least one embodiment, the TMP utilized during operation 255 is from about 1 bar to about 2.1 bar or from about to about 1 bar to about 2 bar. Higher or lower pressures used during operation 255 are contemplated.

If the pressure applied to the cleaning agent solution is not high enough to push the cleaning agent solution through the membrane and to the retentate side of the membrane, and/or to push the cleaning agent solution through the membrane and to the permeate side of the membrane, additional transmembrane pressure can be supplied by, e.g., injecting compressed gas, as in a pressure filtration process, or by suction, as in an immersed membrane filtration process.

Operation 255 can be performed at a temperature of about 80° C. or less, such as about 75° C. or less, such as about 70° C. or less, such as about 65° C. or less, such as from about 15° C. to about 60° C., such as from about 25° C. to about 45° C., such as from about 30° C. to about 40° C., such as from about 30° C. to about 35° C. or from about 35° C. to about 40° C. In at least one embodiment, operation 255 is performed at a temperature of about 30° C. to about 50° C., such as from about 35° C. to about 45° C., such as from about 40° C. to about 45° C. Higher or lower temperatures used during operation 255 are contemplated. Operation 255 can be performed for any suitable duration of time, such as about 30 seconds or more or about 48 h or less, such as about 24 h or less, such as about 12 h or less, such as about 5 h or less, such as from about 1 min to about 4 h, such as from about 10 min to about 3 h, such as from about 20 min to about 2.5 h, such as from about 30 min to about 2 h, such as from about 45 min to about 1.5 h, such as from about 1 h to about 1.25 h. Shorter or longer durations of time for performing operation 255 are contemplated. The pressure and temperature can be adjusted during operation 255 such that an initial temperature and pressure, one or more intermediate temperatures and pressures, and/or a final temperature and pressure can be selected. Operation 255 can be performed one or more times such that there are one or more cleaning agent solution flushes. In some embodiments, the cleaning agent solution is removed from the system after one or more of the flushes by, e.g., draining and/or other normal use of the membrane.

The concentration of hydroxide and/or hydroxide salt in the cleaning agent solution can be 5 wt % or less or about 0.2 wt % or more, such as from about 0.5 wt % to about 5 wt %, such as from about 1 wt % to about 4 wt %, such as from about 2 wt % to about 3 wt %.

The concentration of hypochlorite and/or hypochlorite salt in the cleaning agent solution can be about 10 wt % or less or about 0.5 wt % or more, such as from about 1 wt % to about 10 wt %, such as from about 2 wt % to about 9 wt %, such as from about 3 wt % to about 8 wt %, such as from about 4 wt % to about 7 wt %, such as from about 5 wt % to about 6 wt %. In at least one embodiment, the concentration of the hypochlorite salt in the cleaning agent solution is from about 1 wt % to about 5 wt %, such as from about 2 wt % to about 4 wt %, such as from about 2.5 wt % to about 3.5 wt %.

In some embodiments, a weight ratio of hydroxide ion (and/or hydroxide salt) to hypochlorite ion (and/or hypochlorite salt) in the cleaning agent solution is from about 0.25:5 to about 2:5, such as from about 0.5:5 to about 1.75:5, such as from about 0.75:5 to about 1.5:5, such as from about 1:5 to about 1.25:5.

In some embodiments, the cleaning agent solution further includes a surfactant, such as an amine oxide having the formula:

$$R^1 \diagdown \underset{\underset{O^-}{\overset{|}{N^+}}}{\overset{\overset{R^2}{|}}{}} \diagup R^3,$$

wherein:

$R^1$ is a substituted or unsubstituted $C_5$-$C_{22}$ (such as $C_{10}$-$C_{22}$, such as $C_{12}$-$C_{20}$, such as $C_{12}$-$C_{18}$, such as $C_{14}$-$C_{16}$) linear or branched hydrocarbyl; and each of $R^2$ and $R^3$ is, independently, a substituted or unsubstituted $C_1$-$C_{22}$ (such as $C_1$-$C_{12}$, such as $C_1$-$C_6$, such as $C_{14}$-$C_{18}$) hydrocarbyl.

Each of $R^1$, $R^2$, and $R^3$ is, independently, saturated or unsaturated, substituted or unsubstituted, linear or branched, cyclic or acyclic, aromatic or non-aromatic. In some embodiments, $R^2$ and $R^3$ is, independently, methyl, ethyl, propyl, butyl, pentyl, or hexyl. In some embodiments, each of $R^1$, $R^2$, and/or $R^3$, includes one or more ether moieties.

The cleaning agent solution can contain one or more surfactants, such as one or more amine oxides. In at least one embodiment, the surfactant is a $C_{12}$-$C_{18}$ dimethylamine oxide, a $C_{10}$-$C_{16}$ dimethylamine oxide, or combinations thereof.

The concentration of surfactant in the cleaning agent solution can be about 10 wt % or less or about 0.5 wt % or more, such as from about 1 wt % to about 10 wt %, such as from about 2 wt % to about 9 wt %, such as from about 3 wt % to about 8 wt %, such as from about 4 wt % to about 7 wt %, such as from about 5 wt % to about 6 wt %. In at least one embodiment, the concentration of the surfactant in the cleaning agent solution is from about 1 wt % to about 5 wt %, such as from about 2 wt % to about 4 wt %, such as from about 2.5 wt % to about 3.5 wt %.

In some embodiments, the membrane is flushed with an organic solvent, e.g., an alcohol, before and/or after operation 255. The alcohol used can be an organic compound having one or more hydroxyl functional groups bound to one or more carbon atoms. The alcohol can be a $C_1$-$C_{40}$ alcohol, such as a $C_1$-$C_{20}$ alcohol, such as a $C_1$-$C_{10}$ alcohol, such as a $C_1$-$C_6$ alcohol, such as a $C_1$-$C_4$ alcohol where the carbon chain of the alcohol is saturated or unsaturated, linear or branched, substituted or unsubstituted, cyclic or acyclic, aromatic or non-aromatic.

The alcohol can be a primary alcohol, a secondary alcohol, a tertiary alcohol, or combinations thereof. Illustrative, but non-limiting, examples of alcohols include methanol, butanol, ethanol, propanol (e.g., 1-propanol and/or isopropanol), butanol (e.g., 1-butanol, isobutanol, 2-butanol, and/or tert-butanol), or combinations thereof.

The alcohol can be introduced to the permeate side of the membrane, the retentate side of the membrane, or both (e.g., sequentially in any order and/or any suitable number of times). The alcohol contacts the pores, sides, channels, and/or other surfaces of the membrane under a desired TMP for a selected amount of time so as to move the alcohol from the permeate side of the membrane to the retentate side of the membrane, and/or vice-versa. The TMP utilized during the alcohol flush can be about 1 bar or more or about 5 bar or less, such as from about 1 bar to about 5 bar, such as from about 1.25 bar to about 2.5 bar, such as from about 1.5 bar to about 2.25 bar, such as from about 1.75 bar to about 2 bar. In at least one embodiment, the TMP utilized during the alcohol flush is from about 1 bar to about 2.1 bar or from about to about 1 bar to about 2 bar. Higher or lower pressures used during the alcohol flush are contemplated. If the pressure applied to the alcohol is not high enough to push the alcohol through the membrane and to the permeate side of the membrane, and/or to push the alcohol through the membrane and to the retentate side of the membrane, additional transmembrane pressure can be supplied by, e.g., injecting compressed gas, as in a pressure filtration process, or by suction, as in an immersed membrane filtration process.

The alcohol flush can be performed at a temperature of about 80° C. or less, such as about 70° C. or less, such as about 60° C. or less, such as about 50° C. or less, such as from about 15° C. to about 45° C., such as from about 20° C. to about 40° C., such as from about 25° C. to about 35° C., such as from about 25° C. to about 30° C. or from about 30° C. to about 35° C. In at least one embodiment, the alcohol flush is performed at a temperature of about 15° C. to about 35° C., such as from about 20° C. to about 30° C., such as from about 20° C. to about 25° C. or from about 25° C. to about 30° C. Higher or lower temperatures for the alcohol flush are contemplated. Flushing with the alcohol can be performed for any suitable duration of time, such as about 30 seconds or more or about 48 h or less, such as about 24 h or less, such as about 12 h or less, such as about 5 h or less, such as from about 1 min to about 4 h, such as from about 10 min to about 3 h, such as from about 20 min to about 2.5 h, such as from about 30 min to about 2 h, such as from about 45 min to about 1.5 h, such as from about 1 h to about 1.25 h. Shorter or longer periods of time for the alcohol flush are contemplated. The pressure and temperature can be adjusted during flushing with the alcohol such that an initial temperature and pressure, one or more intermediate temperatures and pressures, and/or a final temperature and pressure can be selected. Flushing with the alcohol can be performed one or more times. In some embodiments, the alcohol used for flushing is removed from the system after one or more of the alcohol flushes by, e.g., draining and/or other normal use of the membrane.

In some examples, an alcohol is introduced to the permeate side of the membrane and pushed through the membrane to the retentate side of the membrane under the parameters discussed above and then an alcohol is introduced to the retentate side of the membrane and pushed through the membrane to the permeate side of the membrane under the parameters discussed above, and/or vice-versa, with or without removal of the alcohol.

In some embodiments, an optional water flush is performed after the alcohol flush. Water can be introduced to the retentate side of the membrane, the permeate side or the membrane, or both (e.g., sequentially in any order and/or any suitable number of times). The temperature, pressure, duration of time, and/or other parameters for the water flush can be those utilized for operation 260 described below. Flushing with water can be performed one or more times. In some embodiments, the water used for flushing is removed from the system after one or more of the flushes by, e.g., draining and/or other normal use of the membrane. After the optional water flush, the method 250 begins at operation 255.

After operation 255, the method 250 further includes flushing the membrane with water at operation 260. Operation 260 can be performed by introducing water on the retentate side of the membrane, the permeate side or the membrane, or both (e.g., sequentially in any order and/or any suitable number of times). The water contacts the pores, sides, channels, and/or other surfaces of the membrane under a desired TMP for a selected amount of time so as to move the water from the retentate side of the membrane to the permeate side of the membrane, and/or vice-versa. The TMP utilized during operation 260 can be about 1 bar or more or about 5 bar or less, such as from about 1 bar to about 5 bar, such as from about 1.25 bar to about 2.5 bar, such as from about 1.5 bar to about 2.25 bar, such as from about 1.75 bar to about 2 bar. In at least one embodiment, the TMP utilized during operation 260 is from about 1 bar to about 2.1 bar or from about to about 1 bar to about 2 bar. Higher or lower pressures used during operation 260 are contemplated. If the pressure applied to the water is not high enough to push the water through the membrane and to the permeate side of the membrane, and/or to push the water through the membrane and to the retentate side of the membrane, additional transmembrane pressure can be supplied by, e.g., injecting compressed gas, as in a pressure filtration process, or by suction, as in an immersed membrane filtration process.

Operation 260 can be performed at a temperature of about 80° C. or less, such as about 70° C. or less, such as about 60° C. or less, such as about 50° C., such as from about 15° C. to about 45° C., such as from about 20° C. to about 40° C., such as from about 25° C. to about 35° C., such as from about 25° C. to about 30° C. or from about 30° C. to about 35° C. In at least one embodiment, operation 260 is performed at a temperature of about 15° C. to about 35° C., such as from about 20° C. to about 30° C., such as from about 20° C. to about 25° C. or from about 25° C. to about 30° C. Higher or lower temperatures used during operation 260 are contemplated. Operation 260 can be performed for any suitable duration of time, such as about 30 seconds or more or about 48 h or less, such as about 24 h or less, such as about 12 h or less, such as about 5 h or less, such as about 3 h or less, such as from about 1 min to about 2.5 h, such as from about 10 min to about 2 h, such as from about 20 min to about 1.5 h, such as from about 30 min to about 1.25 h, such as from about 45 min to about 1 h. Shorter or longer durations of time for operation 260 are contemplated. The pressure and temperature can be adjusted during operation 260 such that an initial temperature and pressure, one or more intermediate temperatures and pressures, and/or a final temperature and pressure can be selected. Operation 260 can be performed one or more times, such as 1 time, 2 times, 3 times, or more. In some embodiments, the flushing with water of operation 260 is repeated until the water has a pH from about 6.5 to about 7.5 or until the pH of the water is less than about 7. In some embodiments, the water used for flushing is removed from the system after the one or more of the flushes by, e.g., draining and/or other normal use of the membrane.

In some examples, the water is introduced to the permeate side of the membrane and pushed through the membrane to the retentate side of the membrane under the parameters discussed above and then water is introduced to the retentate side of the membrane and pushed through the membrane to the permeate side of the membrane under the parameters discussed above, and/or vice-versa, with or without removal of the water.

The method 250 further includes flushing the membrane with a fluid containing an organic peroxide at operation 265. The organic peroxide can be in the form of a solution or suspension in an aqueous or organic solvent, or both. The fluid containing the organic peroxide is interchangeably referred to as an organic peroxide solution. The organic peroxide can have the structure:

$$R^4\!-\!O\!-\!O\!-\!R^5,$$

wherein:

$R^4$ is a $C_1$-$C_{40}$ unsubstituted hydrocarbyl (such as $C_1$-$C_{20}$ unsubstituted hydrocarbyl, such as $C_1$-$C_{10}$ unsubstituted hydrocarbyl, such as $C_1$-$C_6$ unsubstituted hydrocarbyl), a $C_1$-$C_{40}$ substituted hydrocarbyl (such as $C_1$-$C_{20}$ substituted hydrocarbyl, such as $C_1$-$C_{10}$ substituted hydrocarbyl, such as $C_1$-$C_6$ substituted hydrocarbyl), a $C_4$-$C_{100}$ unsubstituted aryl (such as $C_4$-$C_{40}$ unsubstituted aryl, such as $C_4$-$C_{20}$ unsubstituted aryl, such as $C_4$-$C_{10}$ aryl), or a $C_4$-$C_{100}$ substituted aryl (such as $C_4$-$C_{40}$ substituted aryl, such as $C_4$-$C_{20}$ substituted aryl, such as $C_4$-$C_{10}$ substituted aryl); and $R^5$ is hydrogen, a $C_1$-$C_{40}$ unsubstituted hydrocarbyl (such as $C_1$-$C_{20}$ unsubstituted hydrocarbyl, such as $C_1$-$C_{10}$ unsubstituted hydrocarbyl, such as $C_1$-$C_6$ unsubstituted hydrocarbyl), a $C_1$-$C_{40}$ substituted hydrocarbyl (such as $C_1$-$C_{20}$ substituted hydrocarbyl, such as $C_1$-$C_{10}$ substituted hydrocarbyl, such as $C_1$-$C_6$ substituted hydrocarbyl), a $C_4$-$C_{100}$ unsubstituted aryl (such as $C_4$-$C_{40}$ unsubstituted aryl, such as $C_4$-$C_{20}$ unsubstituted aryl, such as $C_4$-$C_{10}$ unsubstituted aryl), or a $C_4$-$C_{100}$ substituted aryl (such as $C_4$-$C_{40}$ substituted aryl, such as $C_4$-$C_{20}$ substituted aryl, such as $C_4$-$C_{10}$ substituted aryl).

The organic peroxide can be in the form of an organic peroxide ion when, e.g., in the organic peroxide solution. The organic peroxide solution can contain organic peroxide, organic peroxide ion, or both.

In some embodiments, the organic acid is a percarboxylic acid (or peroxy acid), $R^6CO_3H$, prepared from a mixture of a carboxylic acid, $R^6CO_2H$, and hydrogen peroxide. $R^6$ can include those unsubstituted hydrocarbyls, substituted hydrocarbyls, unsubstituted aryls, and substituted aryls listed above for $R^4$ and/or $R^5$. In at least one embodiment, the organic peroxide is chosen such that it has an oxidation potential greater than hydrogen peroxide, e.g., greater than about 1.76 V.

Each of $R^4$, $R^5$, and $R^6$ is, independently, saturated or unsaturated, linear or branched, cyclic or acyclic, aromatic or non-aromatic. In some embodiments, and when one or more of $R^4$, $R^5$, or $R^6$ is, independently, a substituted hydrocarbyl or a substituted aryl, at least one carbon of the substituted hydrocarbyl or the substituted aryl has been substituted with at least one heteroatom or heteroatom-containing group, such as one or more elements from Group 13-17 of the periodic table of the elements, such as halogen (F, Cl, Br, or I), O, N, Se, Te, P, As, Sb, S, B, Si, Ge, Sn, Pb, and the like, such as $NR^*_2$, $OR^*$ (e.g., OH or $O_2H$), $SeR^*$, $TeR^*$, $PR^*_2$, $AsR^*_2$, $SbR^*_2$, $SR^*$, $SO_x$ (where x=2 or 3), $BR^*_2$, $SiR^*_3$, $GeR^*_3$, $SnR^*_3$, $PbR^*_3$, and the like or where at least one heteroatom has been inserted within the hydrocarbyl radical or aryl radical such as one or more of halogen (Cl, Br, I, F), O, N, S, Se, Te, $NR^*$, $PR^*$, $AsR^*$, $SbR^*$, $BR^*$, $SiR^*_2$, $GeR^*_2$, $SnR^*_2$, $PbR^*_2$, and the like, where $R^*$ is, independently, hydrogen, hydrocarbyl (e.g., $C_1$-$C_{10}$), or two or more $R^*$ may join together to form a substituted or unsubstituted completely saturated, partially unsaturated, fully unsaturated, or aromatic cyclic or polycyclic ring structure.

In some embodiments, the organic peroxide is made from a mixture of hydrogen peroxide and an organic acid, such as a substituted or unsubstituted, branched or unbranched, cyclic or acyclic, aromatic or non-aromatic $C_1$-$C_{40}$ organic acid. The hydrogen peroxide ($H_2O_2$) utilized can be in the form of an aqueous solution, such as, e.g., about 50 wt % $H_2O_2$ or less solution in water such as about 20 wt % $H_2O_2$ to about 40 wt % $H_2O_2$ solution in water. The organic peroxide is generated upon introduction of the organic acid to hydrogen peroxide. For example, introduction of acetic acid to $H_2O_2$ generates peracetic acid ($CH_3CO_3H$), and introduction of formic acid to $H_2O_2$ generates performic acid ($CH_2O_3$). An excess amount of the organic acid to the $H_2O_2$, or vice-versa, can be used to generate the organic peroxide.

The organic peroxide can be prepared in any suitable manner, such as by mixing, stirring, or otherwise agitating the organic acid with hydrogen peroxide. Illustrative, but non-limiting, examples of organic acids include acetic acid, formic acid, benzoic acid, triflouroacetic acid, propionic acid, or combinations thereof. In at least one embodiment, the organic peroxide can be purchased and used directly, or diluted with water and/or organic solvent and then used.

In at least one embodiment, a concentration of organic peroxide in the fluid (the organic peroxide solution) used for the flushing process of operation 265 is from about 10% to about 80% by volume, such as from about 20% to about 70% by volume, such as from about 30% to about 60% by volume, such as from about 40% to about 50% by volume.

Operation 265 can be performed by introducing the organic peroxide solution on the permeate side of the membrane, the retentate side of the membrane, or both (e.g., sequentially in any order and/or any suitable number of times). The organic peroxide solution contacts the pores, sides, channels, and/or other surfaces of the membrane under a desired transmembrane pressure (TMP) for a selected amount of time so as to move the organic peroxide from the permeate side of the membrane to the retentate side of the membrane, and/or vice-versa. The TMP utilized during operation 265 can be about 1 bar or more or about 5 bar or less, such as from about 1 bar to about 5 bar, such as from about 1.25 bar to about 2.5 bar, such as from about 1.5 bar to about 2.25 bar, such as from about 1.75 bar to about 2 bar. In at least one embodiment, the TMP utilized during operation 265 is from about 1 bar to about 2.1 bar or from about to about 1 bar to about 2 bar. Higher or lower pressures used during operation 265 are contemplated. If the pressure applied to the organic peroxide solution is not high enough to push the organic peroxide solution through the membrane and to the retentate side of the membrane, and/or to push the organic peroxide solution through the membrane and to the permeate side of the membrane, additional transmembrane pressure can be supplied by, e.g., injecting compressed gas, as in a pressure filtration process, or by suction, as in an immersed membrane filtration process.

Operation 265 can be performed at a temperature of about 80° C. or less, such as about 75° C. or less, such as about 70° C. or less, such as about 65° C. or less, such as from about 5° C. to about 50° C., such as from about 10° C. to about 45° C., such as from about 15° C. to about 40° C., such as from about 20° C. to about 35° C. or from about 25° C. to about 30° C. In at least one embodiment, operation 265 is performed at a temperature of about 5° C. to about 30° C., such as from about 5° C. to about 27° C., such as from about 10° C. to about 25° C., such as from about 15° C. to about 20° C. Higher or lower temperatures used during operation 265 are contemplated. Operation 265 can be performed for any suitable duration of time, such as about 30 seconds or more or about 48 h or less, about 24 h or less or about 12 h or less, such as from about 10 min to about 24 h, such as from about 30 min to about 12 h, such as from about 1 h to about 6 h, such as from about 2 h to about 4 h. In at least one embodiment, operation 265 is performed for a period of time of about 48 h or less, such as about 2 h to about 48 h. Shorter or longer durations of time for operation 265 are contemplated. The pressure and temperature can be adjusted during operation 265 such that an initial temperature and pressure, one or more intermediate temperatures and pressures, and/or a final temperature and pressure can be selected. Operation 265 can be performed one or more times such that there are one or more organic peroxide solution flushes. In some embodiments, the organic peroxide solution is removed from the system after one or more of the flushes by, e.g., draining and/or other normal use of the membrane.

In some examples, the organic peroxide solution is introduced to the permeate side of the membrane and pushed through the membrane to the retentate side of the membrane under the parameters discussed above and then an organic peroxide solution can be introduced to the retentate side of the membrane and pushed through the membrane to the permeate side of the membrane under the parameters discussed above, and/or vice-versa, with or without removal of the organic peroxide solution.

The method 250 further includes flushing the membrane with water at operation 270. Operation 270 can be performed in the same, or a similar, manner as operation 260. Operation 270 can be performed one or more times, such as 1 time, 2 times, 3 times, or more. The water used for flushing can be removed from the system after one or more of the flushes as described above in operation 260.

After operation 270, the membrane is clean, regenerated, reactivated, or otherwise ready for use, and filtration of wastewater or other feeds can be resumed. After performing one or more operations of the method, the specific membrane flux improves. In some embodiments, the specific membrane flux of the membrane increases by about 10% or more, such as about 20% or more, such as about 30% or more, such as about 40% or more or more relative to a used functionalized membrane or a used unfunctionalized membrane. The specific membrane flux is the amount of permeate produced per unit area of membrane surface per unit time. The specific membrane flux is measured by measuring the amount of water that passes through the membrane over a given time and a given pressure. As an example, a used functionalized membrane has a specific membrane flux prior to treatment by methods described herein of about 190 LMH/bar and a specific membrane flux of a used functionalized membrane after treatment by one or more operations of methods described herein is about 460 LMH/bar. In this example, the specific membrane flux after treatment is about 2.4 times that of the membrane before treatment, which represents a 142% increase. Higher or lower increases in specific membrane flux are contemplated.

The methods described herein can be utilized with a variety of porous membranes having, e.g., variable sizes, shapes, forms, chemical makeups, surface functionality, etc. For example, the porous membranes can be, or be derived from, aluminum materials (e.g., alumina ($Al_2O_3$ and/or alumoxane), titanium materials (e.g., titania ($TiO_2$)), zirconium materials (e.g., $ZrO_2$), derivatives thereof, or combinations thereof. The use of other ceramic materials, as well as polymeric membranes, are also contemplated. The porous membranes can be functionalized with one or more hydrophilic molecules. Illustrative, but non-limiting, examples of hydrophilic molecules include carboxylic acids, acidic molecules, basic molecules, zwitterrionic molecules, phenyl amines, phenyl amidines (e.g., 1,3-diphenylamidine), amino pyridines (e.g., methylaminopyridine), and combinations thereof. In some embodiments, the carboxylic acid has the general formula $R^7CO_2H$, where $R^7$ is a hydrophilic functional group. Illustrative, but non-limiting, examples of carboxylic acids include cysteic acid, 3,5-diiodotyrosine, trans-fumaric acid, malonic acid, octanoic acid, stearic acid, 3,5-dihydroxybenzoic acid, parahydroxybenzoic acid, derivatives thereof, and combinations thereof. The porous membranes can have pore sizes from about 0.1 μm in diameter to about 10 μm in diameter, such as from about 0.1 μm in diameter to about 1 μm in diameter, such as from about 0.14 μm in diameter to about 1.4 μm in diameter. Pore sizes greater than about 10 m in diameter or less than about 0.1 μm in diameter are also contemplated. In some embodiments, the porous membrane includes one or more layers such as from about 1 to about 10 layers, such as from about 2 to about 8 layers, such as from about 3 to about 7 layers, such as from about 4 to about 6 layers. Porous membranes having a greater number of layers are also contemplated. In at least one embodiment, the porous membrane is cylindrical, substantially cylindrical, flat, substantially flat, circular, or substantially circular, though other shapes are contemplated. In some embodiments, the porous membrane is in the form of nanoparticles, though other forms are contemplated. The length of the porous membrane is also variable, and in some embodiments, the porous membrane has a length of about 1 centimeter (cm) or more or about 2 meters (m) or less, such as from about 10 cm to about 1.5 m, such as from about 25 cm to about 1 m or from about 12 cm to about 0.5 m. Porous membranes having larger or smaller lengths are contemplated. The diameter of the porous membrane can be about 1 cm or more or about 5 m or less, such as from about 2.5 cm to about 4 m, such as from about 10 cm to about 3 m, such as from about 50 cm to about 2 m. Larger or smaller diameters of the porous membranes are contemplated. Porous membranes that can be treated and/or cleaned by embodiments described herein include, e.g., membranes used in treating water contaminated with components such as hydrocarbons, bacteria, or other impurities.

The aforementioned list of properties of the porous membranes is not intended to limit the scope of the embodiments described herein as the treatment methods described herein are useful for other suitable porous membranes.

The following examples are put forth so as to provide those of ordinary skill in the art with a complete disclosure and description of how to make and use embodiments of the present disclosure, and are not intended to limit the scope of embodiments of the present disclosure. Further, while the membranes utilized for the examples are cysteic acid functionalized membranes, it will be appreciated that the disclosure may be applied to other membranes functionalized with hydrophilic molecules. In addition, efforts have been made to ensure accuracy with respect to numbers used (e.g. amounts, dimensions, etc.) but some experimental errors and deviations should be accounted for.

EXAMPLES

Characterization

SEM images and the associated energy dispersive X-ray (EDX) analysis were obtained with a Hitachi TM3000 TableTop Scanning Electron Microscope. Various images were collected at different magnifications at an acceleration voltage of 15 kV.

Elemental analysis was performed using XPS. The XPS spectra were obtained using a Kratos Axis Supra™ (Kratos Analytical, Japan) equipped with a monochromatic Al-Kα X-ray source (Kα 1486.58 eV), 15 mA emission current, magnetic hybrid lens, and slot aperture. Region scans were performed using a pass energy of 40 eV and step size of 0.1 eV. Peak fitting of the narrow region spectra was performed using a Shirley type background, and the synthetic peaks were of a mixed Gaussian-Lorentzian type (GL30). Adventitious carbon sp3 signal was used to calibrate XPS, which was assumed to have a binding energy of 284.8 eV.

Proton Nuclear Magnetic Resonance ($^1H$ NMR) data was obtained on a Bruker AV-500 Avance III™ 500 MHz spectrometer using deuterium oxide ($D_2O$) as a solvent. Analysis of a Used Membrane without Treatment A single membrane, with dimensions of 1.2 m long, 52 mm diameter, and a nominal pore size of 0.1 μm (Atech Innovations Gmbh, Germany) was functionalized according to U.S. Pat. No. 9,242,876. Briefly, the membrane was placed into vertical glass tube reactor with dimensions of 1.35 m long, 60 mm diameter. Then the reactor was filled with approximately 4.5 L of 1 M cysteic acid solution until whole membrane was covered by liquid. The vacuum was applied to the whole system using an adapter with septum stopper and a stainless steel needle (0.5 mm) until the solution stopped bubbling. A Liebig condenser was then connected to the adapter and the solution was refluxed at 90° C. for 19 hours. The reactor was heated using silicone rubber heating tape with a PID temperature controller. After the reaction, the reactor was allowed to cool down to about room temperature and membrane was extracted. The membrane was then washed overnight in a flowing water bath and then air dried for another day.

Figure 3A:
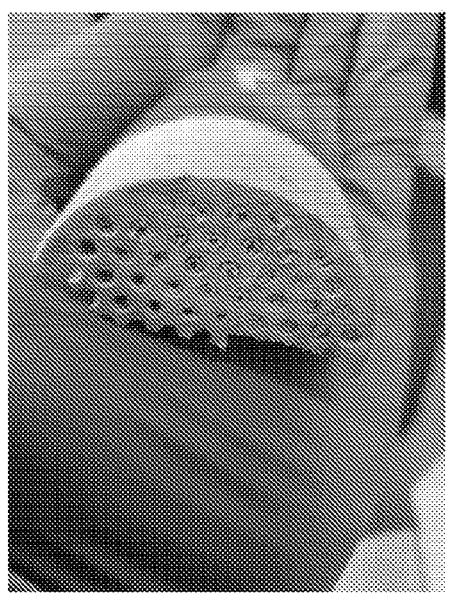
FIG. 3A is an exemplary photographic image of a portion of a used membrane.

This cysteic acid functionalized membrane was then placed in a filtration system to treat, e.g., produced water from oil and gas extraction. After treating the produced water, the used, contaminated membrane was broken into chunks (or portions) and the portions were subjected to various characterization techniques for analysis. FIG. 3A is a photographic image of the used cysteic acid functionalized membrane after breaking into chunks.

Figure 3B:
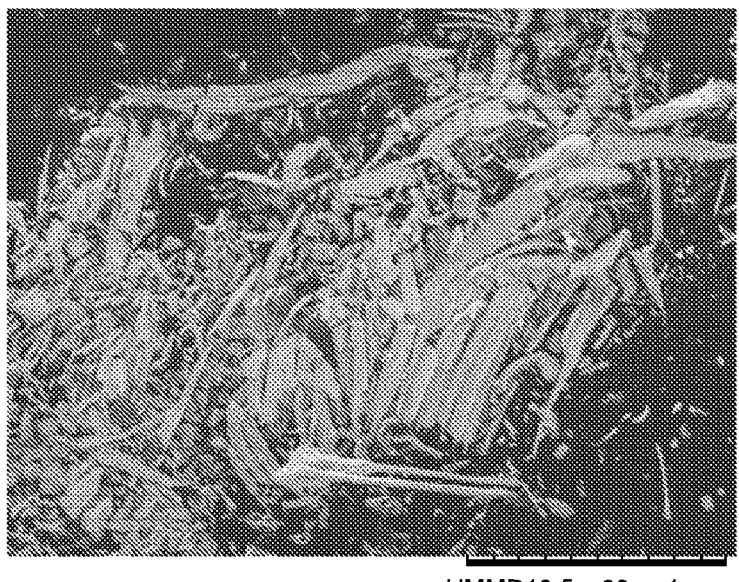
FIG. 3B is an exemplary scanning electron microscope (SEM) image of the physical deposit on the channels of a used membrane.

FIG. 3B shows an SEM image of the physical deposit on the channels of the used membrane. Table 1 shows the elemental composition of this physical deposit as determined by EDX analysis. The EDX analysis indicates that the physical deposit on the membrane is a mixture of salt, mainly NaCl, and an organic material.

TABLE 1

| Element | Composition (%) |
|---|---|
| C | 77.48 |
| N | — |
| O | 1.69 |
| Na | 10.59 |
| Mg | 0.00 |
| Al | 0.36 |
| S | — |
| Cl | 9.88 |

Figures 4A, 4B, 4C, 4D:
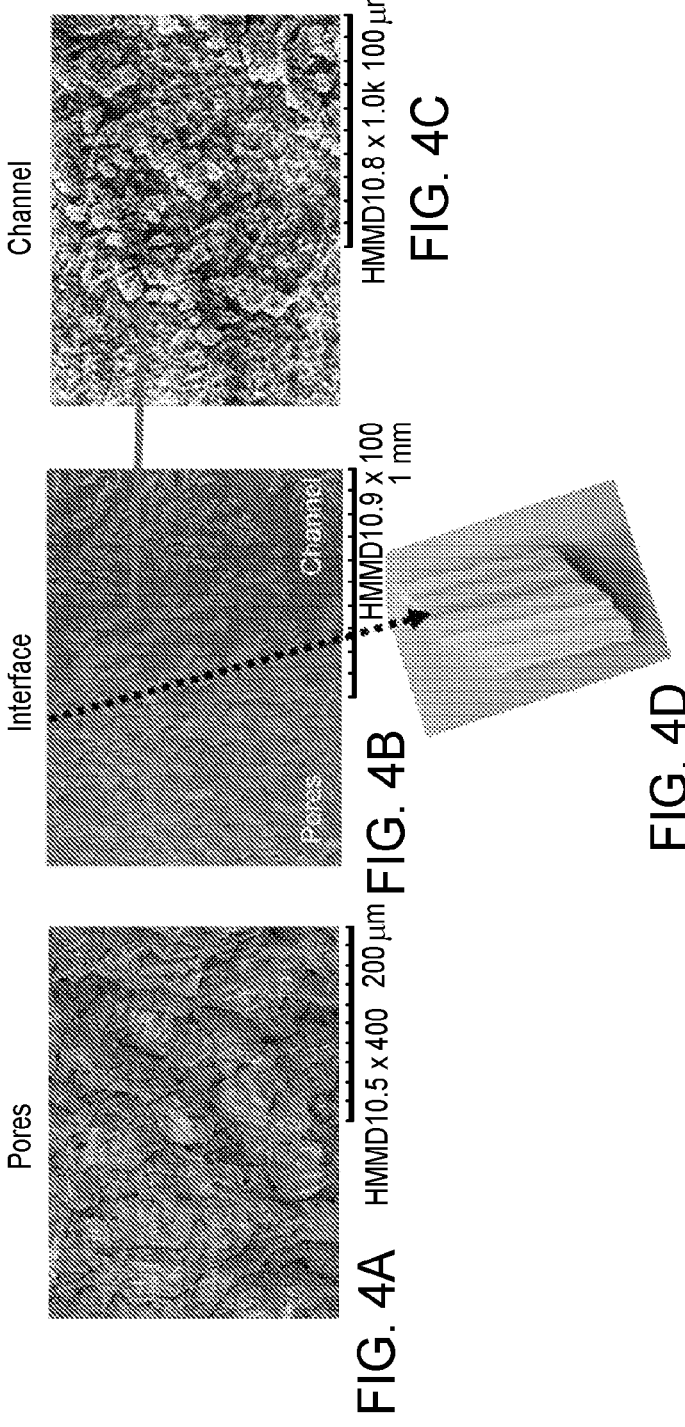
FIG. 4A is an exemplary SEM image of the pores of a used membrane.
FIG. 4B is an exemplary SEM image of the interface between the pores and channels of a used membrane.
FIG. 4C is an exemplary SEM image of the channels of a used membrane.
FIG. 4D is an exemplary photograph of a portion of a used membrane.
Figure 5A:
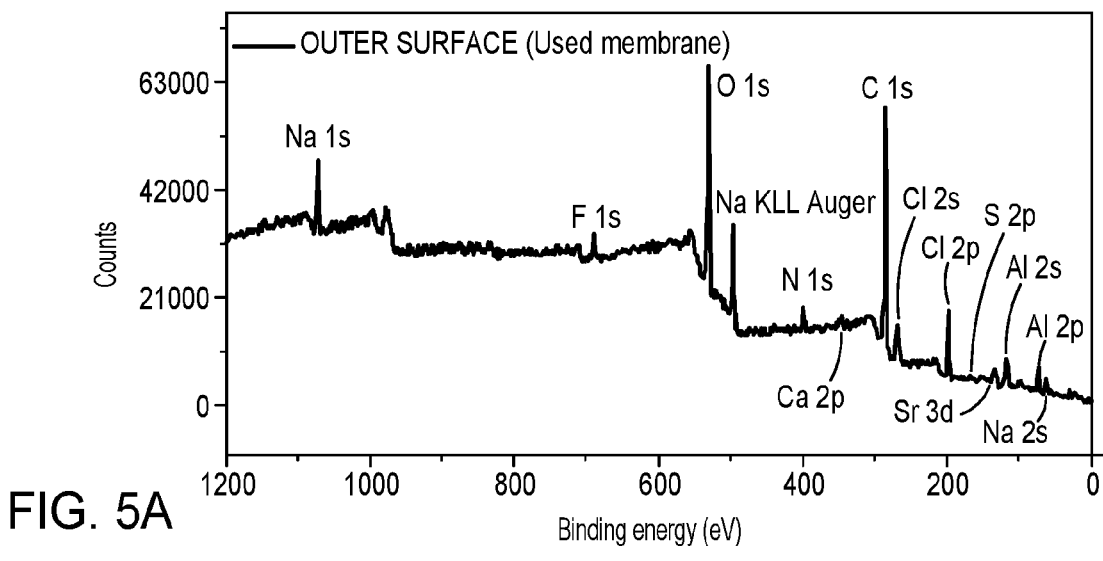
FIG. 5A is an exemplary survey X-ray photoelectron spectroscopy (XPS) spectrum of the outer surface of a used membrane.
Figure 5B:
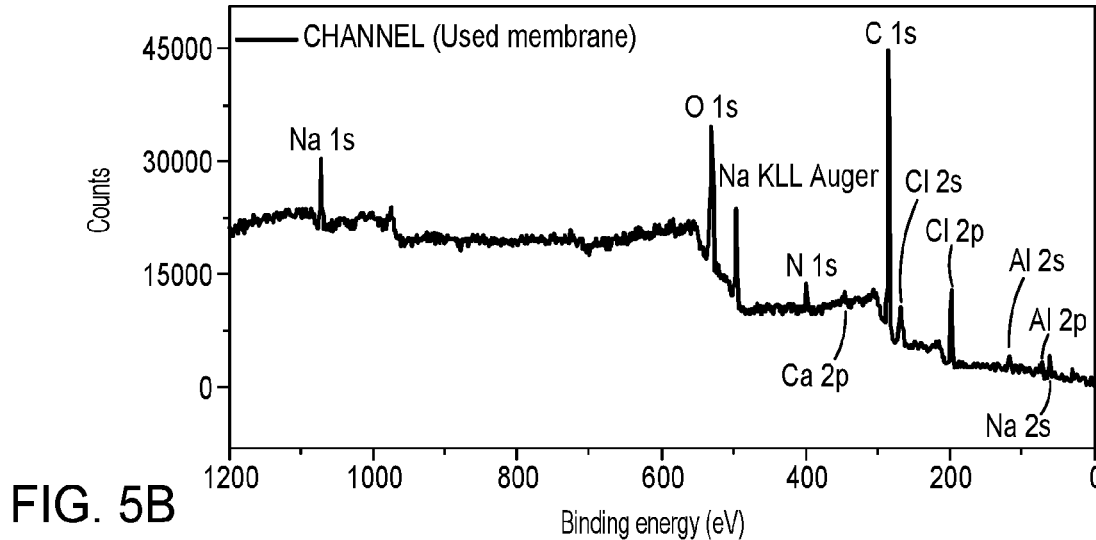
FIG. 5B is an exemplary survey XPS spectrum of the channels of a used membrane.
Figure 5C:
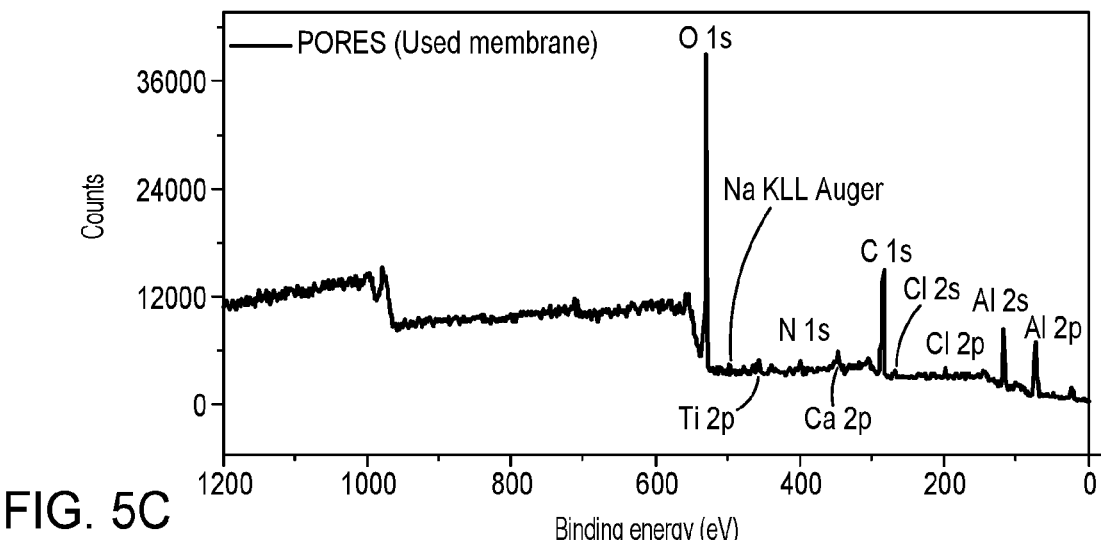
FIG. 5C is an exemplary survey XPS spectrum of the pores of a used membrane.

After removal of the deposit from the used membrane, the membrane was broken into pieces so that the channels, the pores, and the interface between the channels and the pores could be analyzed. FIGS. 4A-4C show selected SEM images of different locations—the pores, the interface, and the channel—of the used membrane (FIG. 4D). FIG. 5A, FIG. 5B, and FIG. 5C shows survey XPS spectra on the outer surface of the used membrane, the channel of the used membrane, and the pores of the used membrane, respectively. Table 2 shows the elemental composition in the three different locations as determined by EDX.

TABLE 2

| | Composition (%) | | |
|---|---|---|---|
| Element | Used membrane (channel) | Used membrane (interface) | Used membrane (pores) |
| C | 38.27 | 16.18 | 12.95 |
| N | 2.97 | 2.95 | 6.02 |
| O | 38.39 | 53.21 | 54.95 |
| Na | 2.07 | 1.33 | 0.10 |
| Mg | 0.04 | 0.55 | — |

TABLE 2-continued

| | Composition (%) | | |
|---|---|---|---|
| Element | Used membrane (channel) | Used membrane (interface) | Used membrane (pores) |
| Al | 15.22 | 24.10 | 25.73 |
| S | 0.11 | 0.02 | 0.01 |
| Cl | 1.67 | 1.53 | 0.08 |
| Ca | 0.11 | 0.03 | — |
| Fe | 1.03 | 0.10 | — |
| Si | 0.12 | — | — |

The data indicated that the deposit is a mixture of salt, mainly NaCl, and an organic material. Such salt crystals in the channels can be seen in the SEM image of FIG. 4C. The XPS spectra and EDS analysis (Table 2) further indicated significant residual carbon contamination in the channels, and reduced signals for the N and S that is characteristic of the cysteic acid functionality.

Figures 6A, 6B, 6C:
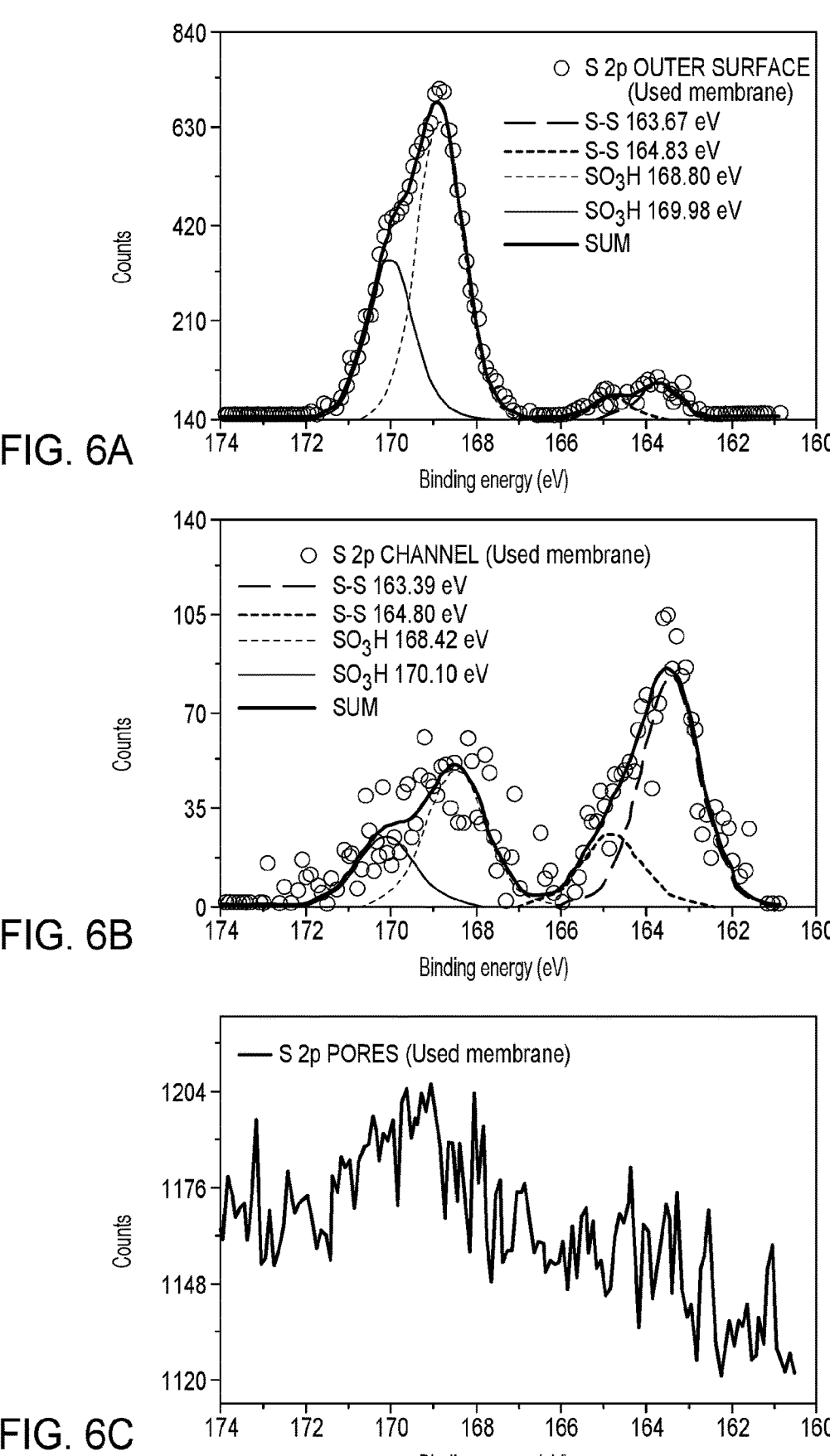
FIG. 6A is an exemplary high resolution S 2p XPS spectrum of the outer surface of a used membrane.
FIG. 6B is an exemplary high resolution S 2p XPS spectrum of the channels of a used membrane.
FIG. 6C is an exemplary high resolution S 2p XPS spectrum of the pores of a used membrane.
Figures 7A, 7B, 7C:
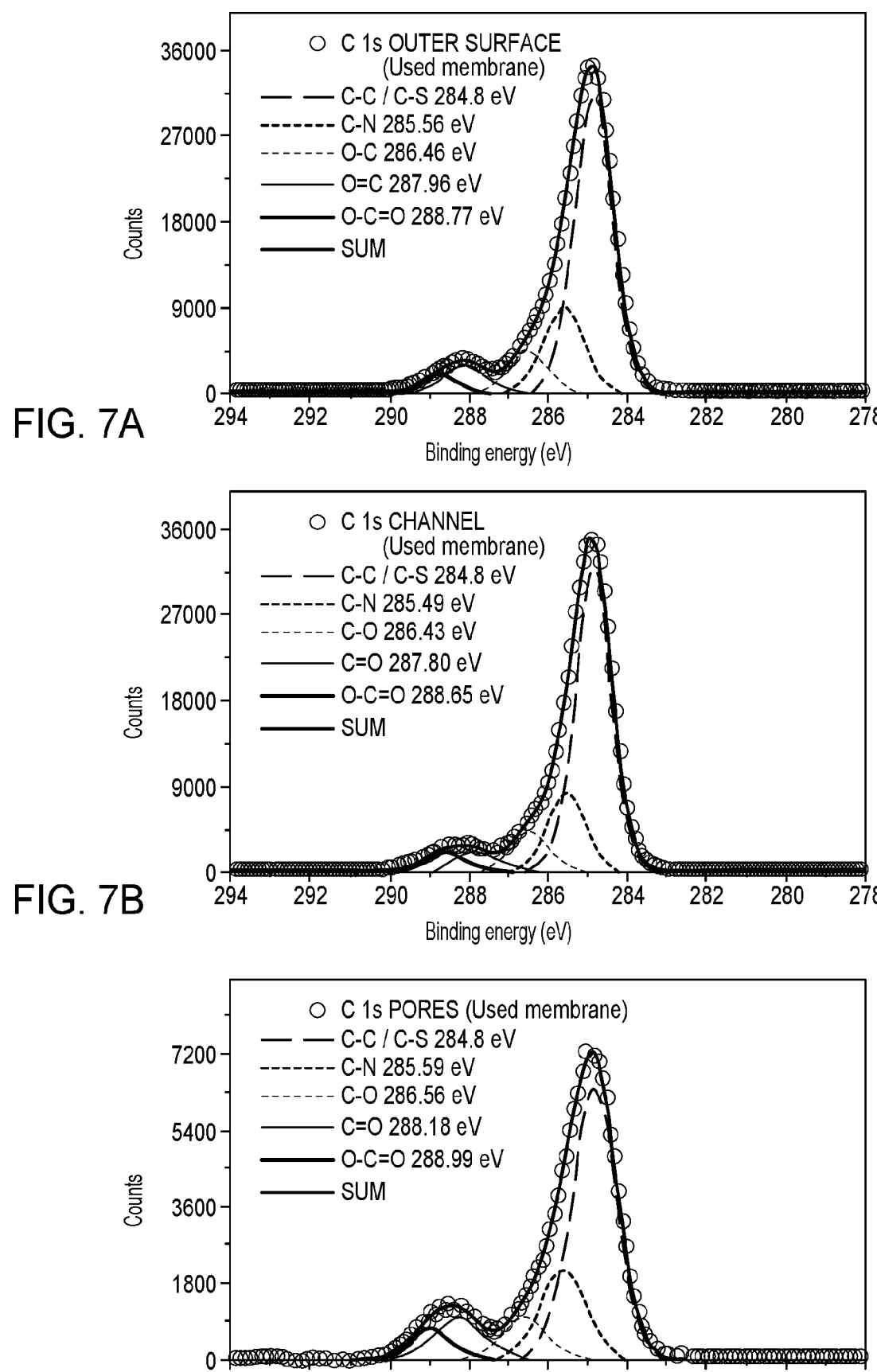
FIGS. 7A-7C are exemplary deconvoluted high resolution C 1s XPS spectra of the outer surface, the channels, and the pores of a used membrane, respectively.
Figures 7D, 7E, 7F:
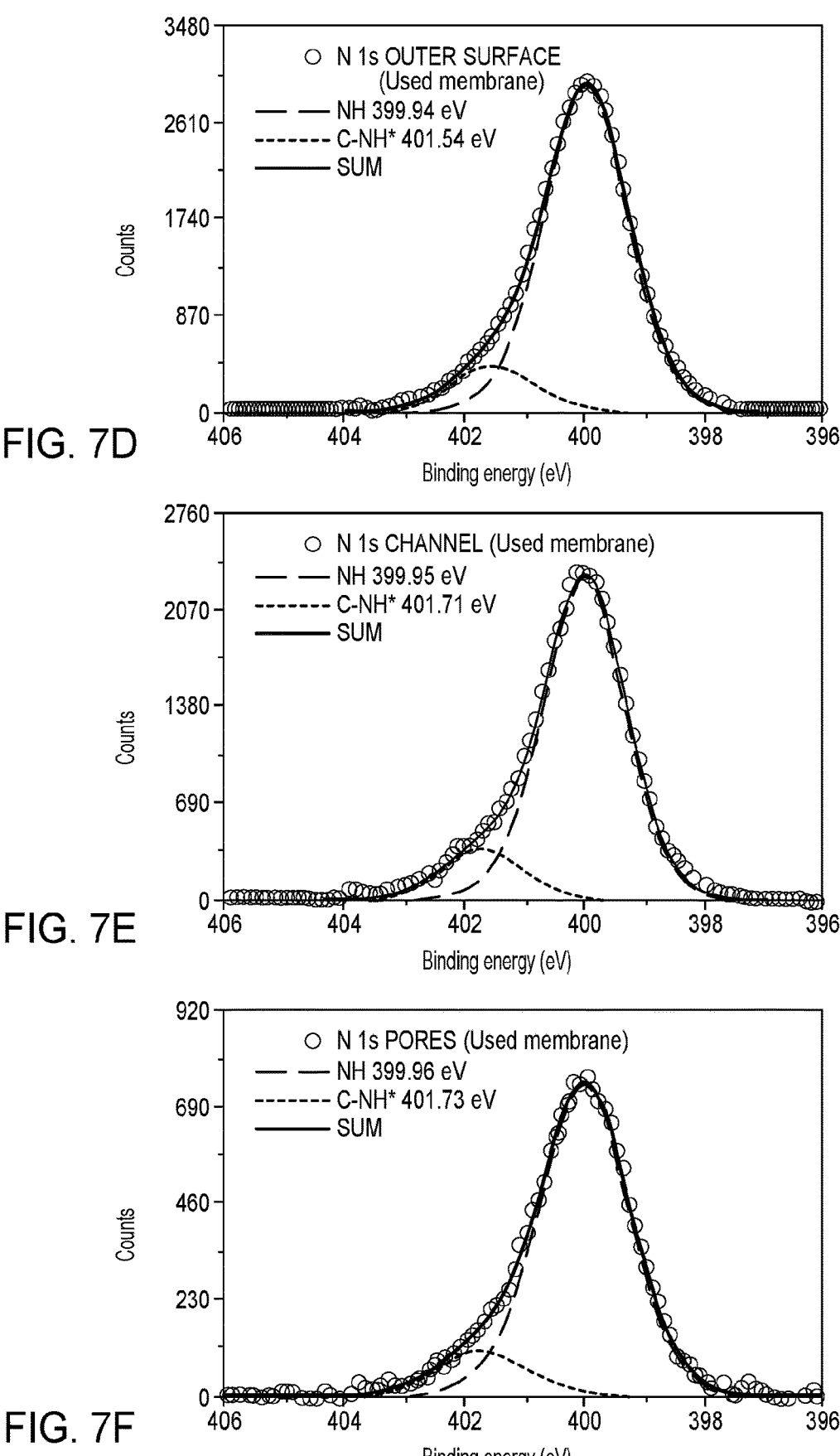
FIGS. 7D-7F are exemplary deconvoluted high resolution N 1s XPS spectra of the outer surface, the channels, and the pores of a used membrane, respectively.
Figures 7G, 7H, 7I:
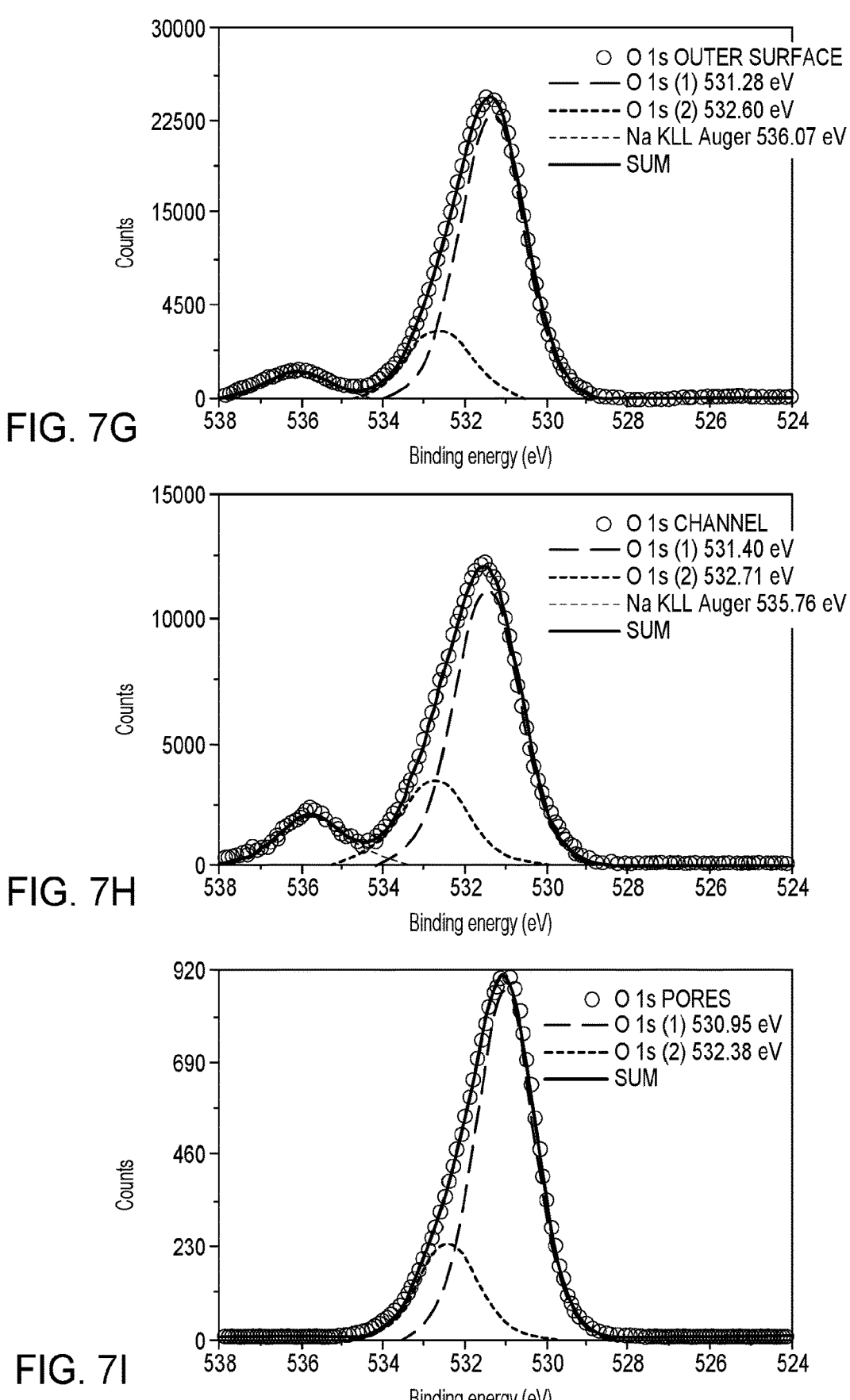
FIGS. 7G-7I are exemplary deconvoluted high resolution O 1s XPS spectra of the outer surface, the channels, and the pores of a used membrane, respectively.

FIG. 6A, FIG. 6B, and FIG. 6C show high resolution S 2p XPS spectra on the outer surface, the channel, and the pores of the used membrane, respectively. The XPS spectrum of FIG. 6A indicated that the outer surface of the membrane, which was not in direct contact with the static, contaminated water, contains predominately sulfonate groups as expected from the presence of cysteic acid. In contrast, the XPS spectrum of the channel (FIG. 6B) indicated that predominant sulfur species had been reduced. This species was not elemental sulfur since washing with carbon disulfide, in which sulfur is very soluble, did not result in the removal of the reduced species. The signal-to-noise of the pore region was not sufficient to determine the composition with certainty; however, the shape of the signal suggests that sulfonates are the predominant species. Accordingly, it appeared that the cysteic acid functional groups in the channel of the membrane had been converted to sulfides or disulfides (FIG. 1B) in the presence of bacteria in the produced water.

FIGS. 7A-7I show deconvoluted C 1s, N 1s, and O 1s XPS spectra of the outer surface, the channel, and the pores of the used membrane. The data represented in FIG. 7D, FIG. 7E, and FIG. 7F indicated that mostly deprotonated nitrogen species are present on the membrane surface. The sulfonic group is a proton donating group in cysteic acid molecule when the carboxylic group is anchored to the surface of alumina. This implies that the sulfonic group is either in a reduced state and/or coordinated to another metal ion (e.g., $Ca^{2+}$ and $Sr^{2+}$), which reduces the availability and mobility of protons over the surface.

Chemical Treatments on the Used Membrane

Figure 8A:
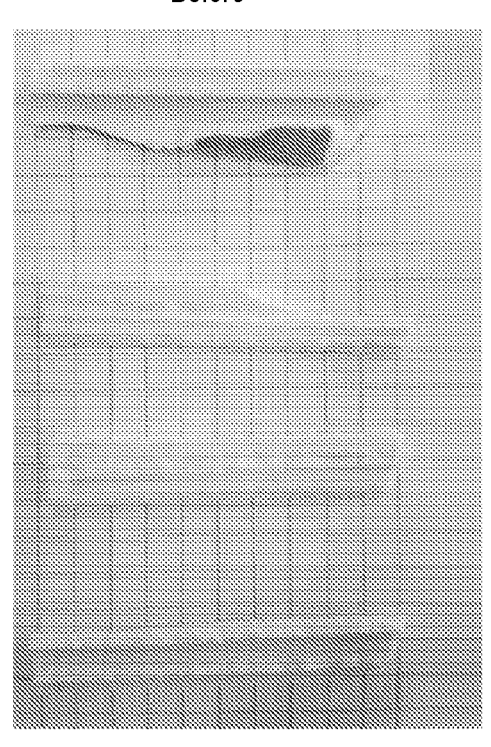
FIG. 8A is an exemplary photograph of portions of a used membrane.
Figure 8B:
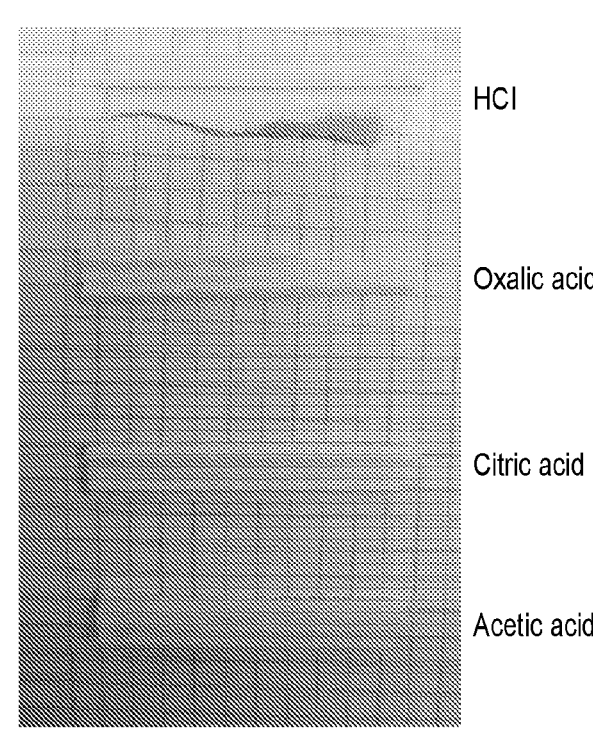
FIG. 8B is an exemplary photograph of the portions of the used membrane shown in FIG. 8A after an acid wash according to at least one embodiment.
Figures 9A, 9B, 9C:
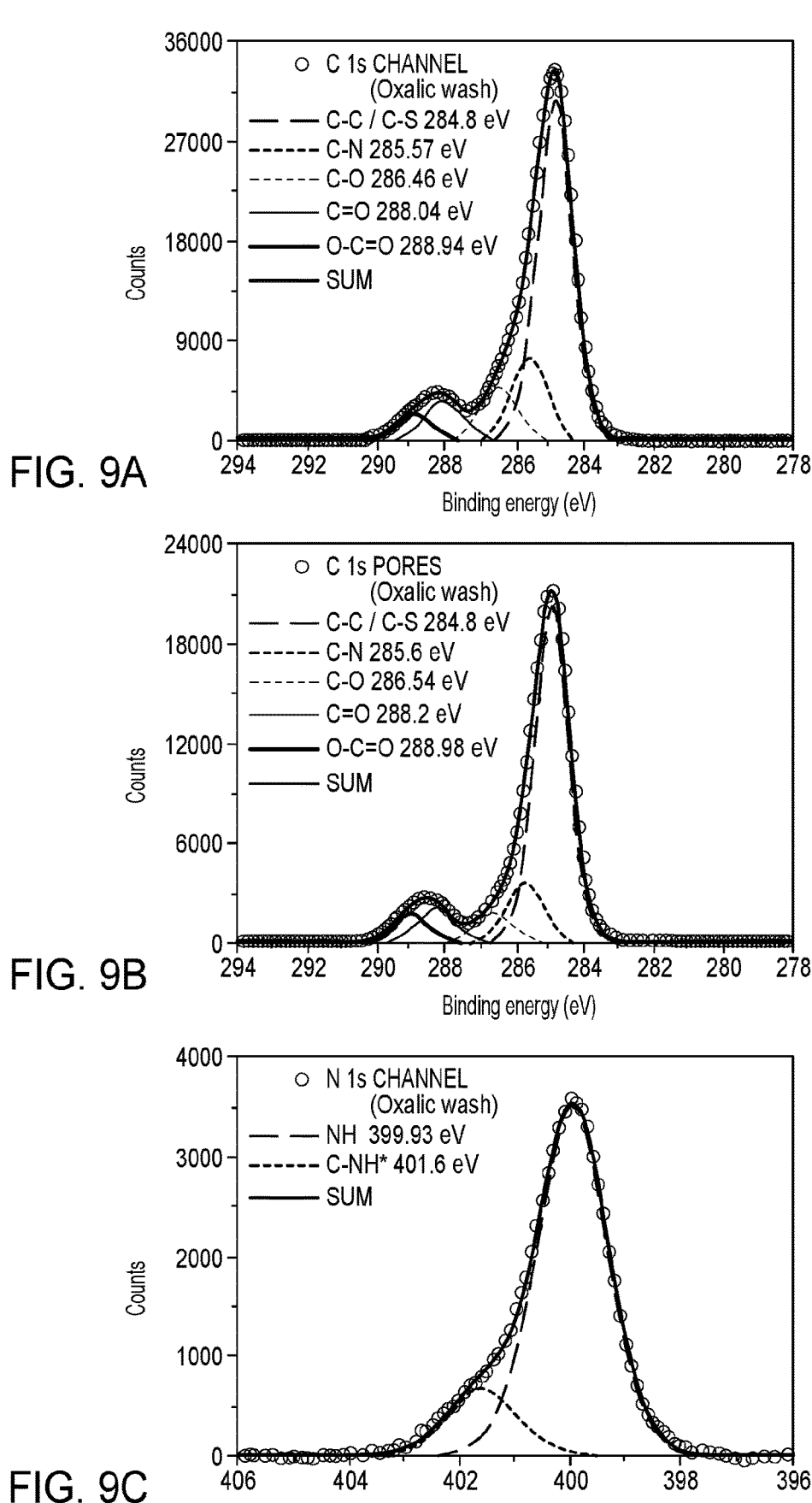
FIGS. 9A and 9B are exemplary deconvoluted high resolution C 1s XPS spectra of the channels and pores of a used membrane, respectively, after washing with oxalic acid according to at least one embodiment.
FIGS. 9C and 9D are exemplary deconvoluted high resolution N 1s XPS spectra of the channels and pores of a used membrane, respectively, after washing with oxalic acid according to at least one embodiment.
Figures 9D, 9E, 9F:
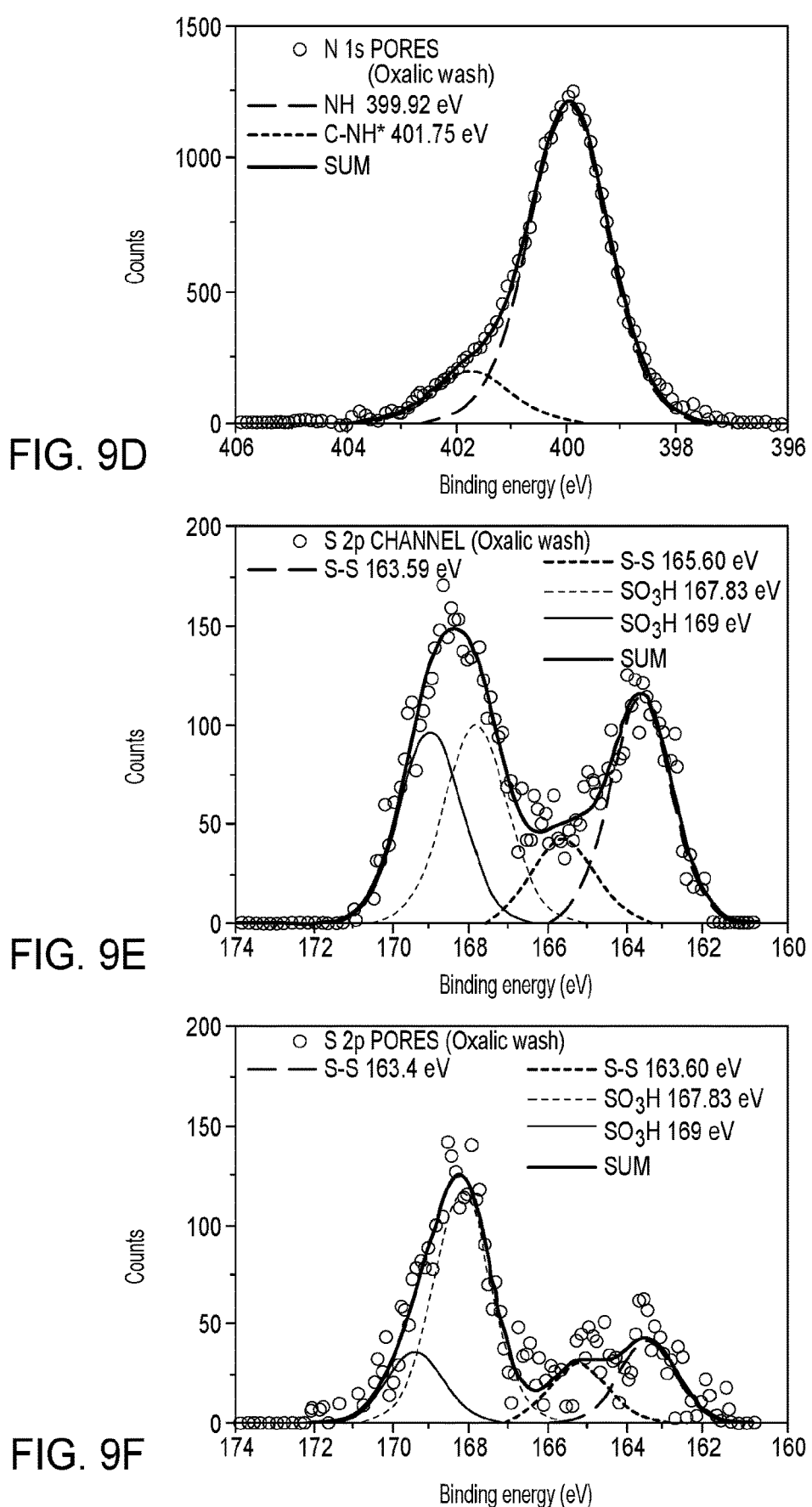
FIGS. 9E and 9F are exemplary deconvoluted high resolution S 2p XPS spectra of the channels and pores of a used membrane, respectively, after washing with oxalic acid according to at least one embodiment.
Figure 9G:
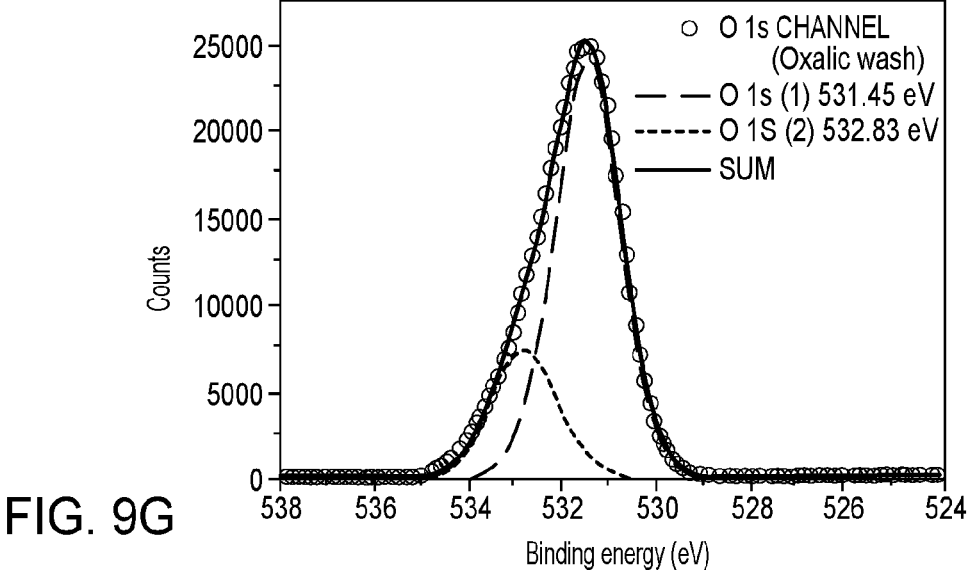
FIGS. 9G and 9H are exemplary deconvoluted high resolution O 1s XPS spectra of the channels and pores of a used membrane, respectively, after washing with oxalic acid according to at least one embodiment.
Figure 9H:
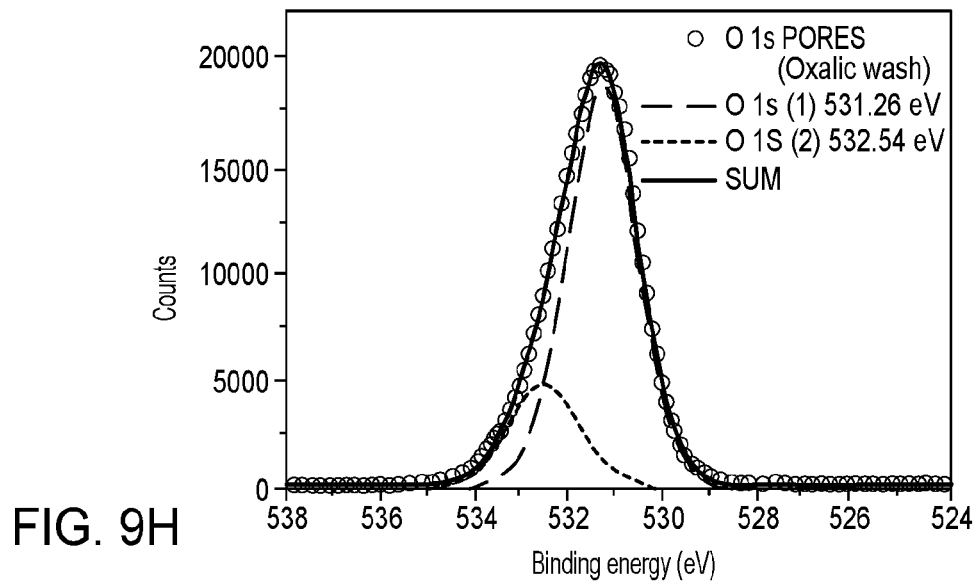
Figures 10A, 10B, 10C:
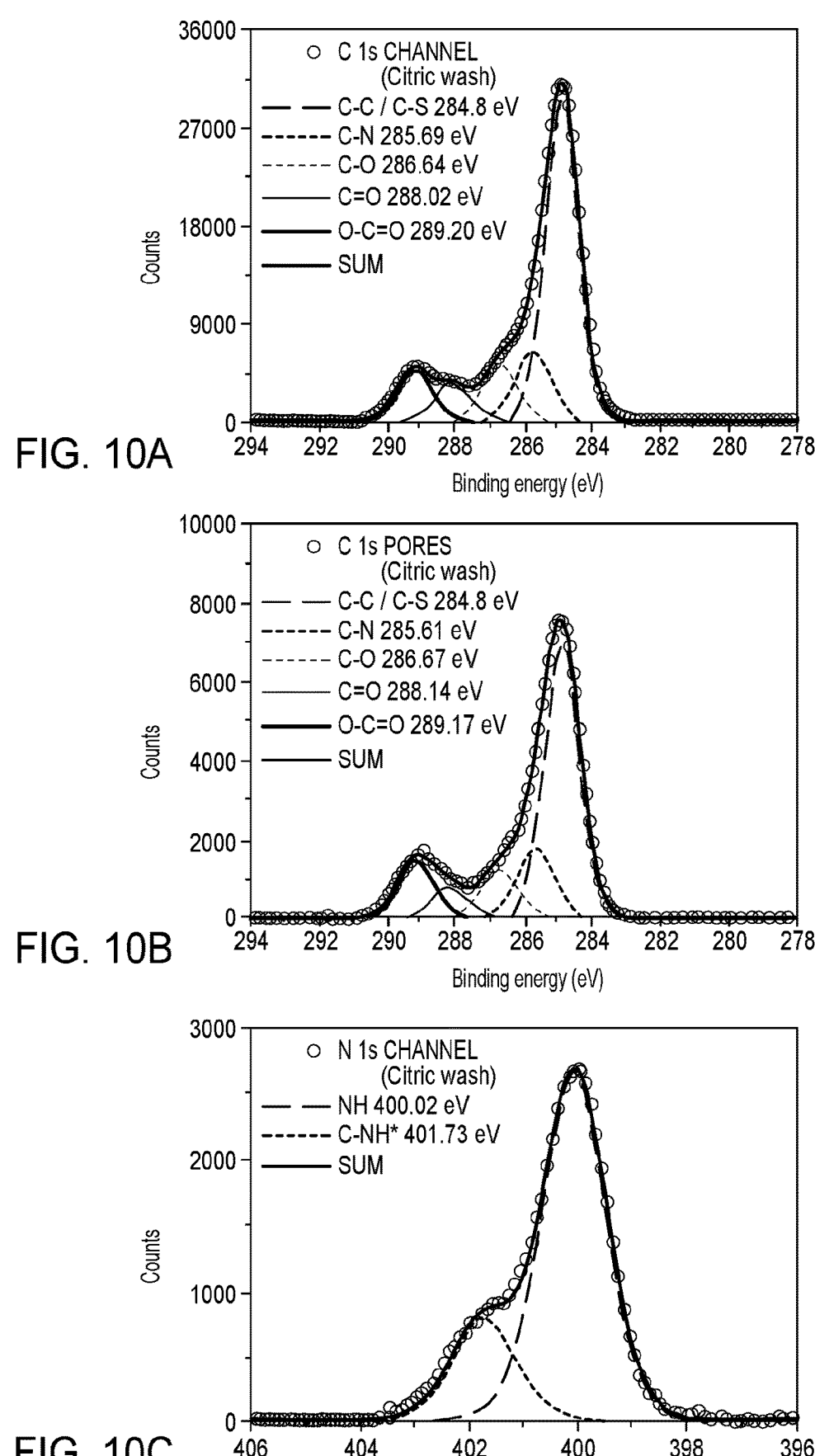
FIGS. 10A and 10B are exemplary deconvoluted high resolution C 1s XPS spectra of the channels and pores of a used membrane, respectively, after washing with citric acid according to at least one embodiment.
FIGS. 10C and 10D are exemplary deconvoluted high resolution N 1s XPS spectra of the channels and pores of a used membrane, respectively, after washing with citric acid according to at least one embodiment.
Figures 10D, 10E, 10F:
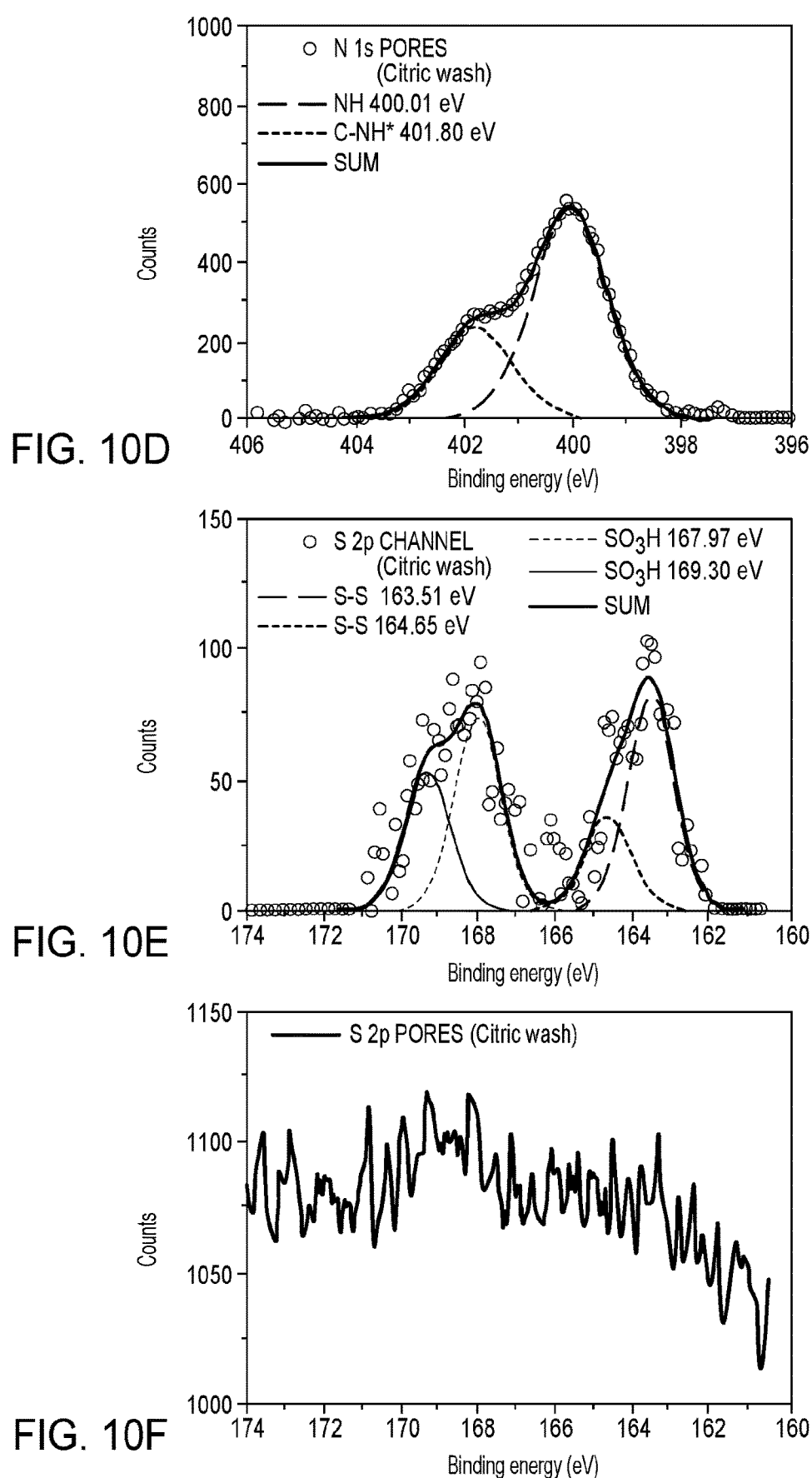
FIGS. 10E and 10F are exemplary deconvoluted high resolution S 2p XPS spectra of the channels and pores of a used membrane, respectively, after washing with citric acid according to at least one embodiment.
Figure 10G:
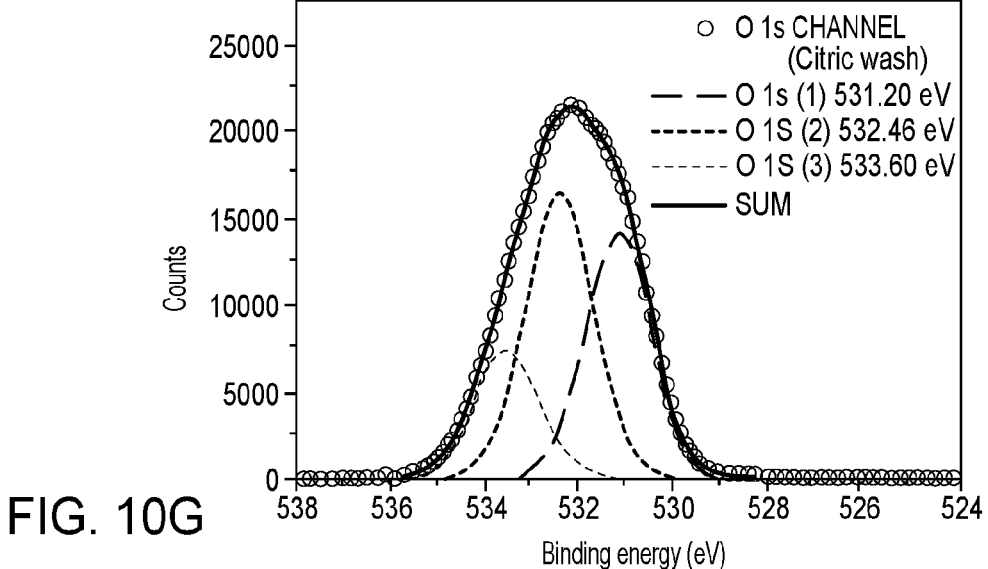
FIGS. 10G and 10H are exemplary deconvoluted high resolution O 1s XPS spectra of the channels and pores of a used membrane, respectively, after washing with citric acid according to at least one embodiment.
Figure 10H:
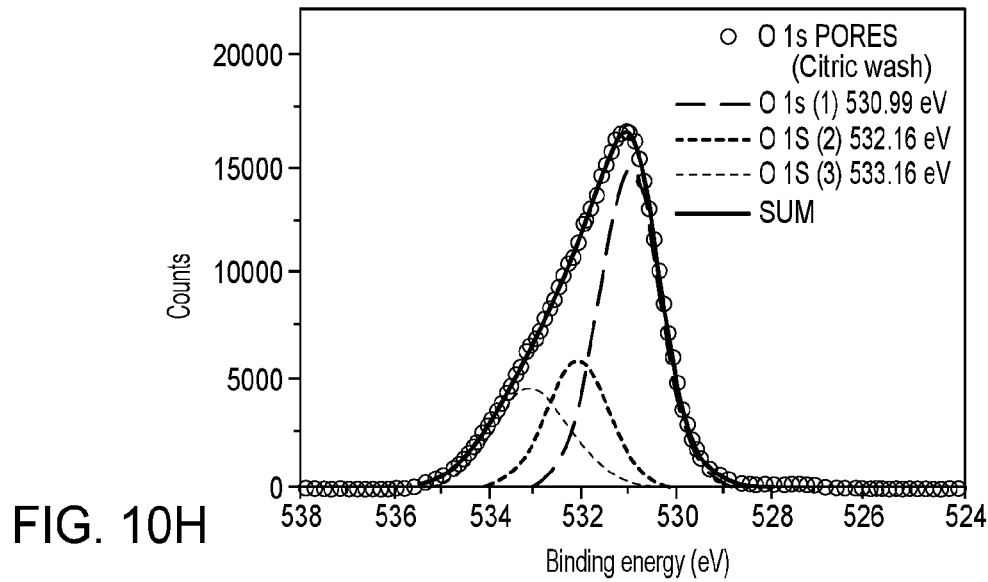

The most common clean-in-place chemical treatments involve an acid wash as disclosed in U.S. Pat. No. 9,506,334 and Zhao et al., Fouling and regeneration of ceramic microfiltration membranes in processing acid wastewater containing fine $TiO_2$ particles, Journal of Membrane Science 2002, 208 (1-2):331-341. For these examples, four different acids were chosen-hydrochloric acid (HCl), oxalic acid, citric acid, and acetic acid. Pieces of the used cysteic acid functionalized membrane (described above) were washed in 0.1 M solution of each these acids for about 48 hours, periodically stirring at room temperature. Photographs of the used membrane before and after the acid wash are shown in FIGS. 8A and 8B, respectively. EDX analysis was performed on samples from the membrane channels of the acid-washed membranes. The elemental composition as determined by EDX are shown in Table 3. The EDX analysis indicated that there was a small decrease in the organic carbon (C) content. However, XPS data of the oxalic acid washed membrane (FIGS. 9A-9H) and the citric acid washed membrane (FIGS. 10A-10H) indicated that the cysteic acid functionality still existed in its reduced state as a disulfide.

TABLE 3

| | Composition (%) | | |
|---|---|---|---|
| Element | Used membrane channel (not acid washed) | Used membrane channel (oxalic acid washed) | Used membrane channel (citric acid washed) |
| C | 38.27 | 22.94 | 28.41 |
| O | 38.39 | 48.29 | 45.05 |
| Mg | 0.04 | 1.08 | 0.84 |
| Al | 15.22 | 25.47 | 23.01 |
| Cl | 1.67 | — | — |
| Na | 2.07 | — | — |
| Fe | 1.03 | — | — |
| Si | 0.12 | — | — |
| F | — | — | — |
| N | 2.97 | 2.22 | 2.65 |
| S | 0.11 | 0.01 | 0.03 |

SEM images for the oxalic acid washed membrane and the citric acid washed membrane were also obtained. FIGS. 11A-11D show selected SEM images of different locations of the used membrane after washing with 0.1 M oxalic acid, and FIGS. 12A-12B show selected SEM images of different locations of the used membrane after washing with 0.1 M citric acid. The SEM images show that most of water-soluble contaminants were removed from the membrane surface after the oxalic acid wash and the citric acid wash. However, the high carbon content obtained from EDX analysis is an indication that the membrane pores are still blocked. Based on the SEM images, as well as the EDX and XPS data, the chemical treatments with oxalic acid or citric acid did not regenerate the cysteic acid functionality that imparts both the hydrophilic properties of the membrane and the high membrane flux.

Figure 13B:
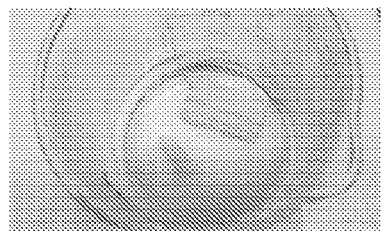
FIGS. 13B and 13C are exemplary photographs of portions of the used membrane shown in FIG. 13A after washing with cysteic acid according to at least one embodiment according to at least one embodiment.
Figure 13A:
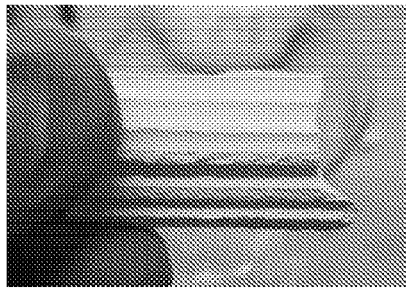
FIG. 13A is an exemplary photograph of a portion of a used membrane according to at least one embodiment according to at least one embodiment.
Figure 13C:
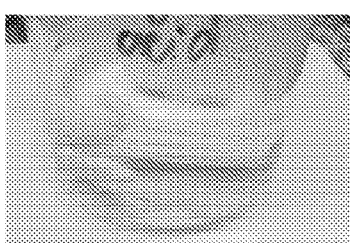
Figure 14A:
FIGS. 14A-14C is an exemplary SEM image of the pores, the interface between the pores and channels, and the channels of a used membrane, respectively, after washing with cysteic acid according to at least one embodiment.
Figure 14B:
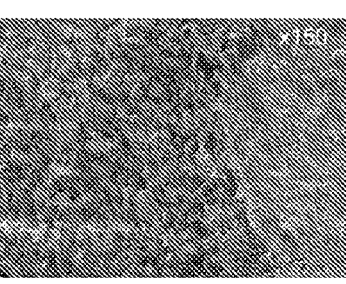
Figure 14C:
Figures 15A, 15B, 15C:
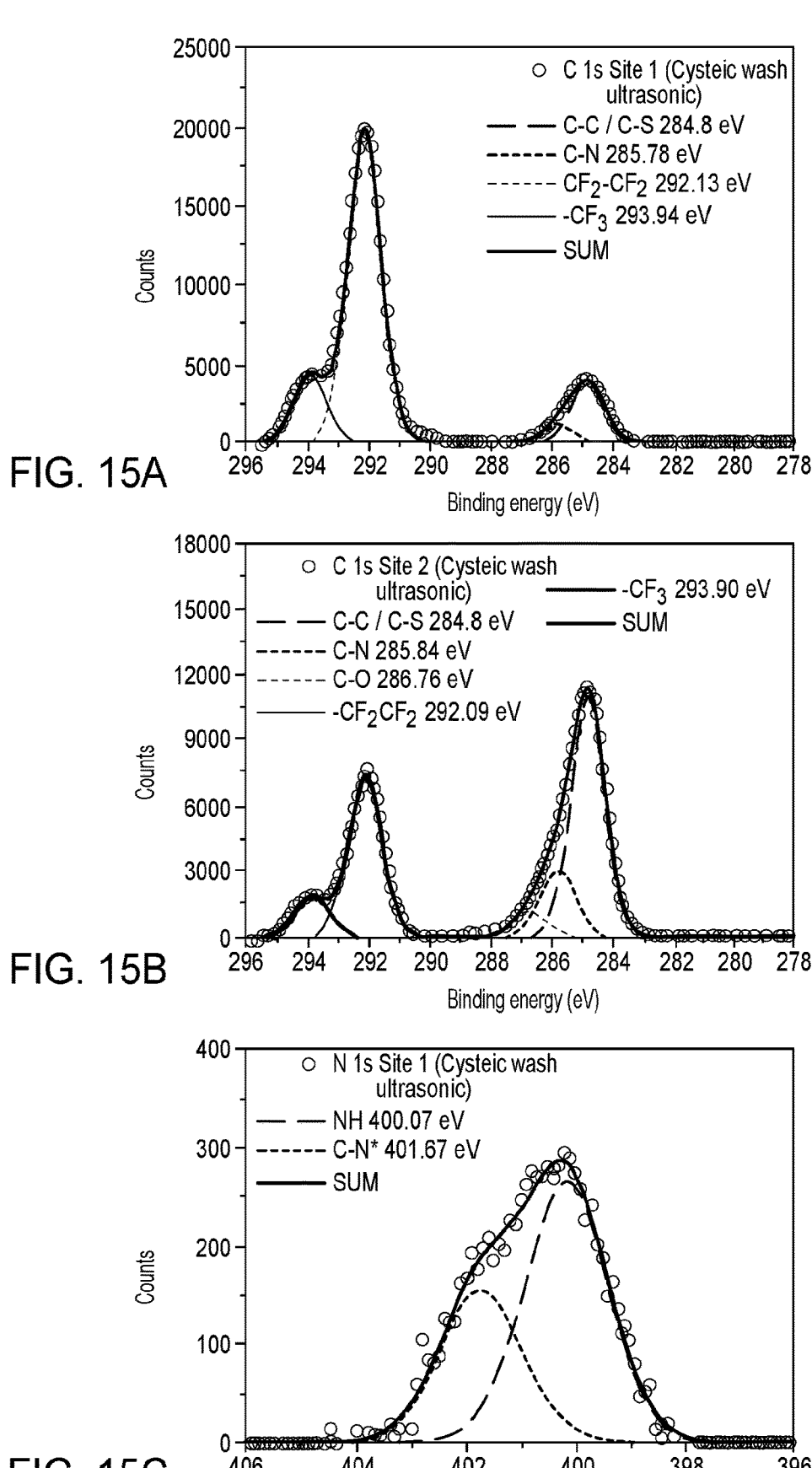
FIGS. 15A and 15B are exemplary deconvoluted high resolution C 1s XPS spectra of the channels at two locations of a used membrane—site 1 and site 2, respectively-after washing with cysteic acid according to at least one embodiment.
FIGS. 15C and 15D are exemplary deconvoluted high resolution N 1s XPS spectra of the channels at two locations of a used membrane—site 1 and site 2, respectively-after washing with cysteic acid according to at least one embodiment.
Figures 15D, 15E, 15F:
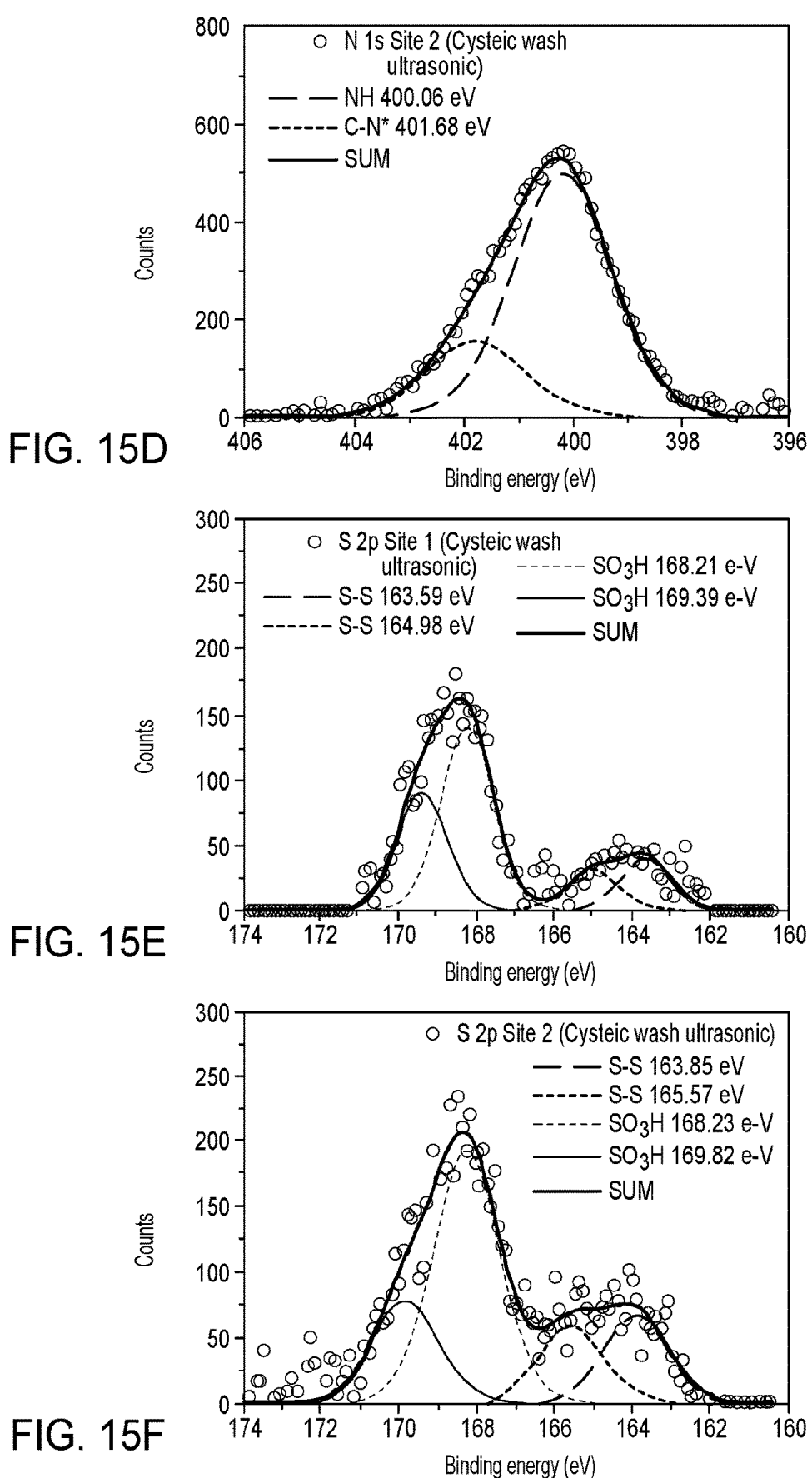
FIGS. 15E and 15F are exemplary deconvoluted high resolution S 2p XPS spectra of the channels at two locations of a used membrane—site 1 and site 2, respectively-after washing with cysteic acid according to at least one embodiment.
Figure 15G:
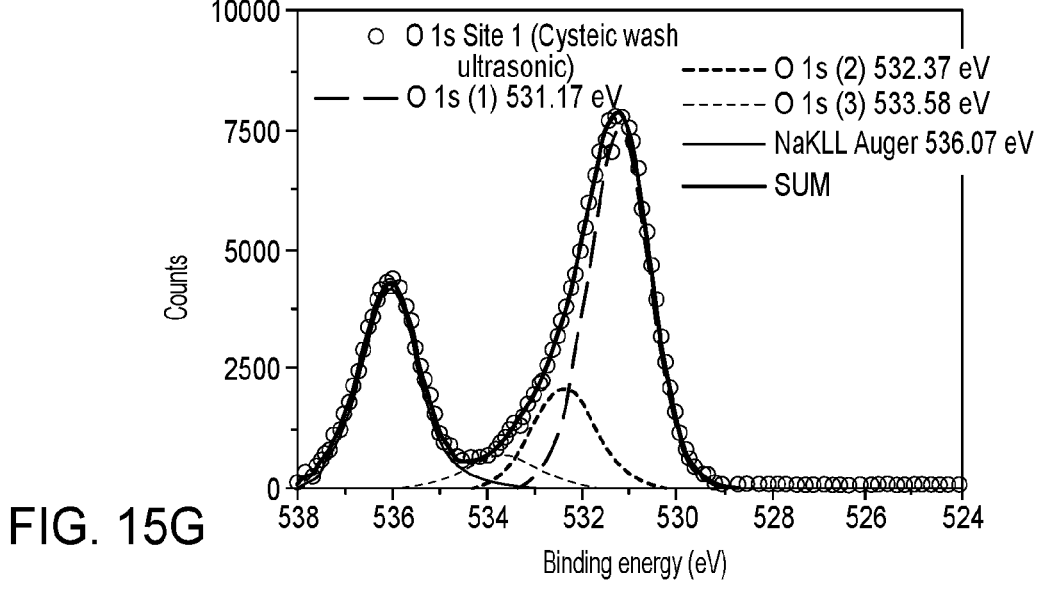
FIGS. 15G and 15H are exemplary deconvoluted high resolution O 1s XPS spectra of the channels at two locations of a used membrane—site 1 and site 2, respectively-after washing with cysteic acid according to at least one embodiment.
Figure 15H:
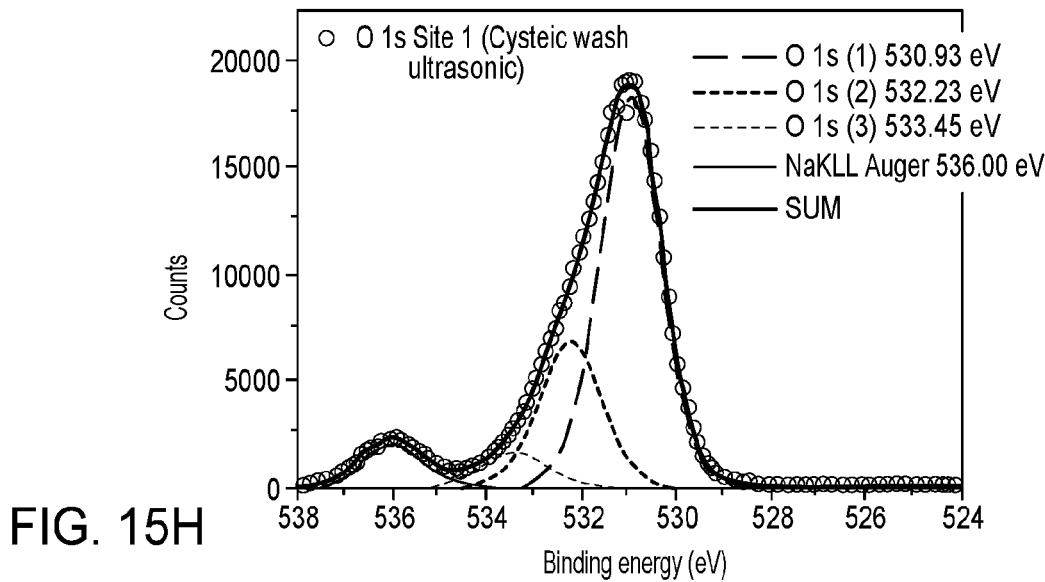
Figures 16A, 16B, 16C:
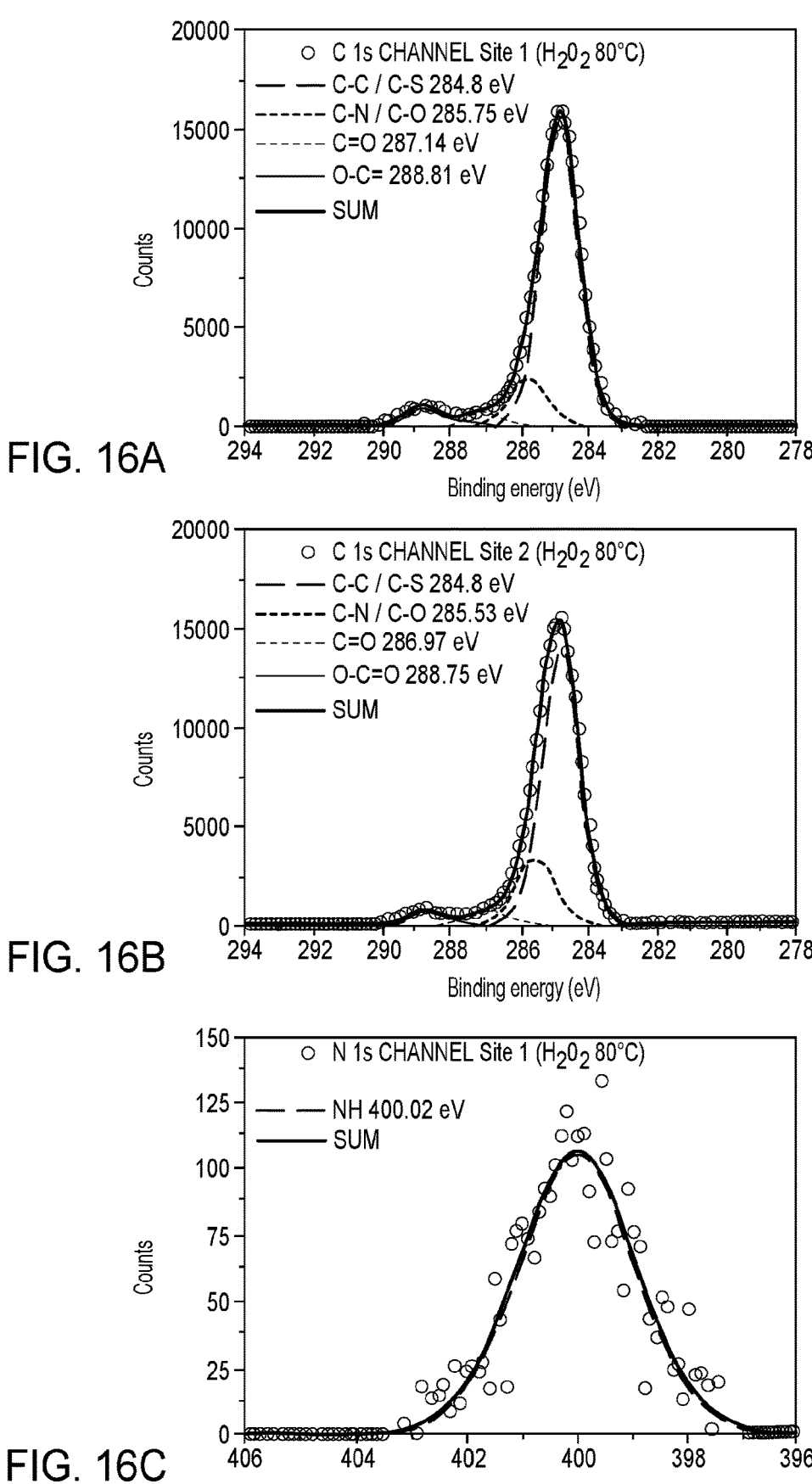
FIGS. 16A and 16B are exemplary deconvoluted high resolution C 1s XPS spectra of the channels at two locations of a used membrane—site 1 and site 2, respectively-after washing with hydrogen peroxide according to at least one embodiment.
FIGS. 16C and 16D are exemplary deconvoluted high resolution N 1s XPS spectra of the channels at two locations of a used membrane—site 1 and site 2, respectively-after washing with hydrogen peroxide according to at least one embodiment.
Figures 16D, 16E, 16F:
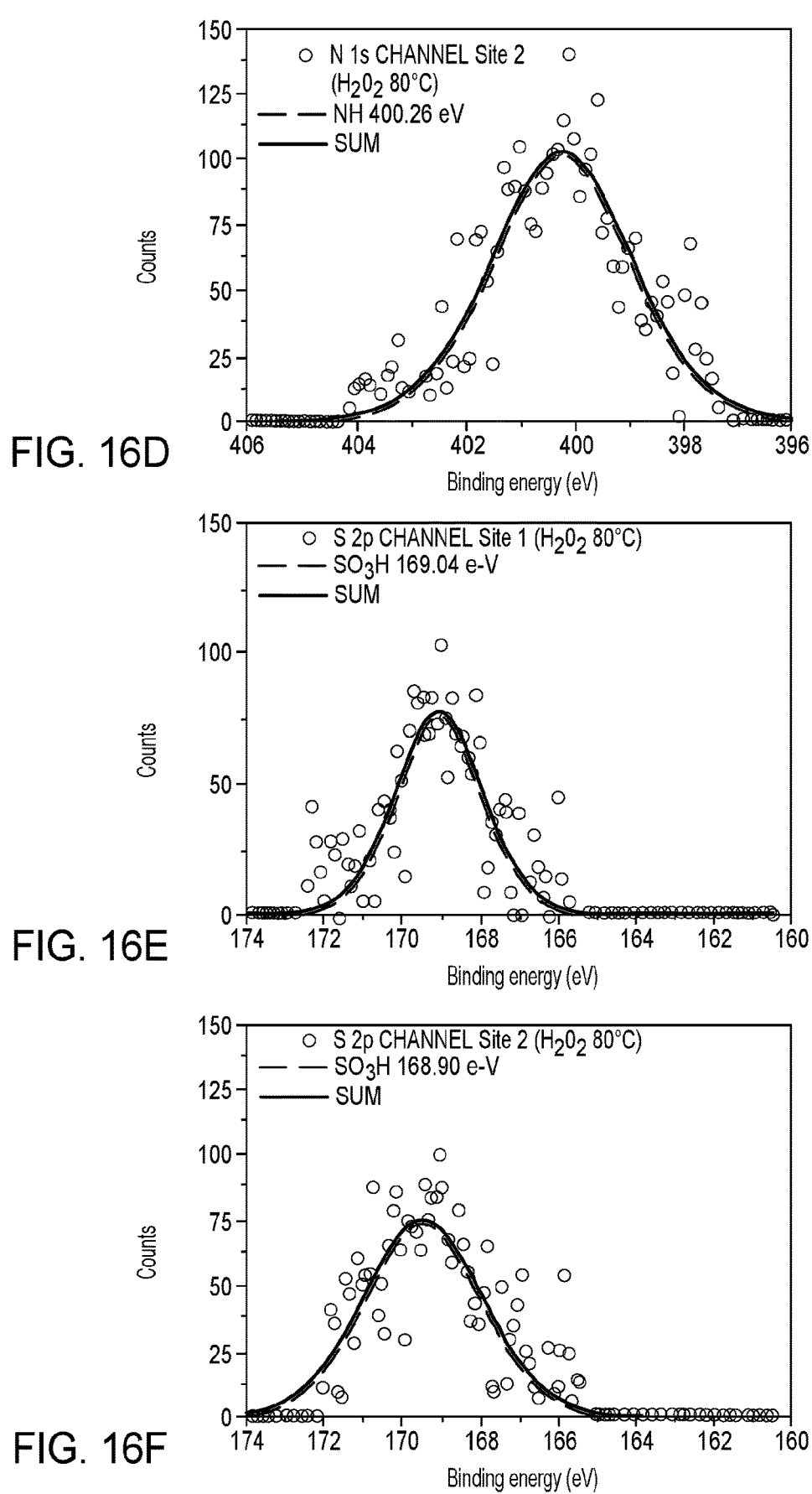
FIGS. 16E and 16F are exemplary deconvoluted high resolution S 2p XPS spectra of the channels at two locations of a used membrane—site 1 and site 2, respectively-after washing with hydrogen peroxide according to at least one embodiment.
Figure 16G:
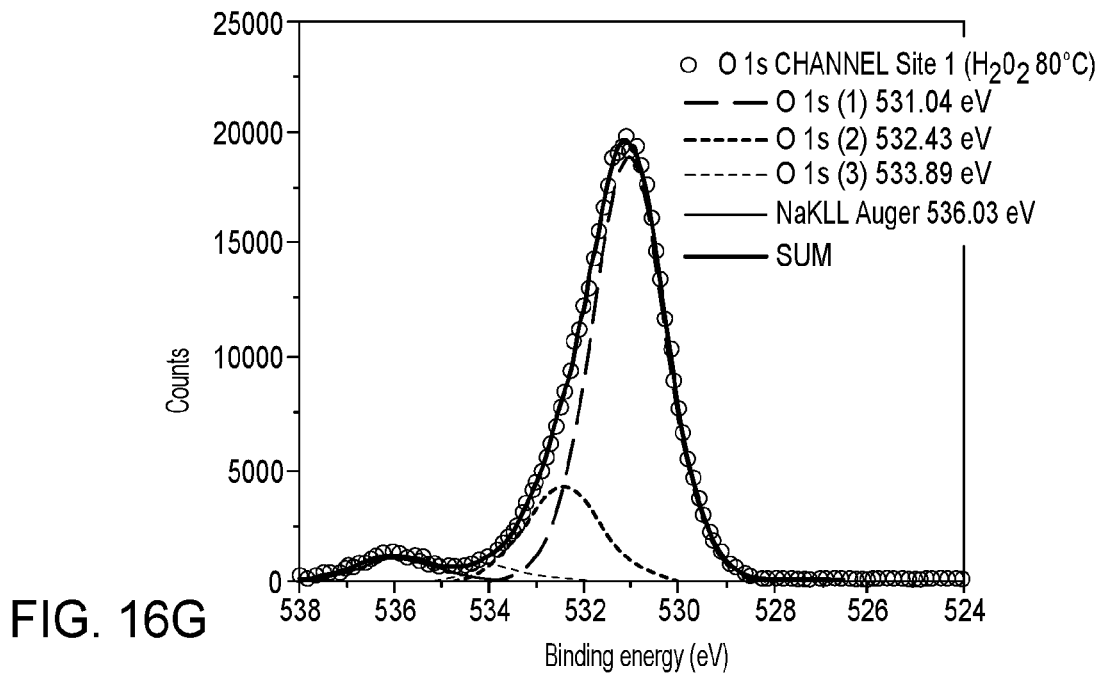
FIGS. 16G and 16H are exemplary deconvoluted high resolution O 1s XPS spectra of the channels at two locations of a used membrane—site 1 and site 2, respectively-after washing with hydrogen peroxide according to at least one embodiment.
Figure 16H:
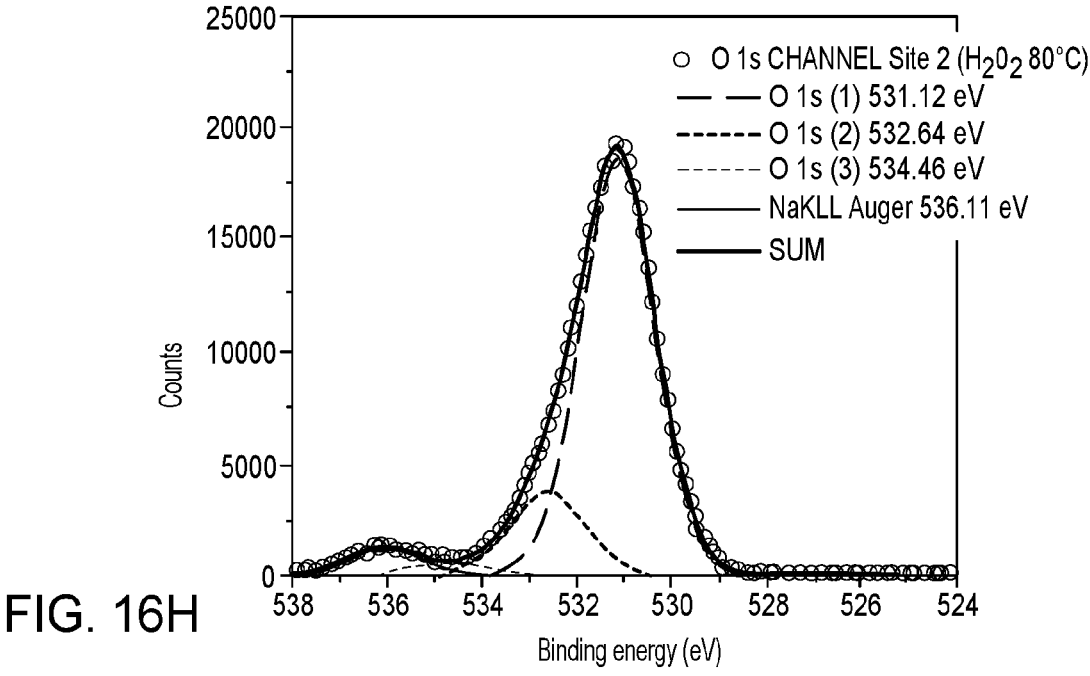
Figure 17A:
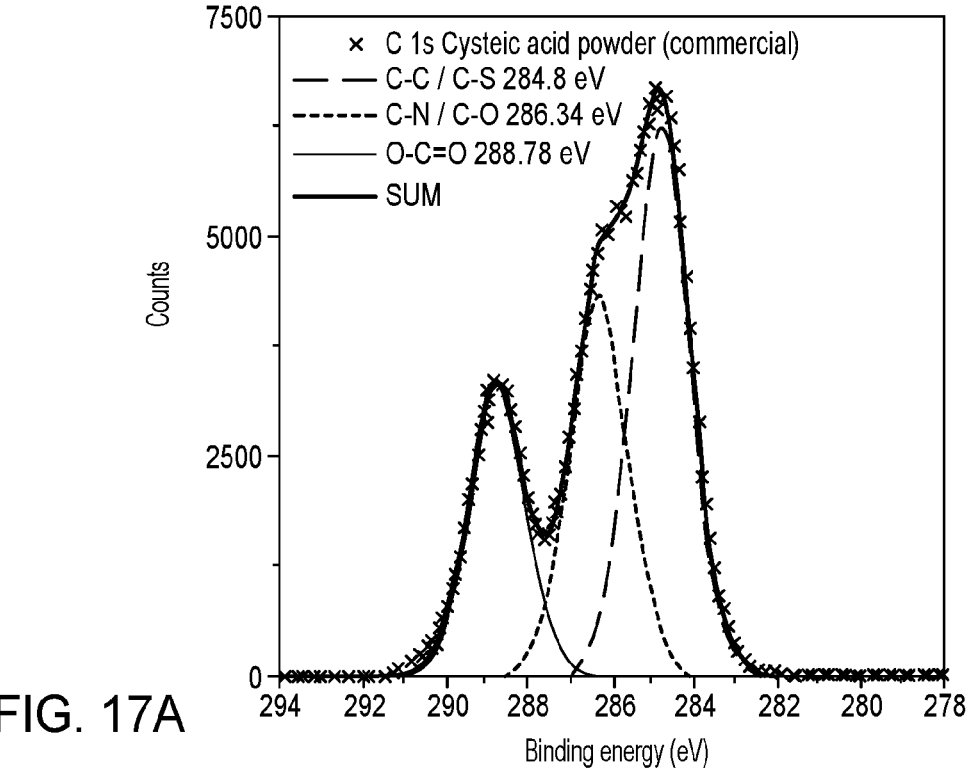
FIGS. 17A and 17B are exemplary deconvoluted high resolution C 1s XPS spectra of cysteic acid and cystine, respectively, according to at least one embodiment.
Figure 17B:
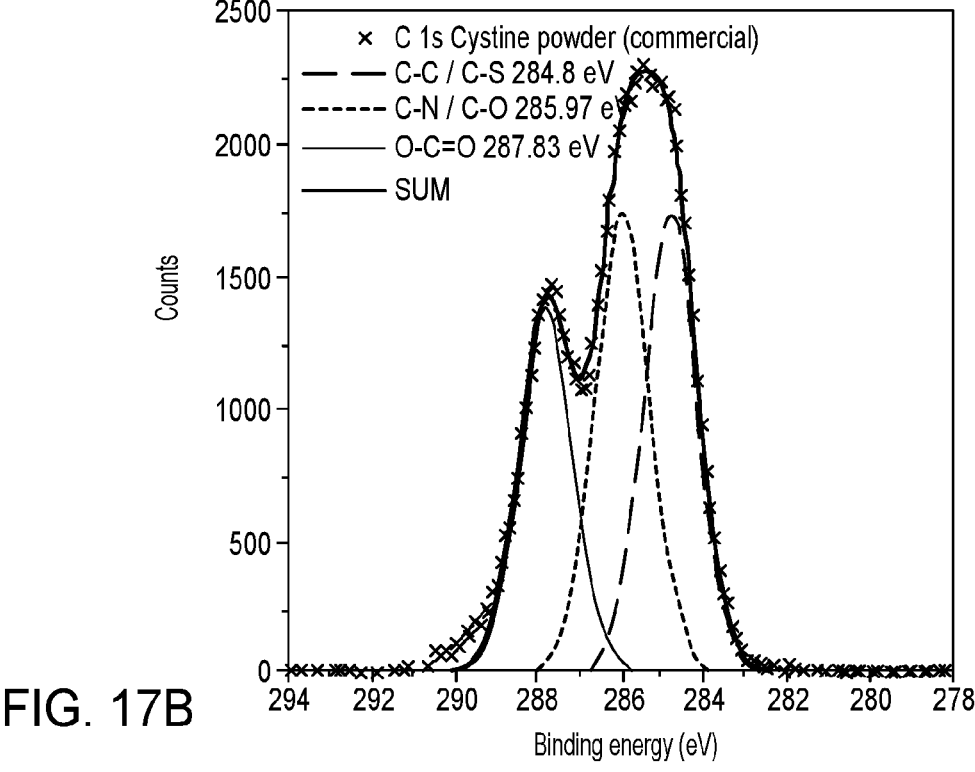
Figure 17C:
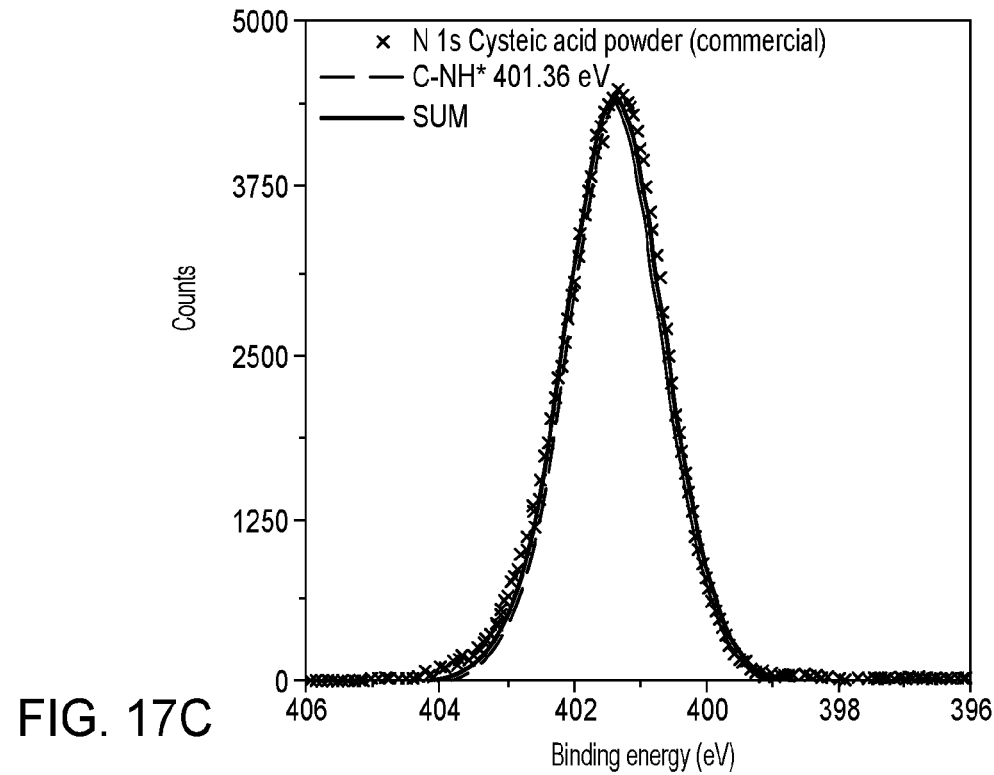
FIGS. 17C and 17D are exemplary deconvoluted high resolution N 1s XPS spectra of cysteic acid and cystine, respectively, according to at least one embodiment.
Figure 17D:
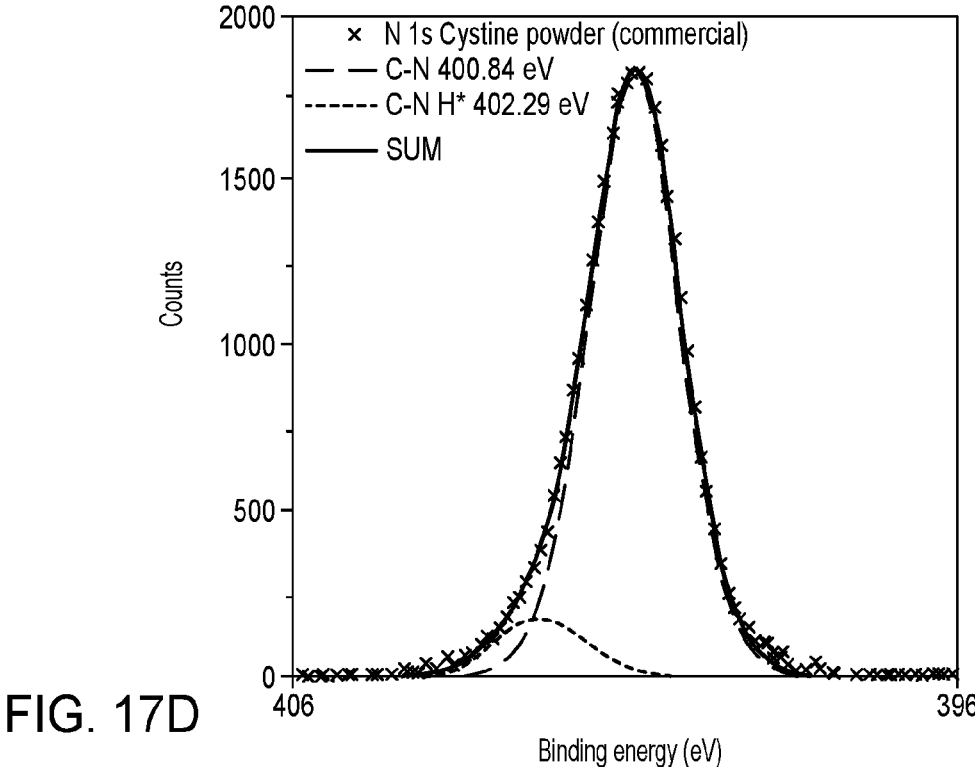
Figure 17E:
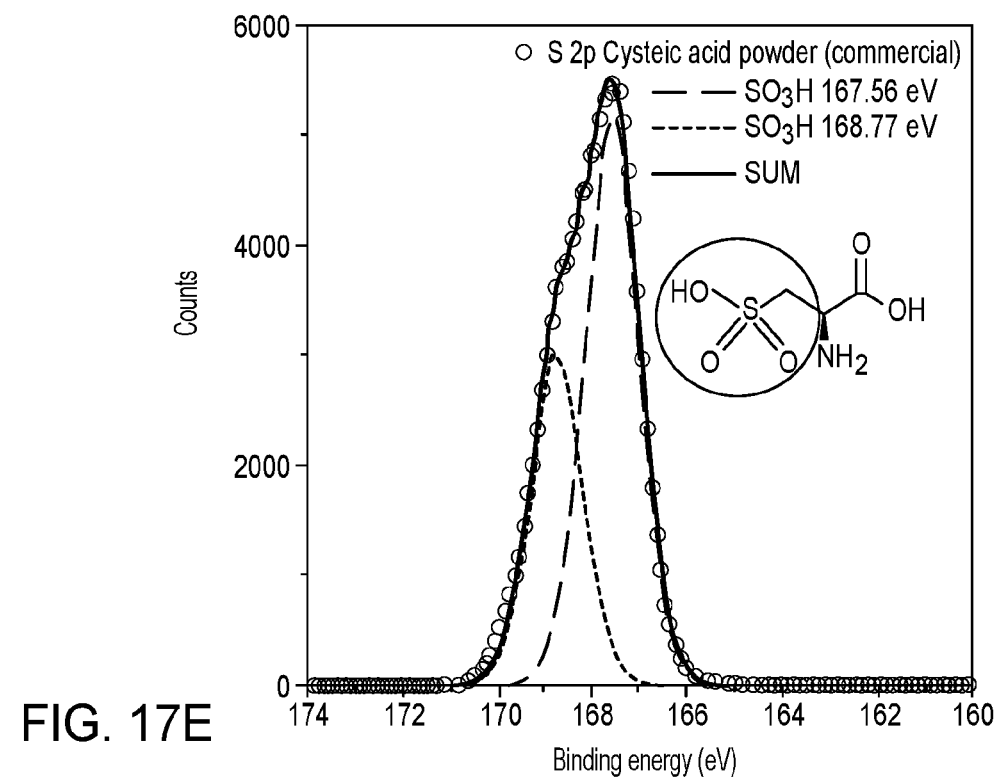
FIGS. 17E and 17F are exemplary deconvoluted high resolution S 2p XPS spectra of cysteic acid and cystine, respectively, according to at least one embodiment.
Figure 17F:
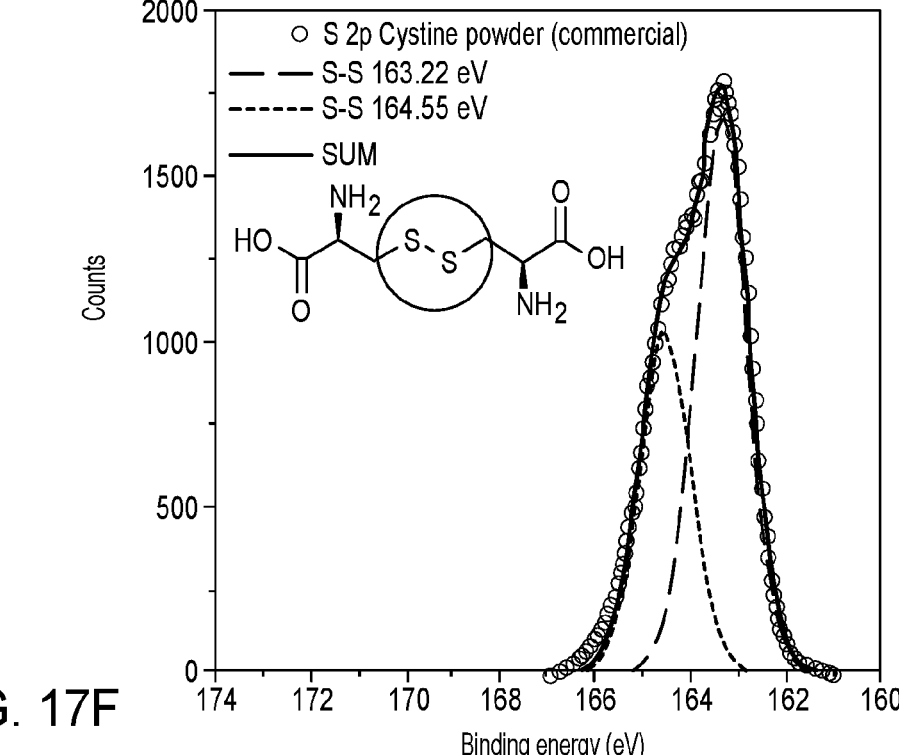
Figure 17G:
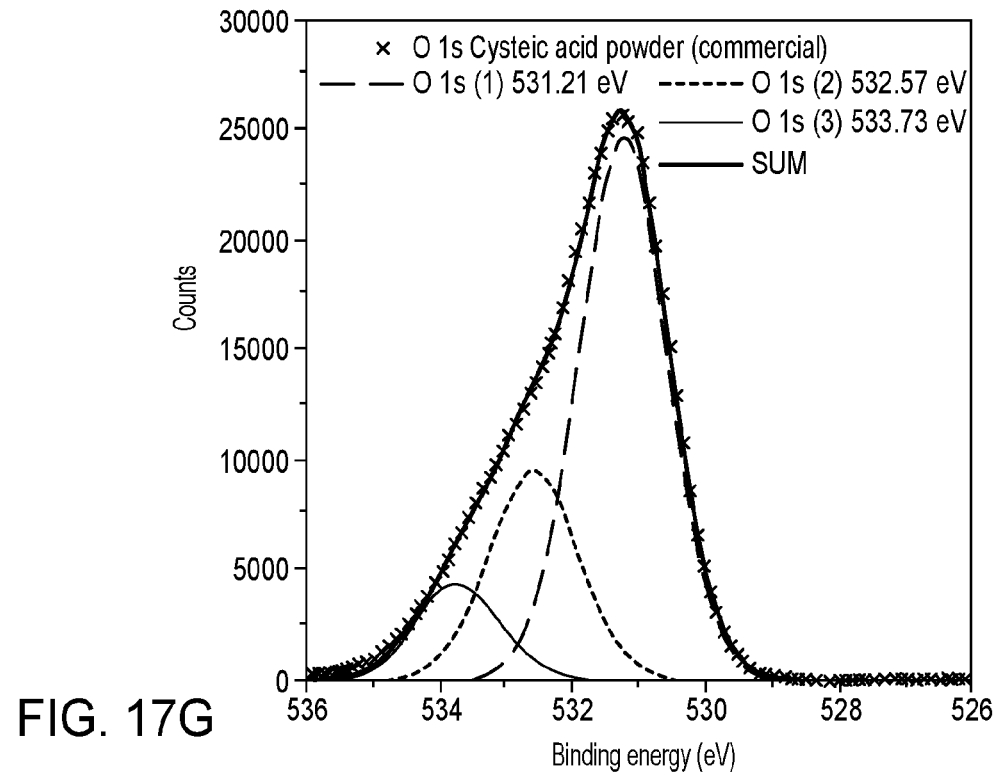
FIGS. 17G and 17H are exemplary deconvoluted high resolution O is XPS spectra of cysteic acid and cystine, respectively, according to at least one embodiment.
Figure 17H:
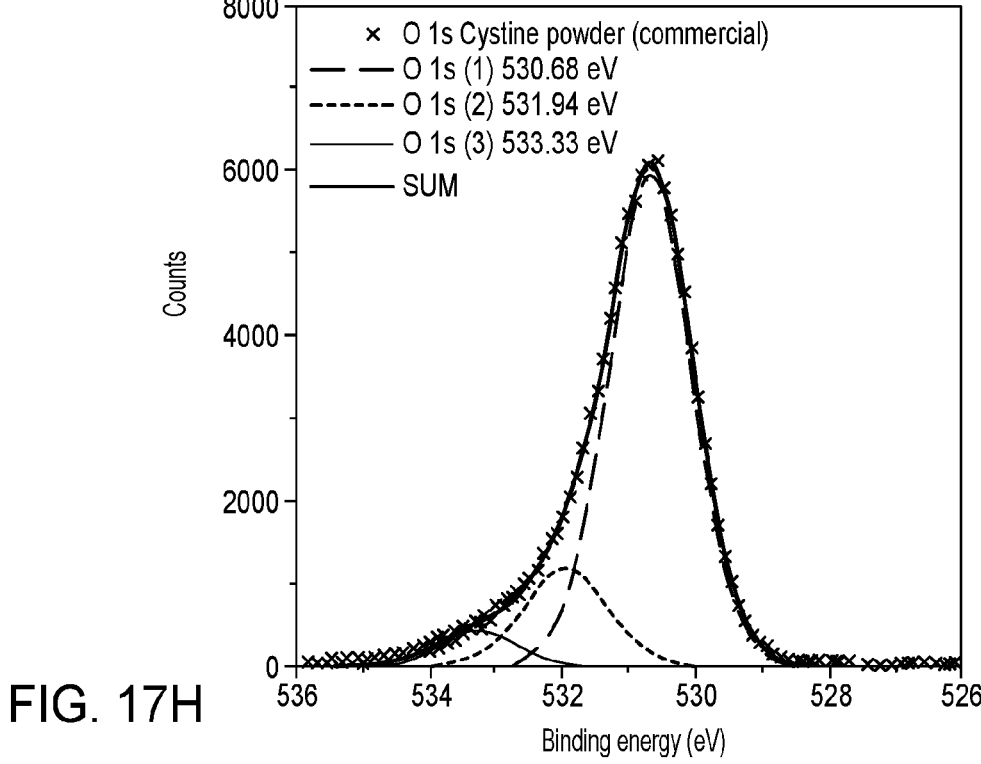

The effect of washing the used membrane with cysteic acid was also investigated. For this example, portions of the used cysteic acid functionalized membrane (described above) were washed with a 1 M solution of cysteic acid for 1 h at 80° C. with stirring. FIG. 13A shows a photograph of the used membrane prior to the washing with cysteic acid, and FIGS. 13B and 13C show photographs of the used membrane after the washing with cysteic acid. SEM images of different locations of the used membrane after washing with 1 M cysteic acid were also obtained and are shown in FIG. 14A (pores), FIG. 14B (interface), and channels (FIG. 14C). EDX analysis was performed on the used membrane after the cysteic acid wash and the elemental composition is shown in Table 4. The EDX analysis and SEM images appeared to indicate that washing with cysteic acid at 80° C. re-functionalizes some of the membrane and removes some of the contamination. It was determined that that membrane chunks could be washed ultrasonically to remove the excess of cysteic acid. As shown in Table 4, sulfur and nitrogen content is very high in comparison to alumina. This is due to physically adsorbed cysteic acid.

TABLE 4

| | Composition (%) | |
|---|---|---|
| Element | Used membrane channel (not acid washed) | Used membrane channel (cysteic acid washed) |
| C | 38.27 | 31.78 |
| O | 38.39 | 43.30 |
| Mg | 0.04 | 0.29 |
| Al | 15.22 | 7.68 |
| Cl | 1.67 | — |
| Na | 2.07 | — |
| Fe | 1.03 | — |
| Si | 0.12 | — |
| F | — | 5.03 |
| N | 2.97 | 7.47 |
| S | 0.11 | 4.43 |

XPS data at two locations (site 1 and site 2) of the cysteic acid washed sample shown in FIGS. 15A-15H also indicated the presence of physically adsorbed species. However, washing with cysteic acid at 80° C. presents significant practical issues. For example, it could necessitate the removal of the membranes from the membrane housing, treating the membranes with cysteic acid, and replacing the membranes in the housing. Such an ex-situ process can be time-consuming and expensive.

The effect of reacting the used membrane with hydrogen peroxide was also investigated. For this example, portions of the used cysteic acid functionalized membrane (described above) were reacted with hydrogen peroxide solution ($H_2O_2$, 30%) for 15 minutes at 80° C. with stirring. The XPS data at two locations of the membrane (site 1 and site 2) shown in FIGS. 16A-16H is consistent with oxidation of the disulfide to a sulfonic acid group. However, performing such a clean-in-place procedure with hydrogen peroxide is challenging. Moreover, maintaining a temperature of 80° C. or more during such a clean-in-place procedure can be unsafe. Further, the use of an acid or an oxidizing agent alone does not result in removal of the residue from the membrane channels or pores. As a reference for the XPS data, FIGS. 17A-17H shows a comparison of the deconvoluted high resolution C 1s, N 1s, S 2p, and O is X-ray photoelectron spectra of cysteic acid and cystine powders.

Effect of Solvent Extraction on the Used Membrane

For the solvent extraction, pieces of a used cysteic acid functionalized membrane (functionalized as described above from a 1.2 m long, 52 mm diameter, and nominal pore size of 0.1 μm membrane) were placed in a glass beaker and soaked in different organic solvents-isopropanol (IPA), toluene, or acetone—for 20 minutes at room temperature while sonicating. The sonication simulates a flow through the channels of an in-situ membrane.

Photographs of the membranes in the individual solvents before sonication and after sonication are shown in FIG. 18A and FIG. 18B, respectively. FIGS. 19A, 19B, and 19C are photographs of the material removed from the used membrane by extraction with IPA, toluene, or acetone, respectively. The photographs illustrated that each of these solvents can remove material from, e.g., the channels and pores of the used cysteic acid functionalized membrane, with IPA extraction removing more organic material than the other solvents.

Effect of Oxidizing Agent on the Used Membrane

Figure 20:
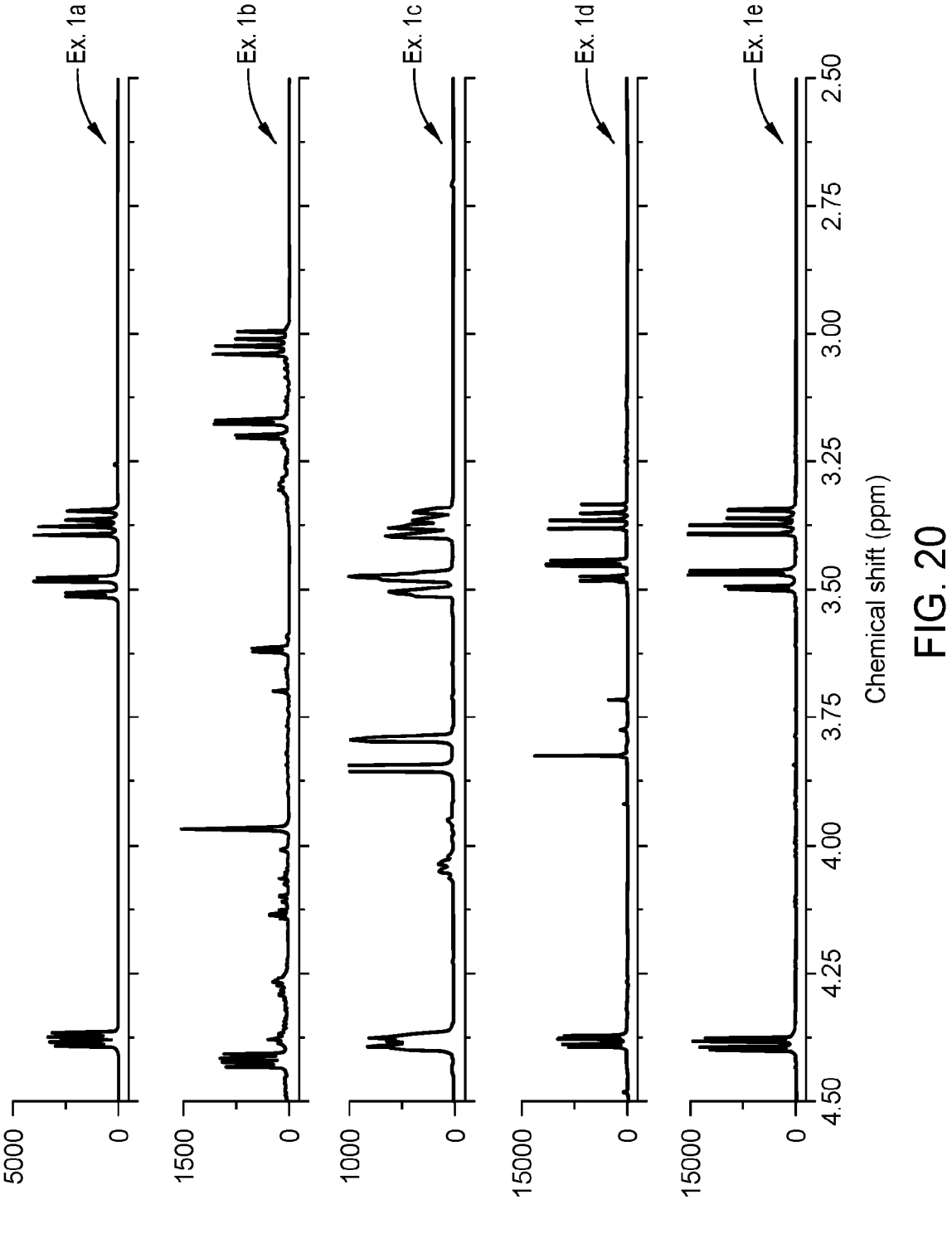
FIG. 20 shows Proton Nuclear Magnetic Resonance ($^1$H NMR) spectra of cysteic acid and the product from subjecting cystine to various oxidation conditions according to at least one embodiment.
Figures 21A, 21B, 21C:
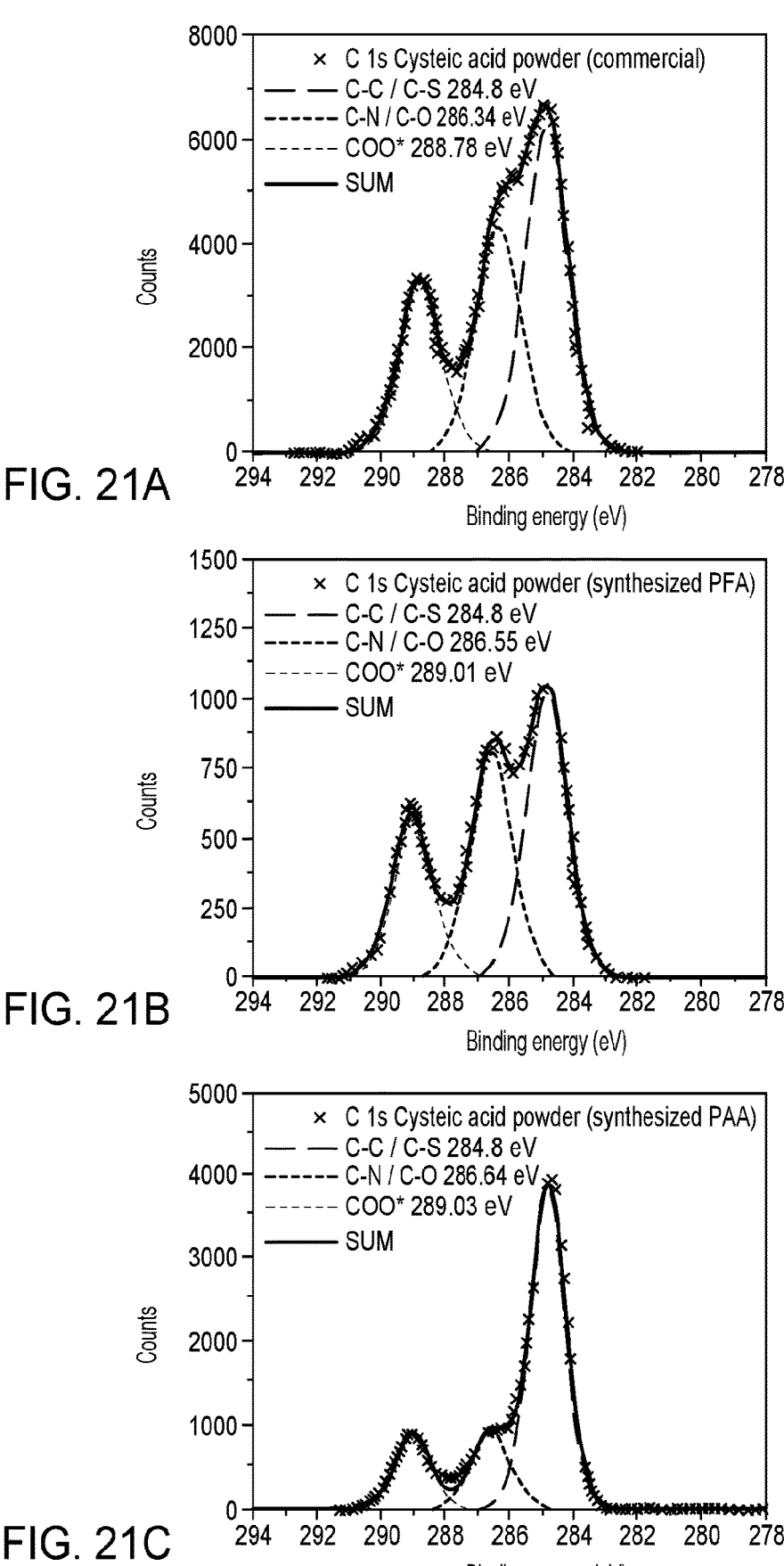
FIGS. 21A-21D are exemplary high resolution C 1s XPS spectra of cysteic acid, the product from the oxidation of cystine with performic acid (PFA), the product from the oxidation of cystine with peracetic acid (PAA), and the product from the oxidation of cystine with hydrogen peroxide ($H_2O_2$), respectively, according to at least one embodiment.
Figures 21D, 21E, 21F:
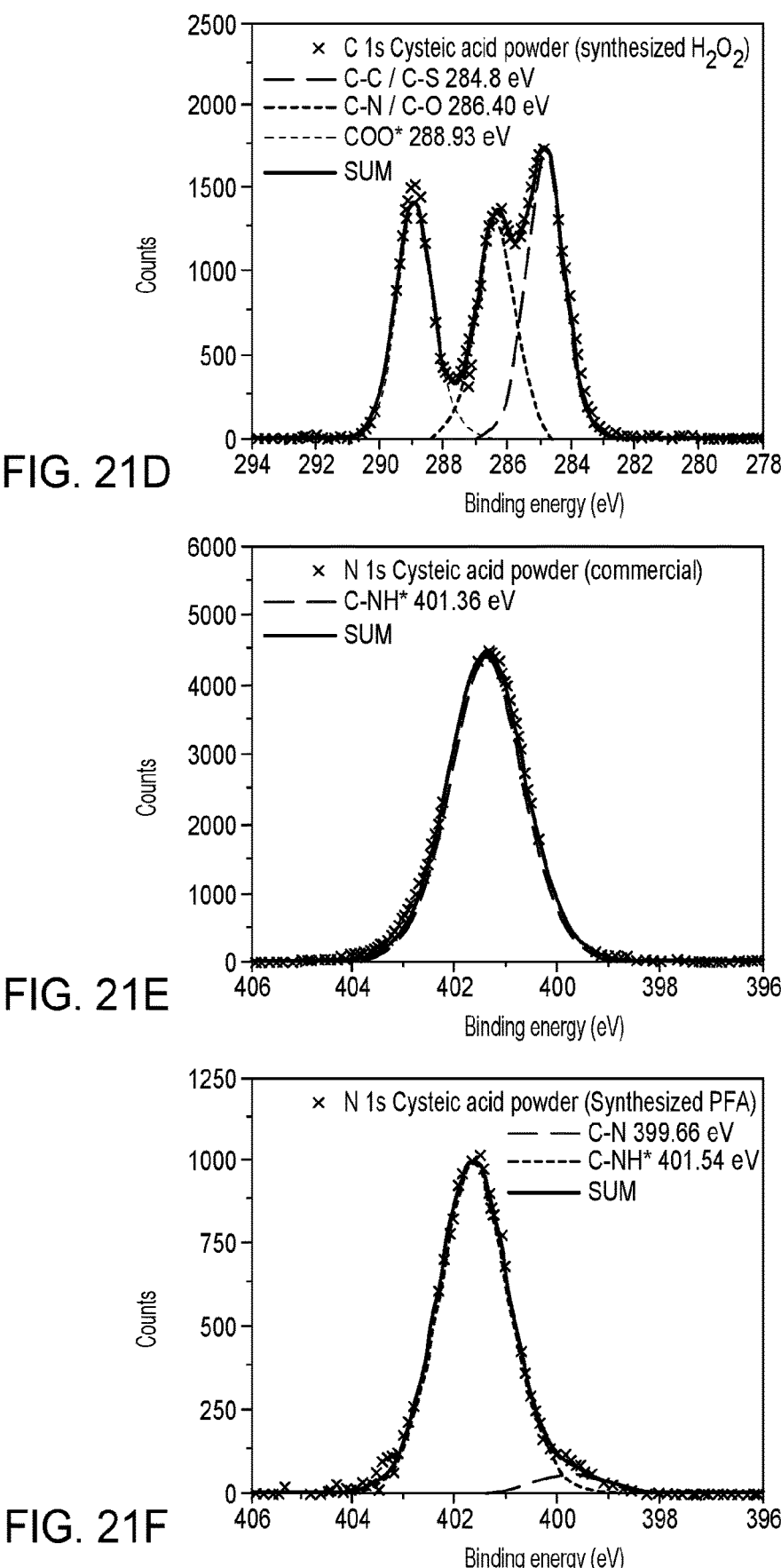
FIGS. 21E-21H are exemplary high resolution N 1s XPS spectra of cysteic acid, the product from the oxidation of cystine with PFA, the product from the oxidation of cystine with PAA, and the product from the oxidation of cystine with $H_2O_2$, respectively, according to at least one embodiment.
Figures 21G, 21H, 21I:
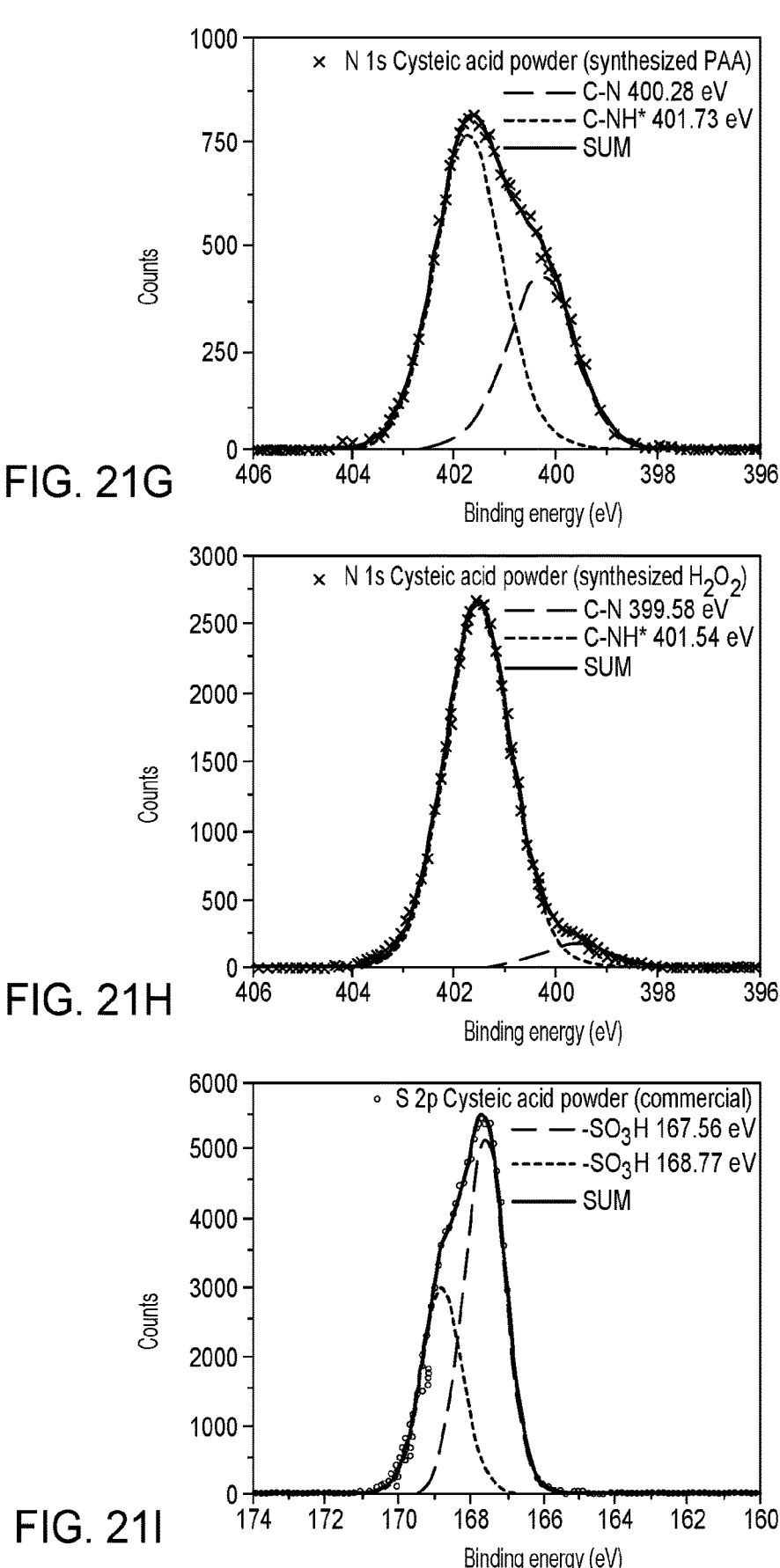
FIGS. 21I-21L are exemplary high resolution S 2p XPS spectra of cysteic acid, the product from the oxidation of cystine with PFA, the product from the oxidation of cystine with PAA, and the product from the oxidation of cystine with $H_2O_2$, respectively, according to at least one embodiment.
Figures 21J, 21K, 21L:
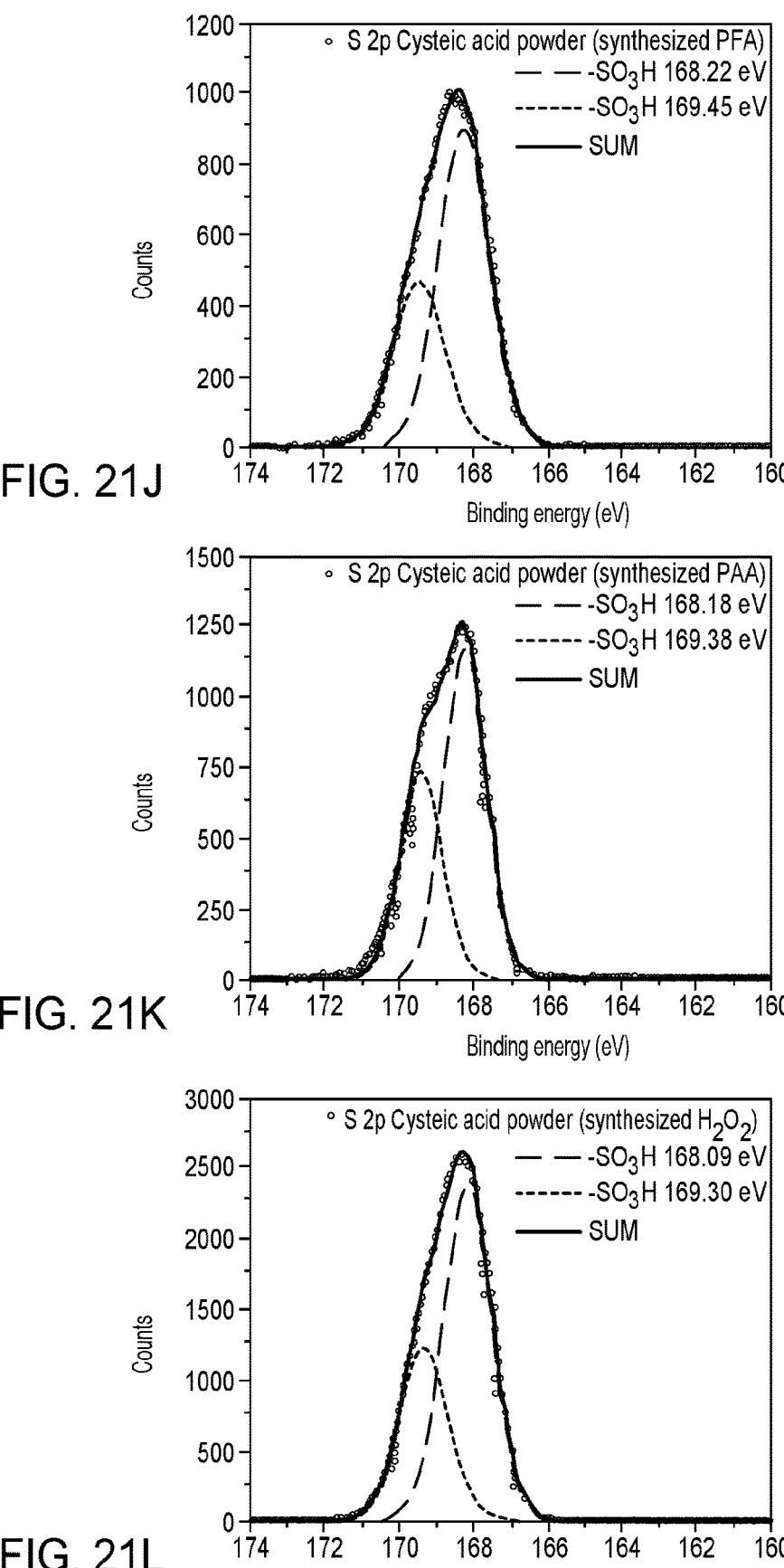
Figures 22A, 22B, 22C:
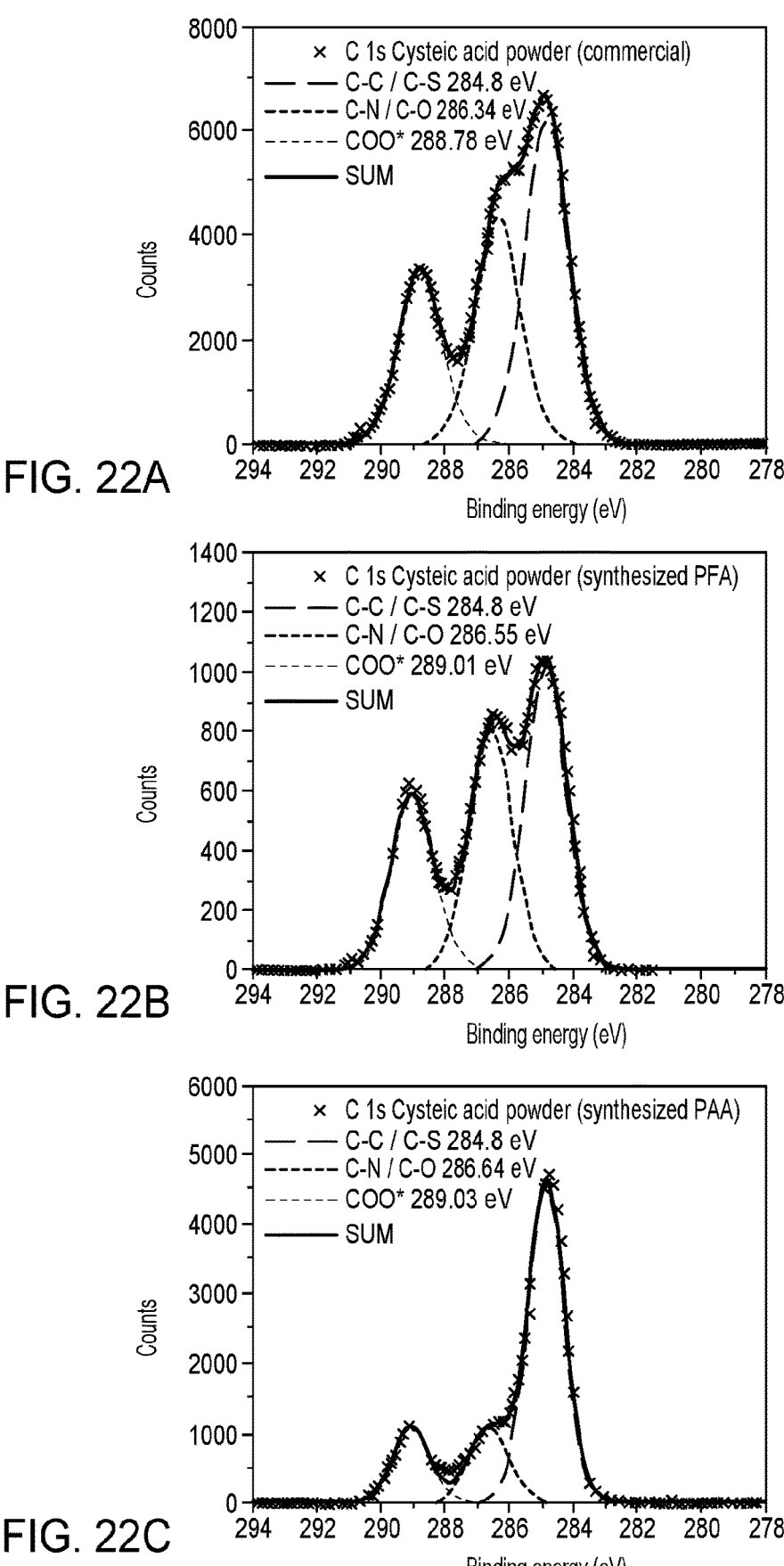
FIGS. 22A-22D are exemplary deconvoluted high resolution C 1s XPS spectra of cysteic acid, the product from the oxidation of cystine with PFA, the product from the oxidation of cystine with PAA, and cystine, respectively, according to at least one embodiment.
Figures 22D, 22E, 22F:
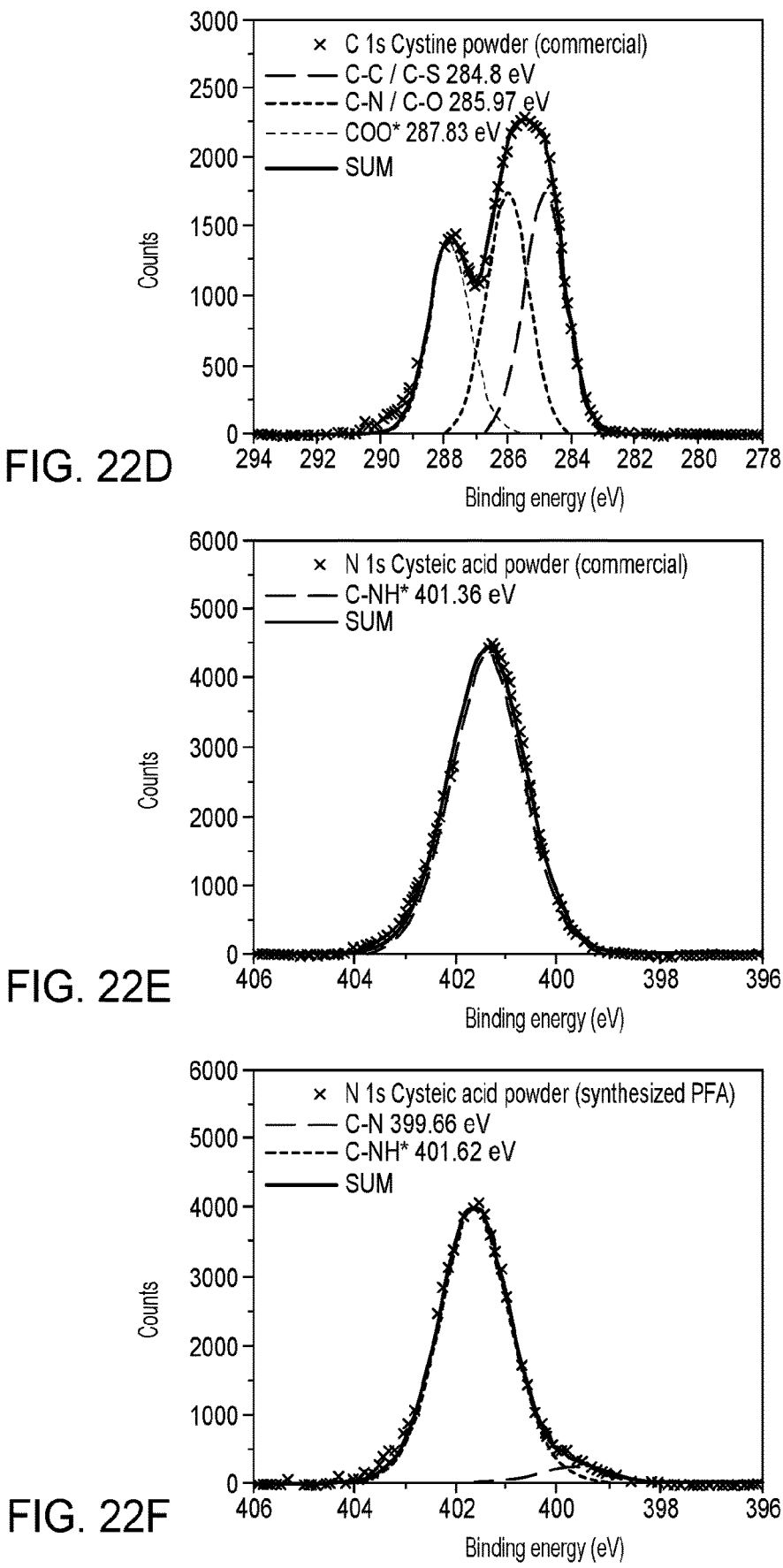
FIGS. 22E-22H are exemplary deconvoluted high resolution N 1s XPS spectra of cysteic acid, the product from the oxidation of cystine with PFA, the product from the oxidation of cystine with PAA, and cystine, respectively, according to at least one embodiment.
Figures 22G, 22H, 22I:
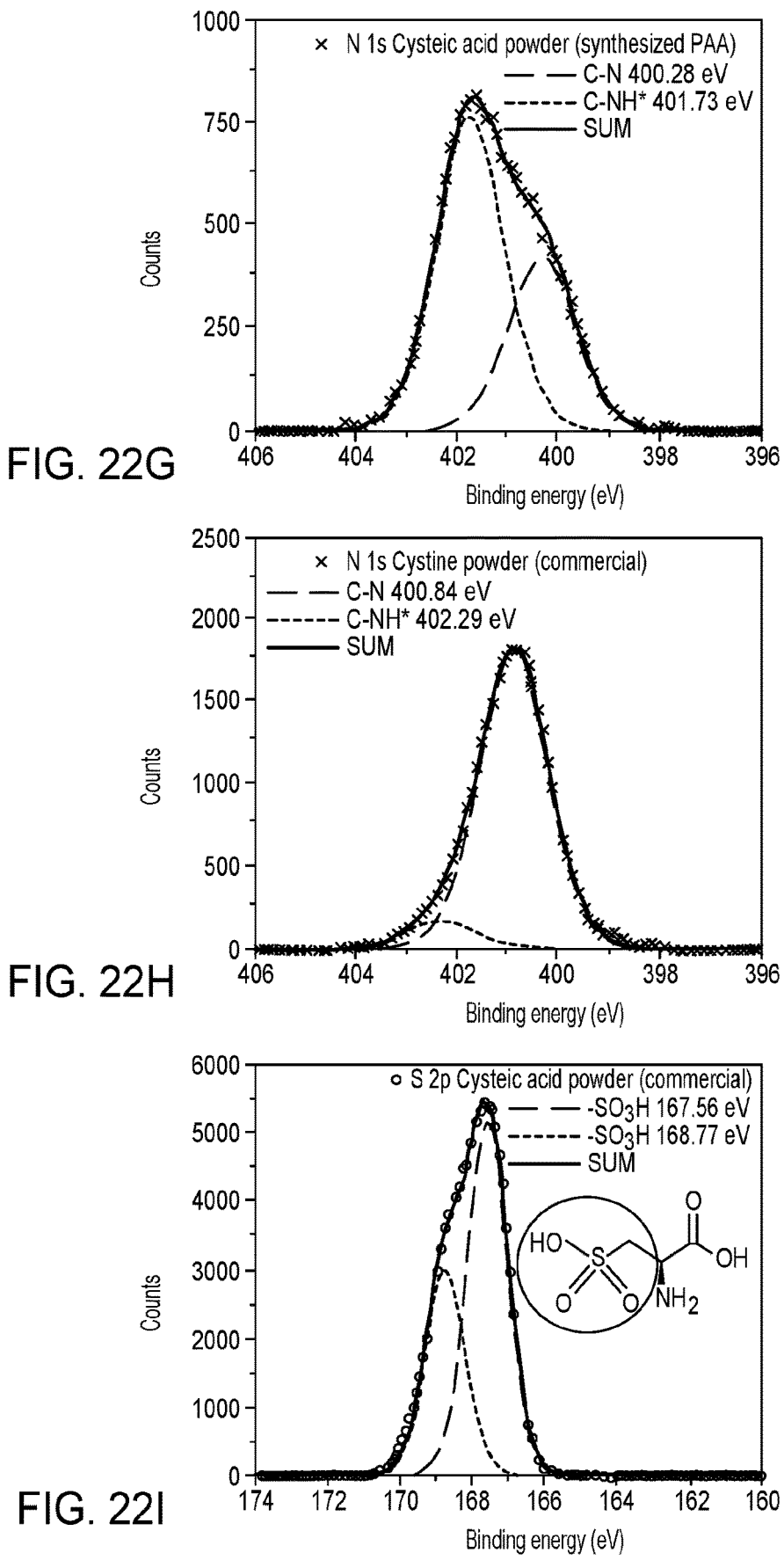
FIGS. 22I-22L are exemplary deconvoluted high resolution S 2p XPS spectra of cysteic acid, the product from the oxidation of cystine with PFA, the product from the oxidation of cystine with PAA, and cystine, respectively, according to at least one embodiment.
Figures 22J, 22K, 22L:
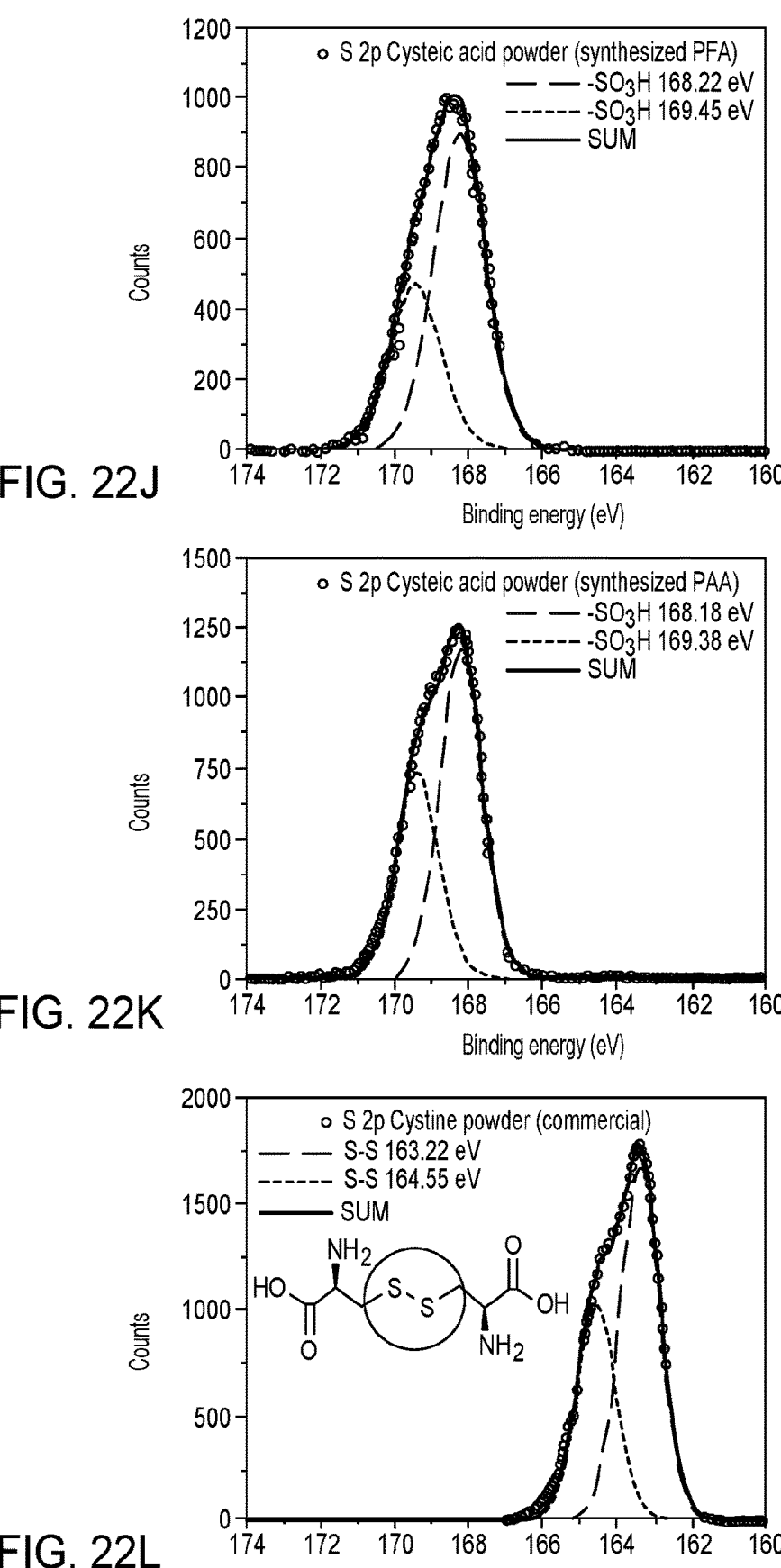
Figures 23A, 23B, 23C:
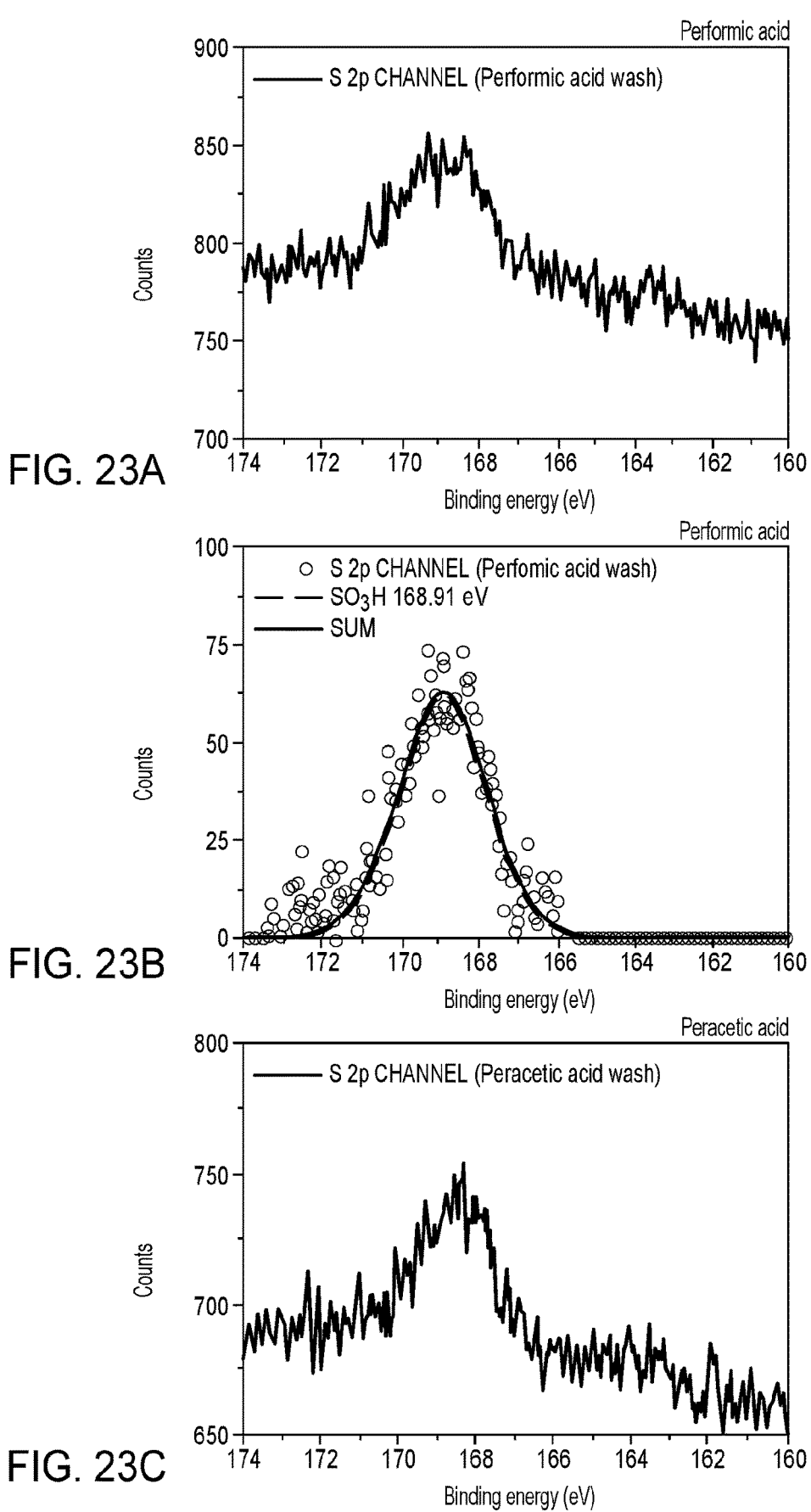
FIGS. 23A and 23B shows the raw data and fitted data from exemplary deconvoluted high resolution S 2p XPS spectra of the channels of a used membrane after treatment with PFA according to at least one embodiment.
FIGS. 23C and 23D shows the raw data and fitted data from exemplary deconvoluted high resolution S 2p XPS spectra of the channels of a used membrane after treatment with PAA according to at least one embodiment.
Figures 23D, 23E, 23F:
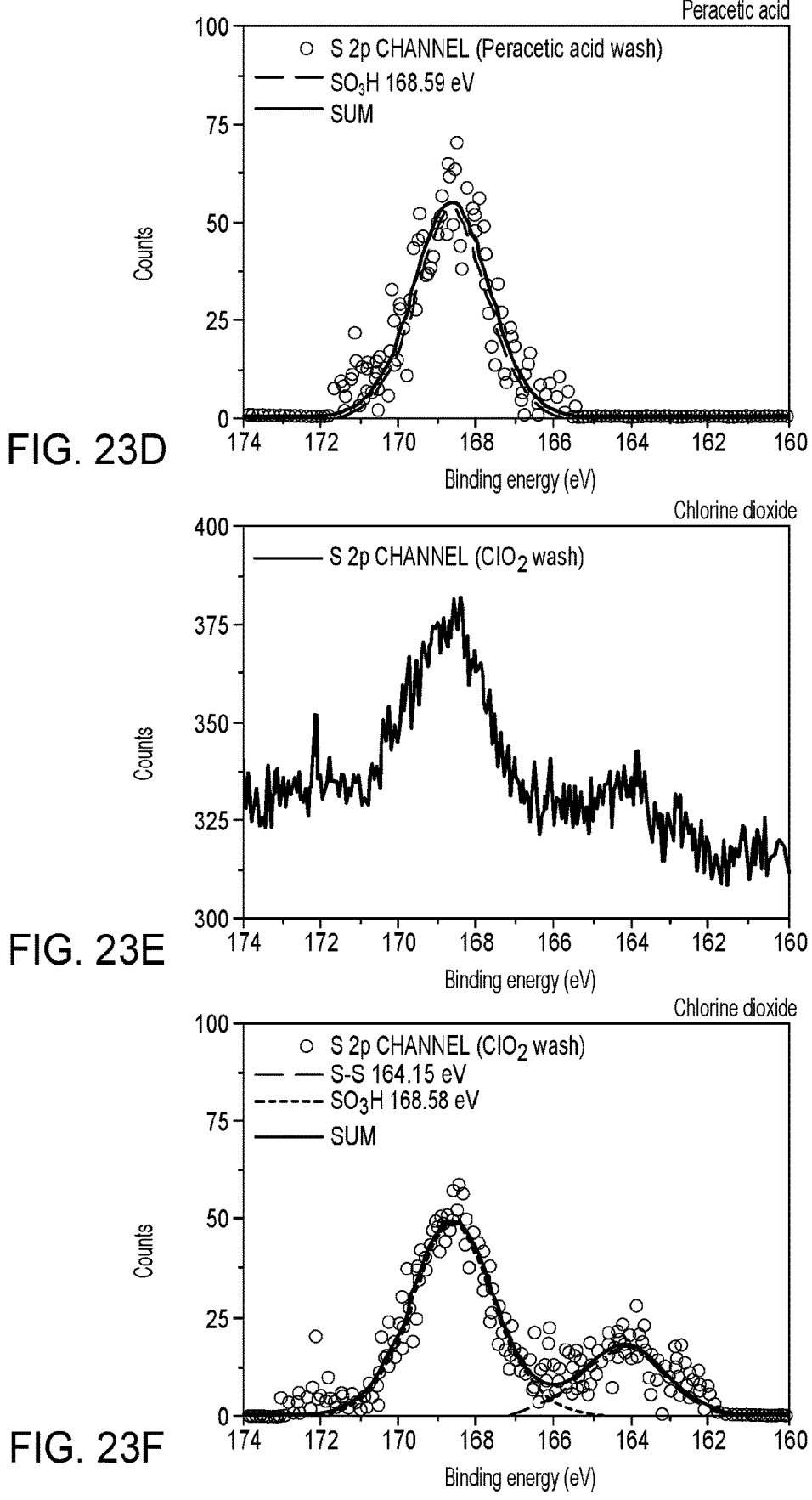
FIGS. 23E and 23F shows the raw data and fitted data from exemplary deconvoluted high resolution S 2p XPS spectra of the channels of a used membrane after treatment with chlorine dioxide ($ClO_2$) according to at least one embodiment.
Figure 23G:
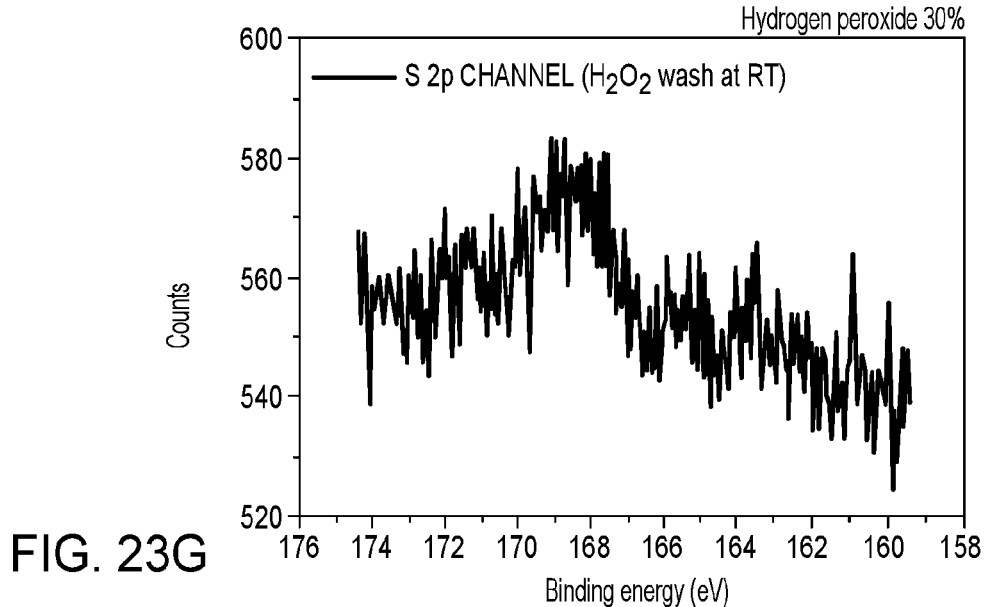
FIGS. 23G and 23H shows the raw data and fitted data from exemplary deconvoluted high resolution S 2p XPS spectra of the channels of a used membrane after treatment with $H_2O_2$ according to at least one embodiment.
Figure 23H:
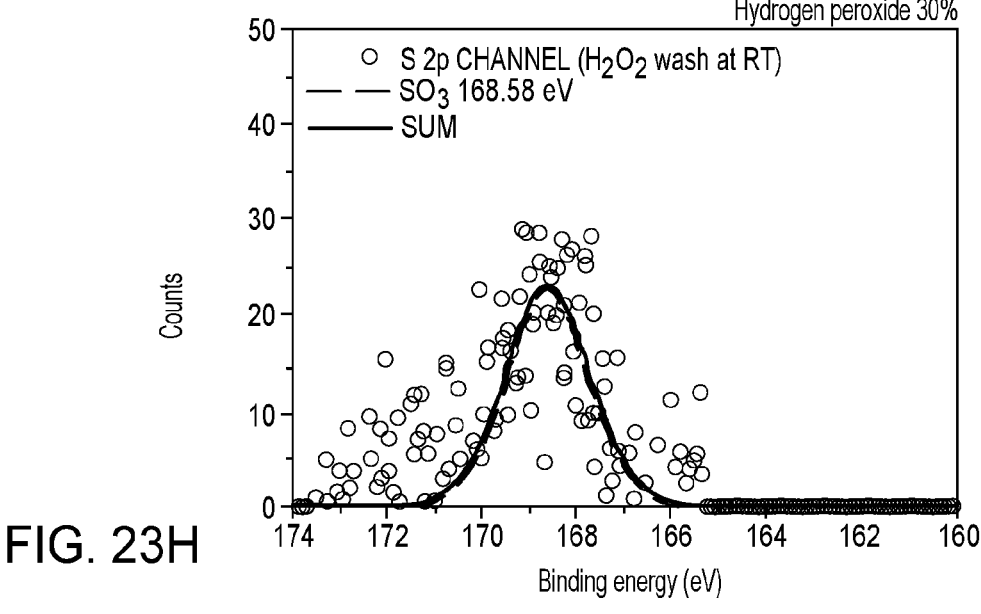

For these experiments, cystine powder was reacted with various oxidizing agents-nitric acid ($HNO_3$), $H_2O_2$, peracetic acid (PAA), or performic acid (PFA). Peracetic acid was made in situ using glacial acetic acid ($CH_3CO_2H$) and $H_2O_2$. Performic acid was also made in situ using formic acid ($HCO_2H$) and $H_2O_2$. Cystine, glacial acetic acid ($CH_3CO_2H$), nitric acid ($HNO_3$), formic acid ($HCO_2H$), and hydrogen peroxide solution were obtained commercially. Residues from the individual reactions were analyzed by $^1H$ NMR as shown in FIG. 20. Cysteic acid was also obtained commercially and used as a reference. The $^1H$ NMR of cysteic acid is shown in FIG. 20 as Ex. 1a.

Example 1b: Cystine powder (0.1 g) was added in water (10 mL). $HNO_3$ (70%, 2 mL) was added to the mixture, and the resultant mixture was stirred for 30 minutes at 25° C. The excess water and $HNO_3$ was evaporated by stirring the mixture on a hot plate at 80° C. until dryness. The resultant powder was re-dissolved in a minimum amount of water and evaporated again. The $^1H$ NMR spectrum of the residue is shown in FIG. 20 as Ex. 1b. Here, no cysteic acid was produced as indicated by the additional peaks and broadened peaks in the $^1H$ NMR spectrum in comparison to the spectrum of commercially available cysteic acid.

Example 1c: Cystine powder (0.1 g) was dispersed in 20 mL $H_2O_2$ (30% (w/w) in $H_2O$). The mixture was stirred for 30 minutes at 80° C. until the solution became clear. The excess water and hydrogen peroxide was evaporated by stirring on a hot plate at 80° C. The $^1H$ NMR spectrum of the residue is shown in FIG. 20 as Ex. 1c.

Example 1d: Cystine powder (0.1 g) was dissolved in a mixture of glacial acetic acid (30 mL) and 20 mL $H_2O_2$ (30% (w/w) in $H_2O$) by stirring for 4 h at 25° C. The excess PAA was slowly evaporated by stirring on a hot plate at 40-45° C. The $^1H$ NMR of the residue, as shown in FIG. 20 as Ex. 1d, indicated that cysteic acid had been formed.

Example 1e: Cystine powder (0.1 g) was dissolved in a mixture of formic acid (98%, 36 mL) and 5 mL $H_2O_2$ (30% (w/w) in $H_2O$) by stirring for 2.5 h at 25° C. The excess PFA as slowly evaporated by stirring on a hot plate at 30-35° C. The $^1H$ NMR of the residue, as shown in FIG. 20 as Ex. 1e, indicated that cysteic acid had been formed.

Overall, the $^1H$ NMR results indicate that PAA and PFA can be utilized for oxidizing cystine, a disulfide, to cysteic acid. These results were confirmed by XPS analysis. FIGS. 21A-21L show high resolution C 1s, N 1s, and S 2p XPS spectra of cysteic acid (commercially obtained) and the products from the reaction of cystine with PFA (Ex. 1e), PAA (Ex. 1d), or $H_2O_2$ (Ex. 1c) as described above. FIGS. 22A-22L show high resolution C 1s, N 1s, and S 2p XPS spectra of cysteic acid (commercially obtained), cystine (commercially obtained), and the products from the reaction of cystine with PFA (Ex. 1e), PAA (Ex. 1d).

The results indicated that an oxidation potential greater than that of hydrogen peroxide, e.g., greater than −1.76 V, could be used to convert the cystine in the used membrane to cysteic acid. This is further supported by the observation that chlorine dioxide, a common oil field oxidant for killing bacteria, did not reactivate the used cysteic acid functionalized membrane.

Portions of the used cysteic acid functionalized membrane (described above) were reacted with (PFA, 36 mL of 98% formic acid+5 mL $H_2O_2$), peracetic acid (PAA, 30 mL of glacial acetic acid+5 mL $H_2O_2$), chloride dioxide ($ClO_2$), or hydrogen peroxide ($H_2O_2$, 30% w/w in $H_2O$). In these examples, the hydrogen peroxide had a concentration of about 30% w/w in $H_2O$. All samples were run at about room temperature and then analyzed by XPS.

FIGS. 23A-23H show high resolution S 2p XPS spectra of used cysteic acid functionalized membranes after treatment with these oxidizing agents. The XPS data indicated that portions of the membrane oxidized by PFA or PAA show one major peak in the XPS S 2p spectra that corresponds to the sulfonic acid. $ClO_2$ was slow in oxidizing the disulfide to the corresponding sulfonic acid, and $H_2O_2$ showed a lower extent of reaction to the sulfonic acid than both PFA and PAA. The results indicated that organic peroxides can reactivate the used cysteic acid functionalized membrane and return the used membrane to the desired sulfonic acid form of cysteic acid.

Example Cleaning Protocols

Cleaning protocols were investigated on used cysteic acid functionalized membranes, the fabrication of which is described above. A membrane flux of the used cysteic acid functionalized membrane using clean water showed a specific membrane flux of about 195 LMH/bar (~7.82 GFD/psi). As a reference, an unfunctionalized commercial ceramic membrane has a specific membrane flux of about 381 LMH/bar (~15.3 GFD/psi). Specific membrane flux is the flow per unit area per unit pressure.

For these examples, a series of cleaning protocols were performed on the used membranes in situ with the reagent solutions being pumped through the channels of the membranes under normal flow-through conditions (about 1 bar membrane inlet pressure and 100 L/min crossflow rate with the permeate line closed). The reagent solutions were pumped through the membranes for a length of time, and at certain temperatures as discussed further in the Example Procedures below.

Example 2a: As a comparative example, a reagent solution of about 1 wt % sodium hydroxide (NaOH) was pumped through the used membrane at about 42° C. for about 30 minutes. Addition of the caustic solution did not result in any significant increase in membrane flux.

Example 2b: In this example, Domestos® (Unilever PLC) was added to the caustic solution. The main active ingredients in Domestos® are: sodium hypochlorite (NaClO, ~5 wt %); NaOH (~1 wt %); and a non-ionic surfactant comprising a mixture of $C_{12}$-$C_{15}$ alkyl dimethylamine oxides (~5 wt %). The procedure, conditions, and duration were the same as previously stated. With the addition of Domestos®, the membrane flux improved to about 399 LMH/bar (~15.3 GFD/psi). A visual inspection of the membrane however showed the channels were still partially obstructed with an orange grease-like substance fouling the membrane.

Example 2c: In this example, peracetic acid, was used as a reagent solution, without any pretreatment of the used membrane. The procedure, conditions, and duration were the same as previously stated. In this example, the clean water membrane flux was observed to be about 218 LMH/bar (~8.74 GFD/psi), representing a minor improvement. The overall membrane appearance however was considerably improved removing much of the orange contaminate from at least the external surface of the membrane.

Based on the observation that extraction with various solvents (such as isopropanol) under sonication aided removal of the contaminant, modifications were made to the filtration unit. These modifications enabled backwashing during the cleaning protocol to flush the pores of the membrane more efficiently and preventing further penetration of the foulant through the matrix. The modifications included a Pentek 3g slimeline depth cartridge filtration housing (Pentair PLC) installed on the return line back to the feedtank. A Purtrex 10" depth cartridge filter having a 1-micron rating (Suez) was also installed in the retentate return line 225 to mitigate residual contaminants from being recirculated through the system to re-foul the membrane. After flushing with isopropanol, a very faint yellow/orange tint appeared on the caustic wash filter cartridge.

Example 2d: After modification of the filtration unit, the membrane was flushed with isopropanol, caustic (NaOH)+ NaClO solution, and peracetic acid. The specific membrane flux increased beyond that of a single unfunctionalized membrane to about 458 LMH/bar (~18.4 GFD/psi). A visual inspection of the membrane showed that the membrane changed to an off-grey color, completely removing the orange foulant on the outer and inner surfaces of the membrane.

Figure 24:
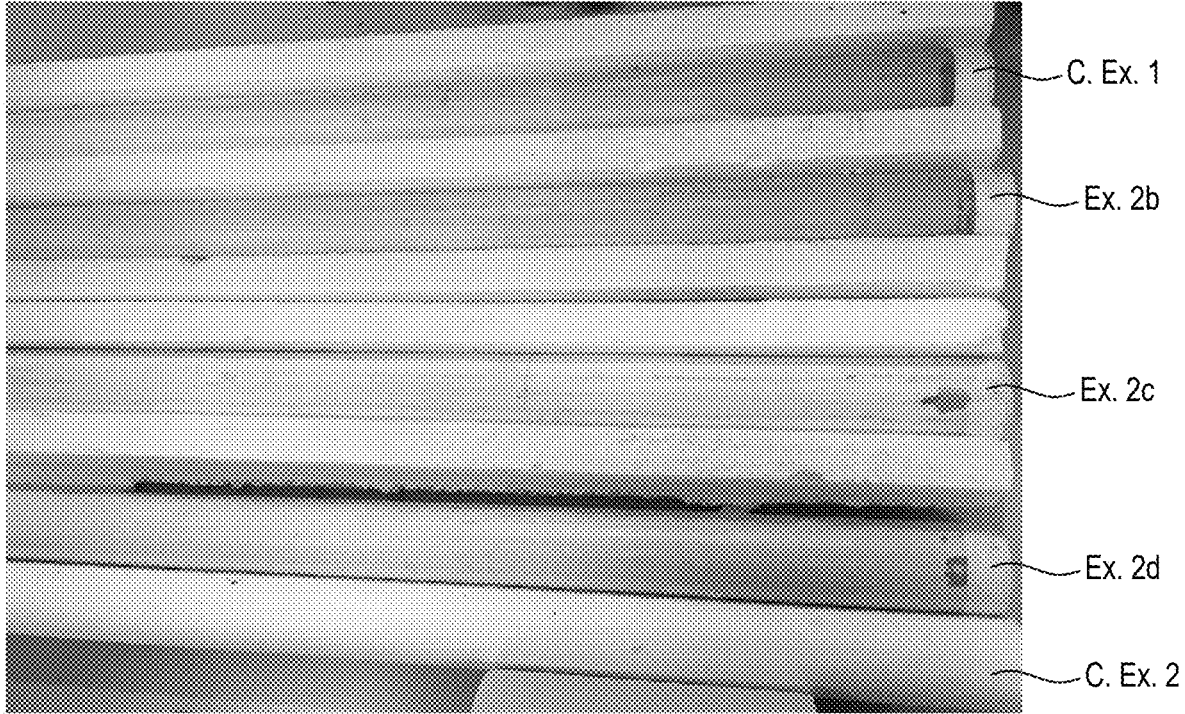
FIG. 24 is an exemplary photograph showing a used membrane without treatment, used membranes after various treatments, and a pre-used, unfunctionalized membrane according to at least one embodiment.

Table 5 shows the results in membrane flux of Examples 2b-2d relative to the used cysteic acid functionalized membrane (comparative example 1, C.Ex. 1), a new unfunctionalized membrane (C.Ex. 2), and a new cysteic acid functionalized membrane (C.Ex. 3). FIG. 24 shows a photograph of the chemically-cleaned membranes after various treatments. Top: used membrane (C.Ex. 1); 2nd from top: 1 wt % caustic and Domestos® wash (Ex. 2b); Middle: peracetic acid wash (Ex. 2c); 2nd from bottom: isopropanol wash then 1 wt % caustic and Domestos® wash then peracetic acid wash (Ex. 2d); bottom: new unfunctionalized membrane direct from Atech Innovations Gmbh, Germany (C.Ex. 2).

TABLE 5

| Sample | Membrane Flux (LMH/bar) | Membrane Flux (GFD/psi) |
| --- | --- | --- |
| C. Ex. 1: Used cysteic acid functionalized membrane | 195 | 7.82 |
| Ex. 2b: After caustic NaOH + NaClO treatment | 399 | 15.3 |
| Ex. 2c: After peracetic acid treatment | 218 | 8.74 |
| Ex. 2d: After (1) isopropanol, (b) caustic NaOH + NaClO treatment, (c) peracetic acid treatment | 458 | 18.4 |
| C. Ex. 2: New unfunctionalized membrane | 381 | 15.3 |
| C. Ex. 3: New cysteic acid functionalized membrane | >400 | >16 |

Example Procedures for Various Experiments

Example 3: A membrane (1.2 m long, 52 mm diameter, and a nominal pore size of 0.1 μm (Atech Innovations Gmbh, Germany)) was functionalized according to U.S. Pat. No. 9,242,876 (described above). The cysteic acid functionalized membrane was then placed in a filtration system to treat produced water from oil and gas extraction. The used cysteic acid functionalized membranes was then placed in a stainless steel membrane housing. An initial specific membrane flux of the used cysteic acid functionalized membrane was measured to be 195 LMH/bar (7.82 GFD/psi). Modifications were made to the filtration unit to allow backwashing during the example cleaning procedure to flush the pores of the membrane and to mitigate residual contaminants from being recirculated through the system to re-foul the membrane. These modifications included a Pentek 3g slimeline depth cartridge filtration housing (Pentair PLC) installed on the return line back to the feedtank and a Purtrex 10" depth cartridge filter having a 1-micron rating (Suez) was also installed on the retentate return line 225.

Isopropanol and/or water was backwashed through the membrane at 25° C. for about 1 hour at a transmembrane pressure (TMP) of 2 bar. This was followed by isopropanol flow through the membrane channels at 25° C. for about 1 hour at a TMP of 1 bar. After the isopropanol flush, clean water was pumped through the system for 30 minutes with 3 water changes. A cleaning agent solution was prepared by combining 500 g of sodium hydroxide and ~500 g of a solution containing sodium hydroxide (<1 wt %), sodium hypochlorite (about 5 wt %) and a non-ionic surfactant (5 wt %), and 50 L of water. This solution was backwashed through the membrane at 42° C. for 1 hour at a TMP of 2 bar, followed by flowthrough washing (i.e., forward flushing) at 42° C. for 1 hour with a TMP of 1 bar. Once the system was flushed with clean water for 30 minutes with 3 water changes, a solution of peracetic acid (30 L glacial acetic acid and 20 L of hydrogen peroxide (30% (w/w) in H$_2$O)) was backwashed through the membrane at 25° C. for 2 hours at a TMP of 2 bar, followed by flow-through washing at 25° C. for 2 hours with a TMP of 1 bar. Finally, the membrane was flushed for 30 minutes with clean water. After treatment, the specific membrane flux was measured to be 458 LMH/bar (18.4 GFD/psi).

Example 4: A membrane (1.2 m long, 52 mm diameter, and a nominal pore size of 0.1 μm (Atech Innovations Gmbh, Germany)) was functionalized according to U.S. Pat. No. 9,242,876 (described above). The cysteic acid functionalized membrane was then placed in a filtration system to treat produced water from oil and gas extraction. The used cysteic acid functionalized membranes was then placed in a stainless steel membrane housing. An initial specific membrane flux of the used cysteic acid functionalized membrane was measured to be 195 LMH/bar (7.82 GFD/psi). The used membrane was treated with a caustic 1 wt % sodium hydroxide solution by flow-through washing at 42° C. for 30 minutes with an inlet pressure of 1 bar and a crossflow rate of 100 L/min with the permeate line closed. After treatment, the specific membrane flux was measured to be 203 LMH/ bar (8.14 GFD/psi).

Example 5: A membrane (1.2 m long, 52 mm diameter, and a nominal pore size of 0.1 μm (Atech Innovations Gmbh, Germany)) was functionalized according to U.S. Pat. No. 9,242,876 (described above). The cysteic acid functionalized membrane was then placed in a filtration system to treat produced water from oil and gas extraction. The used cysteic acid functionalized membranes was then placed in a stainless steel membrane housing. The used membrane had an initial specific membrane flux of 195 LMH/bar (7.82 GFD/psi). The membrane was treated with a solution of peracetic acid (30 L glacial acetic acid and 20 L of hydrogen peroxide (30% (w/w) in H$_2$O)) by flow-through washing at 25° C. for 2 hours with an inlet pressure of 1 bar and a crossflow rate of 100 L/min with the permeate line closed. After treatment, the specific membrane flux was measured to be 218 LMH/bar (8.74 GFD/psi).

Example 6: A piece of a single, contaminated membrane (1.2 m long, 52 mm diameter, and nominal pore size of 0.1 μm (Atech Innovations Gmbh, Germany)), that had been functionalized with cysteic acid according to U.S. Pat. No. 9,242,876 (described above), was placed in a glass beaker and soaked in a 0.1 M solution of hydrochloric acid for 48 hours, periodically stirring at room temperature. The membrane sample was air dried and analyzed by SEM, EDX, and XPS.

Example 7: A piece of a single, contaminated membrane (1.2 m long, 52 mm diameter, and nominal pore size of 0.1 μm (Atech Innovations Gmbh, Germany)), that had been functionalized with cysteic acid according to U.S. Pat. No. 9,242,876 (described above), was placed in a glass beaker and soaked in a 0.1 M solution of oxalic acid for 48 hours, periodically stirring at room temperature. The membrane sample was washed ultrasonically in water (10 min), air dried, and analyzed by SEM, EDX, and XPS.

Example 8: A piece of a single, contaminated membrane (1.2 m long, 52 mm diameter, and nominal pore size of 0.1 μm (Atech Innovations Gmbh, Germany)), that had been functionalized with cysteic acid according to U.S. Pat. No. 9,242,876 (described above), was placed in a glass beaker and soaked in 0.1 M solution of citric acid for 48 hours, periodically stirring at room temperature. The membrane sample was washed ultrasonically in water (10 min), air dried, and analyzed by SEM, EDX, and XPS.

Example 9: A piece of a single, contaminated membrane (1.2 m long, 52 mm diameter, and nominal pore size of 0.1 μm (Atech Innovations Gmbh, Germany)), that had been functionalized with cysteic acid according to U.S. Pat. No. 9,242,876 (described above), was placed in a glass beaker and soaked in 0.1 M solution of acetic acid for 48 hours, periodically stirring at room temperature. The membrane sample was washed ultrasonically in water (10 min), air dried, and analyzed by SEM, EDX, and XPS.

Example 10: A piece of a single, contaminated membrane (1.2 m long, 52 mm diameter, and nominal pore size of 0.1 μm (Atech Innovations Gmbh, Germany)), that had been functionalized with cysteic acid according to U.S. Pat. No. 9,242,876 (described above), was placed in a glass beaker and soaked in 1 M solution of cysteic acid for 1 hour at 80° C. with continuous stirring. The membrane sample was washed ultrasonically in water (10 min), air dried, and analyzed by SEM, EDX, and XPS.

Example 11: A piece of a single, contaminated membrane (1.2 m long, 52 mm diameter, and nominal pore size of 0.1 μm (Atech Innovations Gmbh, Germany)), that had been functionalized with cysteic acid according to U.S. Pat. No. 9,242,876 (described above), was placed in a glass beaker and soaked in carbon disulfide for 15 minutes at room temperature with stirring. The membrane sample was air dried and analyzed by SEM, EDX, and XPS.

Example 12: A piece of a single, contaminated membrane (1.2 m long, 52 mm diameter, and nominal pore size of 0.1 μm (Atech Innovations Gmbh, Germany)), that had been functionalized with cysteic acid according to U.S. Pat. No. 9,242,876 (described above), was placed in a glass beaker and soaked in hydrogen peroxide solution (30% (w/w) in $H_2O$) for 15 minutes at 80° C. with stirring. The membrane sample was air dried and analyzed by SEM, EDX, and XPS.

Example 13: a piece of a single, contaminated membrane (1.2 m long, 52 mm diameter, and nominal pore size of 0.1 μm (Atech Innovations Gmbh, Germany)), that had been functionalized with cysteic acid according to U.S. Pat. No. 9,242,876 (described above), was placed in a glass beaker and soaked in isopropanol for 20 minutes at room temperature with sonication. The membrane sample was removed and the solvent evaporated. The dried residue was analyzed by SEM, EDX, and XPS.

Example 14: A piece of a single, contaminated membrane (1.2 m long, 52 mm diameter, and nominal pore size of 0.1 μm (Atech Innovations Gmbh, Germany)), that had been functionalized with cysteic acid according to U.S. Pat. No. 9,242,876 (described above), was placed in a glass beaker and soaked in toluene for 20 minutes at room temperature with sonication. The membrane sample was removed and the solvent evaporated. The dried residue was analyzed by SEM, EDX, and XPS.

Example 15: A piece of a single, contaminated membrane (1.2 m long, 52 mm diameter, and nominal pore size of 0.1 μm (Atech Innovations Gmbh, Germany)), that had been functionalized with cysteic acid according to U.S. Pat. No. 9,242,876 (described above), was placed in a glass beaker and soaked in acetone for 20 minutes at room temperature with sonication. The membrane sample was removed and the solvent evaporated. The dried residue was analyzed by SEM, EDX, and XPS.

Example 16: A piece of a single, contaminated membrane (1.2 m long, 52 mm diameter, and nominal pore size of 0.1 μm (Atech Innovations Gmbh, Germany)), that had been functionalized with cysteic acid according to U.S. Pat. No. 9,242,876 (described above), was placed in a glass beaker and soaked in a performic acid solution (98% formic acid (36 mL) and 5 mL hydrogen peroxide solution (30% (w/w) in $H_2O$)). After soaking in the solution for 3 hours at room temperature the membrane sample was ultrasonically washed in water (10 min), air dried, and analyzed by SEM, EDX, and XPS.

Example 17: A piece of a single, contaminated membrane (1.2 m long, 52 mm diameter, and nominal pore size of 0.1 μm (Atech Innovations Gmbh, Germany)), that had been functionalized with cysteic acid according to U.S. Pat. No. 9,242,876 (described above), was placed in a glass beaker and soaked in a peracetic acid solution (glacial acetic acid (30 mL) and 20 mL hydrogen peroxide solution (30% (w/w) in $H_2O$)). After soaking in the solution for 3 hours at room temperature the membrane sample was ultrasonically washed in water (10 min), air dried, and analyzed by SEM, EDX, and XPS.

Example 18: A piece of a single, contaminated membrane (1.2 m long, 52 mm diameter, and nominal pore size of 0.1 μm (Atech Innovations Gmbh, Germany)), that had been functionalized with cysteic acid according to U.S. Pat. No. 9,242,876 (described above), was placed in a glass beaker and soaked in a solution of chlorine dioxide ($ClO_2$) prepared by dissolving five chlorine dioxide tablets (Lifesystems) in water (100 mL) over 5 hours (1 tablet per hour). After soaking in the solution for 5 hours at room temperature, the membrane sample was ultrasonically washed in water (10 min), air dried, and analyzed by SEM, EDX, and XPS.

Example 19: A piece of a single, contaminated membrane (1.2 m long, 52 mm diameter, and nominal pore size of 0.1 μm (Atech Innovations Gmbh, Germany)), that had been functionalized with cysteic acid according to U.S. Pat. No. 9,242,876 (described above), was placed in a glass beaker and soaked in a hydrogen peroxide solution (30% (w/w) in $H_2O$). After soaking in the solution for 3 hours at room temperature, the membrane sample was ultrasonically washed in water (10 min), air dried, and analyzed by SEM, EDX, and XPS.

Embodiments of the present disclosure generally relate to methods for treating porous membranes. Embodiments described herein can be used to clean, reactivate, regenerate used membranes.

EMBODIMENTS LISTING

The present disclosure provides, among others, the following embodiments, each of which can be considered as optionally including any alternate embodiments:

Clause 1. A method of treating a porous membrane, comprising: flushing the membrane with a first fluid comprising a hydroxide ion and hypochlorite ion; flushing the membrane with water; flushing the membrane with a second fluid comprising an organic peroxide, organic peroxide ion, or both; and flushing the membrane with water.

Clause 2. The method of Clause 1, wherein the membrane is a ceramic membrane comprising a plurality of hydrophilic molecules bonded to the ceramic membrane.

Clause 3. The method of Clause 1 or Clause 2, wherein the flushing the membrane with a first fluid comprises: flowing the first fluid from a permeate side of the membrane to a retentate side of the membrane by applying a first transmembrane pressure to the first fluid of about 5 bar or less; and flowing the first fluid from the retentate side to the permeate side of the membrane by applying a second transmembrane pressure to the first fluid of about 1 bar to about 2 bar.

Clause 4. The method of any one of Clauses 1-3, wherein flowing a first fluid is performed at a temperature of about 30° C. to about 50° C.

Clause 5. The method of any one of Clauses 1-3, wherein: a concentration of hydroxide ion in the first fluid is from about 0.5 wt % to about 5 wt %; a concentration of hypochlorite ion in the first fluid is from about 1 wt % to about 10 wt %; a weight ratio of hydroxide ion to hypochlorite ion is from about 0.5:5 to about 1.5:5; or combinations thereof.

Clause 6. The method of any one of Clauses 1-5, wherein the first fluid comprises an amine oxide surfactant.

Clause 7. The method of any one of Clauses 1-6, wherein the flushing the membrane with a second fluid comprising an organic peroxide, organic peroxide ion, or both comprises: flowing the second fluid from a permeate side of the membrane to a retentate side of the membrane by applying a first transmembrane pressure to the second fluid of about 5 bar or less; and flowing the second fluid from the retentate side to the permeate side of the membrane by applying a second transmembrane pressure to the second fluid of about 1 bar to about 2 bar.

Clause 8. The method of any one of Clauses 1-7, wherein the flushing the membrane with the second fluid is performed at a temperature from about 5° C. to about 30° C. for about 48 h or less.

Clause 9. The method of any one of Clauses 1-8, wherein prior to flushing the membrane with the first fluid, the method further comprises flushing the membrane with an alcohol.

Clause 10. The method of Clause 9, wherein the alcohol is isopropanol.

Clause 11. A method of treating a porous ceramic membrane, comprising: flowing a first fluid from a permeate side of the membrane to a retentate side of the membrane, the first fluid comprising a hydroxide ion and a hypochlorite ion, the membrane comprising a plurality of hydrophilic molecules bonded to the ceramic membrane; flowing water from the retentate side of the membrane to the permeate side of the membrane; flowing a second fluid from the permeate side of the membrane to the retentate side of the membrane, the second fluid comprising an organic peroxide, organic peroxide ion, or both; and flowing water from the retentate side of the membrane to the permeate side of the membrane.

Clause 12. The method of Clause 11, wherein the flowing a first fluid comprises: contacting the permeate side of the membrane with the first fluid; applying a first transmembrane pressure to the first fluid to push the first fluid from the permeate side to the retentate side of the membrane, wherein the first transmembrane pressure is about 5 bar or less; contacting the retentate side of the membrane with the first fluid; and applying a second transmembrane pressure to the first fluid to push the first fluid from the permeate side to the retentate side of the membrane, wherein the second transmembrane pressure is about 1 bar to about 2 bar.

Clause 13. The method of Clause 11 or Clause 12, wherein the flowing a first fluid is performed at a temperature of about 30° C. to about 50° C.

Clause 14. The method of any one of Clause 11-13, wherein the first fluid further comprises an amine oxide surfactant.

Clause 15. The method of any one of Clause 11-14, wherein a concentration of hydroxide ion in the first fluid is from about 0.5 wt % to about 5 wt %, a concentration of hypochlorite ion in the first fluid is from about 1 wt % to about 10 wt %, or both.

Clause 16. The method of any one of Clause 11-15, wherein prior to flowing a first fluid from a permeate side of the membrane to a retentate side of the membrane, the method further comprises flushing the membrane with an alcohol.

Clause 17. The method of any one of Clause 11-16, wherein a specific membrane flux after performing the method is increased by at least about 20% or more as measured by an amount of water that passes through the membrane over a given time and pressure.

Clause 18. A method of treating a porous ceramic membrane, comprising: introducing a cleaning agent solution on a permeate side of the membrane, the cleaning agent solution comprising a hydroxide ion, a hypochlorite ion, and a surfactant, the membrane comprising a plurality of hydrophilic molecules bonded to the ceramic membrane; applying a transmembrane pressure of about 5 bar or less to move the cleaning agent solution through the membrane and to a retentate side of the membrane; flushing the membrane with water until a pH of the water is about 7 or less; introducing an organic peroxide solution on the permeate side of the membrane, the organic peroxide solution comprising an organic peroxide, organic peroxide ion, or both; applying a transmembrane pressure of about 5 bar or less to move the organic peroxide solution through the membrane and to the retentate side of the membrane; and flushing the membrane with water.

Clause 19. The method of Clause 18, wherein the plurality of hydrophilic molecules comprises cysteic acid.

Clause 20. The method of Clause 18 or Clause 19, wherein the membrane is flushed with an alcohol prior to introducing a cleaning agent solution.

As used herein, and unless otherwise specified, the term "Cn" means hydrocarbon(s) having n carbon atom(s) per molecule, wherein n is a positive integer. The term "hydrocarbon" means a class of compounds containing hydrogen bound to carbon, and encompasses (i) saturated hydrocarbon compounds, (ii) unsaturated hydrocarbon compounds, and (iii) mixtures of hydrocarbon compounds (saturated and/or unsaturated), including mixtures of hydrocarbon compounds having different values of n. Likewise, a "$C_m$-$C_y$" group or compound refers to a group or compound comprising carbon atoms at a total number thereof in the range from m to y. Thus, a $C_1$-$C_{50}$ alkyl group refers to an alkyl group comprising carbon atoms at a total number thereof in the range from 1 to 50.

For purposes of this disclosure, and unless otherwise specified, the terms "hydrocarbyl radical," "hydrocarbyl group," or "hydrocarbyl" interchangeably refer to a group consisting of hydrogen and carbon atoms only. A hydrocarbyl can be saturated or unsaturated, linear or branched, cyclic or acyclic, aromatic, or non-aromatic. For the purposes of this disclosure, and unless otherwise specified, the term "aryl" refers to a hydrocarbyl comprising an aromatic ring structure therein.

Chemical moieties of the application can be substituted or unsubstituted unless otherwise specified. For purposes of this disclosure, and unless otherwise specified, a substituted hydrocarbyl and a substituted aryl refers to an hydrocarbyl radical and an aryl radical, respectively, in which at least one hydrogen atom has been substituted with a heteroatom or heteroatom containing group, such as with at least one functional group, such as one or more elements from Group 13-17 of the periodic table of the elements, such as halogen (F, Cl, Br, or I), O. N, Se, Te, P, As, Sb, S, B, Si, Ge, Sn, Pb, and the like, such as $NR*_2$, $OR*$ (e.g., OH or $O_2H$), $SeR*$, $TeR*$, $PR*_2$, $AsR*_2$, $SbR*_2$, $SR*$, $SO_x$ (where x=2 or 3), $BR*_2$, $SiR*_3$, $GeR*_3$, $SnR*_3$, $PbR*_3$, and the like or where at least one heteroatom has been inserted within the hydrocarbyl radical or aryl radical such as one or more of halogen (F, Cl, Br, or I), O, S, Se, Te, $NR*$, $PR*$, $AsR*$, $SbR*$, $BR*$, $SiR*_2$, $GeR*_2$, $SnR*_2$, $PbR*_2$, and the like, where R* is, independently, hydrogen, hydrocarbyl (e.g., $C_1$-$C_{10}$), or two or more R* may join together to form a substituted or unsubstituted completely saturated, partially unsaturated, fully unsaturated, or aromatic cyclic or polycyclic ring structure.

Where isomers of a named molecule group exist (e.g., n-butyl, iso-butyl, sec-butyl, and tert-butyl), reference to one member of the group (e.g., n-butyl) shall expressly disclose the remaining isomers (e.g., iso-butyl, sec-butyl, and tert-butyl) in the family. Likewise, reference to a named molecule without specifying a particular isomer (e.g., butyl) expressly discloses all isomers (e.g., n-butyl, iso-butyl, sec-butyl, and tert-butyl).

As is apparent from the foregoing general description and the specific aspects, while forms of the aspects have been illustrated and described, various modifications can be made without departing from the spirit and scope of the present disclosure. Accordingly, it is not intended that the present disclosure be limited thereby. Likewise, the term "comprising" is considered synonymous with the term "including." Likewise whenever a composition, an element or a group of elements is preceded with the transitional phrase "comprising," it is understood that we also contemplate the same composition or group of elements with transitional phrases "consisting essentially of," "consisting of," "selected from the group of consisting of," or "Is" preceding the recitation of the composition, element, or elements and vice versa, e.g., the terms "comprising," "consisting essentially of," "consisting of" also include the product of the combinations of elements listed after the term.

For purposes of this present disclosure, and unless otherwise specified, all numerical values within the detailed description and the claims herein are modified by "about" or "approximately" the indicated value, and consider experimental error and variations that would be expected by a person having ordinary skill in the art. For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

As used herein, the indefinite article "a" or "an" shall mean "at least one" unless specified to the contrary or the context clearly indicates otherwise.

While the foregoing is directed to aspects of the present disclosure, other and further embodiments of the disclosure may be devised without departing from the basic scope thereof, and the scope thereof is determined by the claims that follow.

What is claimed is:

1. A method of treating a porous membrane, comprising:
   flushing the membrane with a first fluid comprising a hydroxide ion and hypochlorite ion;
   flushing the membrane with water;
   flushing the membrane with a second fluid comprising an organic peroxide, organic peroxide ion, or both; and
   flushing the membrane with water.

2. The method of claim 1, wherein the membrane is a ceramic membrane comprising a plurality of hydrophilic molecules bonded to the ceramic membrane.

3. The method of claim 1, wherein the flushing the membrane with a first fluid comprises:
   flowing the first fluid from a permeate side of the membrane to a retentate side of the membrane by applying a first transmembrane pressure to the first fluid of about 5 bar or less; and
   flowing the first fluid from the retentate side to the permeate side of the membrane by applying a second transmembrane pressure to the first fluid of about 1 bar to about 2 bar.

4. The method of claim 1, wherein flowing a first fluid is performed at a temperature of about 30° C. to about 50° C.

5. The method of claim 1, wherein:
   a concentration of hydroxide ion in the first fluid is from about 0.5 wt % to about 5 wt %;
   a concentration of hypochlorite ion in the first fluid is from about 1 wt % to about 10 wt %;
   a weight ratio of hydroxide ion to hypochlorite ion is from about 0.5:5 to about 1.5:5; or
   combinations thereof.

6. The method of claim 1, wherein the first fluid comprises an amine oxide surfactant.

7. The method of claim 1, wherein the flushing the membrane with a second fluid comprising an organic peroxide, organic peroxide ion, or both comprises:
   flowing the second fluid from a permeate side of the membrane to a retentate side of the membrane by applying a first transmembrane pressure to the second fluid of about 5 bar or less; and
   flowing the second fluid from the retentate side to the permeate side of the membrane by applying a second transmembrane pressure to the second fluid of about 1 bar to about 2 bar.

8. The method of claim 1, wherein the flushing the membrane with the second fluid is performed at a temperature from about 5° C. to about 30° C. for about 48 h or less.

9. The method of claim 1, wherein prior to flushing the membrane with the first fluid, the method further comprises flushing the membrane with an alcohol.

10. The method of claim 9, wherein the alcohol is isopropanol.

11. A method of treating a porous ceramic membrane, comprising:
   flowing a first fluid from a permeate side of the membrane to a retentate side of the membrane, the first fluid comprising a hydroxide ion and a hypochlorite ion, the membrane comprising a plurality of hydrophilic molecules bonded to the ceramic membrane;

flowing water from the retentate side of the membrane to the permeate side of the membrane;

flowing a second fluid from the permeate side of the membrane to the retentate side of the membrane, the second fluid comprising an organic peroxide, organic peroxide ion, or both; and flowing water from the retentate side of the membrane to the permeate side of the membrane.

12. The method of claim 11, wherein the flowing a first fluid comprises:

contacting the permeate side of the membrane with the first fluid;

applying a first transmembrane pressure to the first fluid to push the first fluid from the permeate side to the retentate side of the membrane, wherein the first transmembrane pressure is about 5 bar or less;

contacting the retentate side of the membrane with the first fluid; and applying a second transmembrane pressure to the first fluid to push the first fluid from the permeate side to the retentate side of the membrane, wherein the second transmembrane pressure is about 1 bar to about 2 bar.

13. The method of claim 12, wherein the flowing a first fluid is performed at a temperature of about 30° C. to about 50° C.

14. The method of claim 11, wherein the first fluid further comprises an amine oxide surfactant.

15. The method of claim 11, wherein a concentration of hydroxide ion in the first fluid is from about 0.5 wt % to about 5 wt %, a concentration of hypochlorite ion in the first fluid is from about 1 wt % to about 10 wt %, or both.

16. The method of claim 11, wherein prior to flowing a first fluid from a permeate side of the membrane to a retentate side of the membrane, the method further comprises flushing the membrane with an alcohol.

17. The method of claim 11, wherein a specific membrane flux after performing the method is increased by at least about 20% or more as measured by an amount of water that passes through the membrane over a given time and pressure.

18. A method of treating a porous ceramic membrane, comprising:

introducing a cleaning agent solution on a permeate side of the membrane, the cleaning agent solution comprising a hydroxide ion, a hypochlorite ion, and a surfactant, the membrane comprising a plurality of hydrophilic molecules bonded to the ceramic membrane;

applying a transmembrane pressure of about 5 bar or less to move the cleaning agent solution through the membrane and to a retentate side of the membrane;

flushing the membrane with water until a pH of the water is about 7 or less;

introducing an organic peroxide solution on the permeate side of the membrane, the organic peroxide solution comprising an organic peroxide, organic peroxide ion, or both;

applying a transmembrane pressure of about 5 bar or less to move the organic peroxide solution through the membrane and to the retentate side of the membrane; and flushing the membrane with water.

19. The method of claim 18, wherein the plurality of hydrophilic molecules comprises cysteic acid.

20. The method of claim 18, wherein the membrane is flushed with an alcohol prior to introducing a cleaning agent solution.

* * * * *